US008004702B2

(12) United States Patent
Noda

(10) Patent No.: US 8,004,702 B2
(45) Date of Patent: Aug. 23, 2011

(54) PRINT SCHEDULE CONTROL EQUIPMENT, PRINT SCHEDULE CONTROL METHOD, AND PROGRAM THEREFOR

(75) Inventor: Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1671 days.

(21) Appl. No.: 11/114,123

(22) Filed: Apr. 26, 2005

(65) Prior Publication Data

US 2005/0243365 A1 Nov. 3, 2005

(30) Foreign Application Priority Data

Apr. 28, 2004 (JP) ................................. 2004-134560
Mar. 22, 2005 (JP) ................................. 2005-082677

(51) Int. Cl.
*G06F 15/00* (2006.01)
(52) U.S. Cl. ............................ 358/1.15; 358/1.1; 358/1.9
(58) Field of Classification Search .................. 358/1.15, 358/1.1, 1.9
See application file for complete search history.

(56) References Cited

U.S. PATENT DOCUMENTS

| 6,058,277 | A | * | 5/2000 | Streefkerk et al. | 399/81 |
|---|---|---|---|---|---|
| 6,175,700 | B1 | * | 1/2001 | Miller et al. | 399/72 |
| 6,271,927 | B1 | * | 8/2001 | Kohtani et al. | 358/1.16 |
| 6,687,018 | B1 | * | 2/2004 | Leong et al. | 358/1.15 |
| 7,061,635 | B1 | * | 6/2006 | Wanda et al. | 358/1.15 |
| 2002/0057455 | A1 | * | 5/2002 | Gotoh et al. | 358/1.15 |
| 2002/0163667 | A1 | | 11/2002 | Noda | 358/1.15 |
| 2002/0171864 | A1 | * | 11/2002 | Sesek | 358/1.15 |
| 2004/0046992 | A1 | | 3/2004 | Mori et al. | 358/1.15 |
| 2004/0057066 | A1 | * | 3/2004 | Sugishita et al. | 358/1.13 |
| 2004/0190057 | A1 | * | 9/2004 | Takahashi et al. | 358/1.15 |
| 2004/0233472 | A1 | * | 11/2004 | Gassho et al. | 358/1.15 |
| 2004/0239965 | A1 | * | 12/2004 | Krueger et al. | 358/1.9 |

FOREIGN PATENT DOCUMENTS

| JP | 2001-306655 | | 11/2001 |
|---|---|---|---|
| JP | 2002-063004 | A | 2/2002 |
| JP | 2002-63005 | | 2/2002 |
| JP | 2002-254754 | A | 9/2002 |
| JP | 2003-30182 | A | 1/2003 |
| JP | 2003-103878 | A | 4/2003 |

OTHER PUBLICATIONS

U.S. Appl. No. 11/350,944 (Noda), filed Feb. 10, 2006 (Gau 2622).
Japanese Office Action corresponding to Japanese patent Application No. 2005-082677.

* cited by examiner

*Primary Examiner* — David K Moore
*Assistant Examiner* — Mark R Milia
(74) *Attorney, Agent, or Firm* — Fitzpatrick, Cella, Harper & Scinto

(57) ABSTRACT

This invention aims at conducting a scheduling work of print processing efficiently. A device scheduler refers to print job composition information registered in step control information of the step "printer reservation" of other print job (other order) in a workflow information table, and a schedule information table. The device scheduler searches both other print jobs (proof print jobs and regular print jobs) that a to-be-registered proof print job having a processing time of the proof print job described above affects and other print jobs (proof print jobs and regular print jobs) that affect the to-be-registered proof print job. The device scheduler determines whether the to-be-registered proof print job can be registered in a schedule (there is no search result in Step 2017 described above). When the registration is not possible, the device scheduler informs an operator of the result that automatic scheduling is impossible.

7 Claims, 48 Drawing Sheets

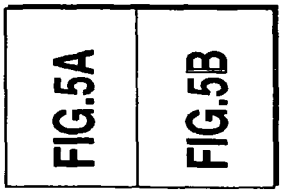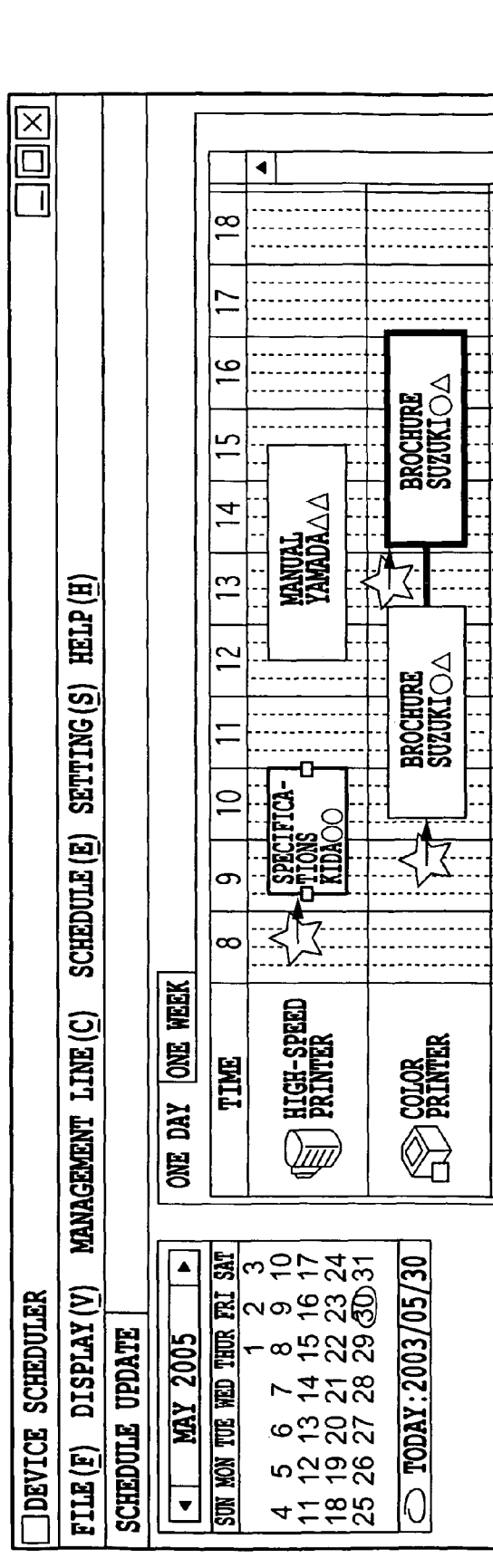

| FIG.7A |
|--------|
| FIG.7B |

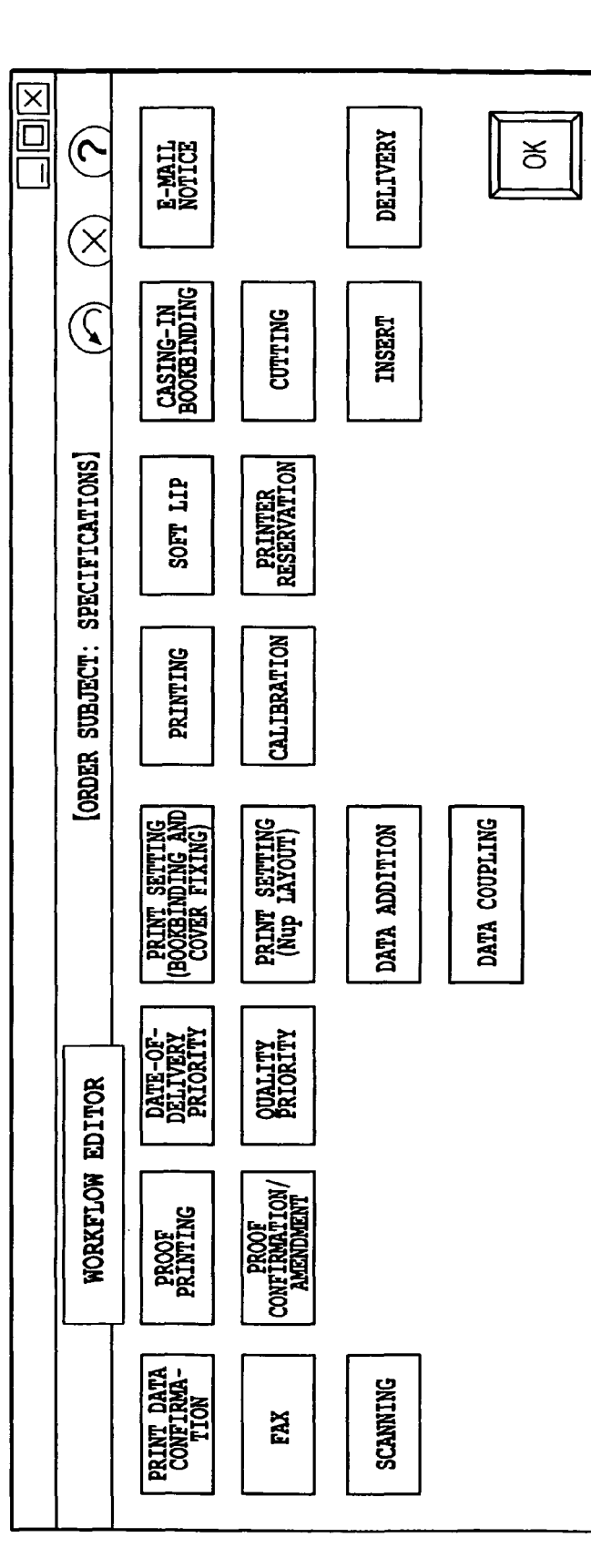

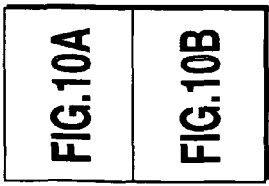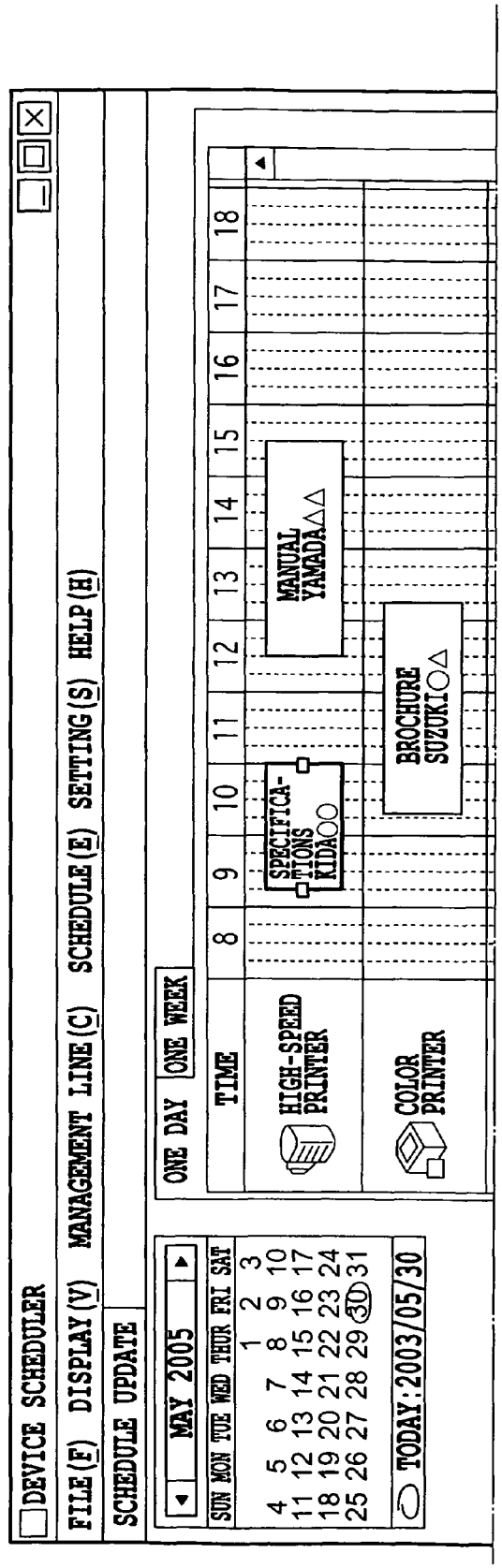

FIG.10B

| PRINTER NAME | STATE | ADDRESS | MANAGER | INSTALLED LOCATION |
|---|---|---|---|---|
| HIGH-SPEED PRINTER | PRINTING | 191.191.191.1 | SATO×○ | AISLE SIDE (NORTH) |
| OLOR PRINTER | WAITING | 191.191.191.2 | YAMADA△△ | AISLE SIDE (NORTH) |
| MEDIUM-SPEED PRINTER 1 | WAITING | 191.191.191.3 | SATO×○ | AISLE SIDE (SOUTH) |
| MEDIUM-SPEED PRINTER 2 | WAITING | 191.191.191.4 | SATO×○ | AISLE SIDE (SOUTH) |
| MEDIUM-SPEED PRINTER 3 | WAITING | 191.191.191.5 | SATO×○ | WINDOW SIDE (WEST) |
| MEDIUM-SPEED PRINTER 4 | WAITING | 191.191.191.6 | SATO×○ | WINDOW SIDE (WEST) |
| .. | .. | .. | .. | .. |

FIG.12

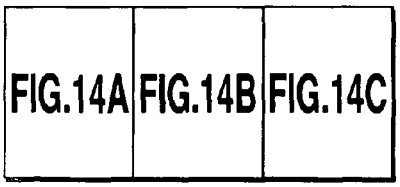

FIG.14

| | ORDER ID |
|---|---|
| GENERAL ORDER INFORMATION | KIND OF SERVICE |
| | ORDER NAME |
| | MANUSCRIPT SUBMISSION METHOD |
| | MANUSCRIPT SUBMISSION TIME AND DATE |
| | DELIVERY METHOD |
| | DATE OF DELIVERY |
| | NUMBER OF COPIES |
| | JOB SECURITY |
| | QUALITY |
| | : |
| FILE INFORMATION | NUMBER OF FILES |
| | FILE NAME |
| | FILE PATH |
| | NUMBER OF PAGES |
| | MANUSCRIPT FORMATION APPLICATION |
| | : |
| PRINT APPEARANCE | FINISHED SIZE |
| | ORIENTATION OF OUTPUT PAPER |
| | KIND OF BOOKBINDING |
| | BINDING DIRECTION |
| | PRINTED SIDE (TEXT) |
| | COLOR MODE (TEXT) |
| | PAPER TYPE (TEXT) |
| | PUNCH HOLE |
| | Z-FOLDING |
| | COVER |
| | COLOR MODE (COMMON TO FRONT COVER/BACK COVER) |
| | : |
| OPERATOR INFORMATION | FULL NAME |
| | ACCOUNT |
| | E-MAIL ADDRESS |
| | EXTENSION |
| | CONFIRMATION TIME |
| | CONSECUTIVE PRINT PROCESSING TIME (PROOF PRINT) |
| | : |

FIG.14A

| No.1001 | No.1002 | No.1003 |
|---|---|---|
| OUTPUT/BOOKBINDING SERVICE | OUTPUT/BOOKBINDING SERVICE | REORDER |
| SPECIFICATIONS | BROCHURE | MANUAL |
| NETWORK | MEDIUM | NETWORK |
| 2003.03.03 | 2003.03.05 | 2003.04.01 |
| SENDING BY MAIL | SENDING BY MAIL | COMING TO THE SHOP |
| 2003.03.31 | 2003.03.31 | 2003.04.16 |
| 100 COPIES | 400 COPIES | 200 COPIES |
| - | HIGH | - |
| - | HIGH | HIGH |
| : | : | : |
| 1 | 1 | 2 |
| spec.doc | pan.doc | Cover.doc/Manual.doc |
| Server1/Z:¥work | Server1/Z:¥work | Server1/Z:¥work |
| 120 | 5 | 37 |
| Mooooooooo Woooo | Aoooo Aoooooo | Moooooooo Woooo |
| : | : | : |
| A4 | A4 | B5 |
| PORTRAIT | PORTRAIT | PORTRAIT |
| SADDLE-STITCHING BOOKBINDING | STAPLE | SADDLE-STITCHING BOOKBINDING |
| LEFT | LEFT | LEFT |
| DOUBLE SIDED | SINGLE SIDED | DOUBLE SIDED |
| MONOCHROME | COLOR | MONOCHROME |
| WHITE-BLACK STANDARD PAPER | GLOSS THICK PAPER | WHITE-BLACK STANDARD PAPER |
| 30 HOLES | NO | NO |
| NO | NO | NO |
| WITH COVER | WITHOUT COVER | WITH COVER |
| MONOCHROME | NO MODE | COLOR |
| : | : | : |
| AKIRA KIDA | ICHIRO SUZUKI | AKIRA KIDA |
| kida | suzuki | kida |
| kida@pod.com | suzuki@pod.com | kida@pod.com |
| 007 | 008 | 001 |
| 30min | 30min | 60min |
| 0min | 10min | 10min |
| : | : | : |

FIG.14B

| No.1004 | No.1005 | No.xxxx |
|---|---|---|
| COPY SERVICE | OUTPUT/BOOKBINDING SERVICE | |
| SEMINAR SOURCE MATERIAL | MANUAL | |
| SENDING BY MAIL | NETWORK | |
| 2003.04.01 | 2003.04.03 | |
| SENDING BY MAIL | SENDING BY MAIL | |
| 2003.04.16 | 2003.04.19 | |
| 1000 COPIES | 800 COPIES | |
| - | HIGH | |
| - | - | |
| : | | |
| - | 1 | |
| - | Min.doc | |
| Server1/Z:¥work | Server1/Z:¥work | |
| 25 | 55 | |
| Mooooooo PooooPoooo | Mooooooo Woooo | |
| | | |
| A4 | A4 | |
| LANDSCAPE | PORTRAIT | |
| STAPLE | SADDLE-STITCHING BOOKBINDING | |
| LEFT | LEFT | |
| SINGLE SIDED | DOUBLE SIDED | |
| MONOCHROME | MONOCHROME | |
| WHITE-BLACK STANDARD PAPER | WHITE-BLACK STANDARD PAPER | |
| TWO HOLES | NO | |
| NO | NO | |
| WITH COVER | WITH COVER | |
| MONOCHROME | MONOCHROME | |
| : | : | |
| AKIRA KIDA | TARO YAMADA | |
| kida | yamada | |
| kida@pod.com | yamada@pod.com | |
| 007 | 099 | |
| 30min | 30min | |
| 0min | 0min | |
| : | : | |

| FIG.15A |
|---|
| FIG.15B |
| FIG.15C |

FIG.15A

| ORDER ID | STEP NUMBER | STEP | STEP PROCESSING ITEM INFORMATION | STEP CONTROL INFORMATION |
|---|---|---|---|---|
| | 0 | NUMBER OF STEPS | 12 | |
| | 1 | PRINT DATA CONFIRMATION | "OPERATOR OPERATION" | STEP: 1 (COMPLETED) /PROCESS PRIORITY: DATE PRIORITY |
| | 2 | PRINT SETTING (BOOKBINDING AND COVER FIXING) | "OPERATOR OPERATION" | STEP: 1 (COMPLETED) |
| No.1001 | 3 | PRINTER RESERVATION | "REGULAR PRINT JOB RESERVATION" | STEP: 1 (COMPLETED) /COOPERATION MODE: SIMPLE PRINTING (1 JOB) / ONE: HIGH-SPEED PRINTER |
| | 4 | PROOF PRINTING | "PROOF PRINTING RESERVATION" PROOF PRINT COMPLETION FLAG: 1 | STEP: 1 (COMPLETED) /PROOF PRINT CONFIRMATION COMPLETION FLAG: 1 (COMPLETED) |
| | 5 | E-MAIL NOTICE | "PROOF PRINT COMPLETION NOTICE" | STEP: 1 (COMPLETED) |
| | 6 | PROOF CONFIRMATION/ AMENDMENT | POOF PRINT COMPLETION: 0 | STEP: 1 (COMPLETED) /PROOF PRINT CONFIRMATION COMPLETION FLAG: 0 (NOT COMPLETED) |
| | 7 | PRINTING | PRINTER NAME (TYPE): HIGH-SPEED PRINTER (MONOCHROME) | STEP: 0 (NOT COMPLETED) |
| | 8 | E-MAIL NOTICE | "REGULAR PRINT COMPLETION NOTICE" | STEP: 0 (NOT COMPLETED) |
| | 9 | CASING-IN BOOKBINDING | "OPERATOR OPERATION" | STEP: 0 (NOT COMPLETED) |
| | 10 | CUTTING | "OPERATOR OPERATION" | STEP: 0 (NOT COMPLETED) |
| | 11 | DELIVERY | "OPERATOR OPERATION" | STEP: 0 (NOT COMPLETED) |
| | 12 | E-MAIL NOTICE | "DELIVERY COMPLETION NOTICE" | STEP: 0 (NOT COMPLETED) |

FIG. 15B

| | | NUMBER OF STEPS | 10 | |
|---|---|---|---|---|
| No.1002 | 0 | PRINT DATA CONFIRMATION | "OPERATOR OPERATION" | STEP: 1 (COMPLETED) /PROCESS PRIORITY: DATE PRIORITY |
| | 1 | PRINT SETTING (Nup LAYOUT) | "OPERATOR OPERATION" | STEP: 1 (COMPLETED) |
| | 2 | PRINTER RESERVATION | "REGULAR PRINT JOB RESERVATION" | STEP: 1 (COMPLETED) /COOPERATION MODE: CONSECUTIVE PRINTING (TWO JOBS) /ONE: COLOR PRINTER |
| | 3 | | "PROOF PRINT COMPLETION NOTICE" | STEP: 1 (COMPLETED) |
| | 4 | PROOF PRINTING | PROOF PRINT COMPLETION FLAG: 0 | STEP: 1 (COMPLETED) /PROOF PRINT CONFIRMATION COMPLETION FLAG: 1 (COMPLETED) |
| | 5 | E-MAIL NOTICE | "PROOF PRINT COMPLETION NOTICE" | STEP: 1 (COMPLETED) |
| | 6 | PROOF CONFIRMATION/ AMENDMENT | POOF PRINT COMPLETION: 0 | STEP: 1 (COMPLETED) /PROOF PRINT CONFIRMATION COMPLETION FLAG: 1 (NOT COMPLETED) |
| | 7 | PRINTING | PRINTER NAME (TYPE): HIGH-SPEED PRINTER (COLOR) | STEP: 0 (NOT COMPLETED) /AUTOMATIC PRINTING PENDING |
| | 8 | E-MAIL NOTICE | "REGULAR PRINT COMPLETION NOTICE" | STEP: 0 (NOT COMPLETED) |
| | 9 | DELIVERY | "OPERATOR OPERATION" | STEP: 0 (NOT COMPLETED) |
| | 10 | E-MAIL NOTICE | "DELIVERY COMPLETION NOTICE" | STEP: 0 (NOT COMPLETED) |
| | | NUMBER OF STEPS | | |
| No.1003 | 0 | | | |
| | 1 | PRINT DATA CONFIRMATION | "OPERATOR OPERATION" | STEP: 1 (COMPLETED) /PROCESS PRIORITY: DATE PRIORITY |
| | 2 | PRINT SETTING (Nup LAYOUT) | "OPERATOR OPERATION" | STEP: 1 (COMPLETED) |
| | 3 | PRINTER RESERVATION | "REGULAR PRINT JOB RESERVATION" | STEP: 1 (COMPLETED) /COOPERATION MODE: CONSECUTIVE PRINTING (TWO JOBS) /TWO: COLOR PRINTER 2, MEDIUM-SPEED PRINTER 3 |
| | | | "PROOF PRINT COMPLETION NOTICE" | STEP: 1 (COMPLETED) |

| | | | |
|---|---|---|---|
| | 4 | PROOF PRINTING | PROOF PRINT 1 COMPLETION FLAG: 1 | STEP: 1 (COMPLETED) /PROOF PRINT CONFIRMATION COMPLETION FLAG: 1 (COMPLETED) |
| | 5 | PAPER SETTING | "DELIVERY COMPLETION NOTICE" | STEP: 0 (NOT COMPLETED) |
| | 6 | PROOF PRINTING | PROOF PRINT 2 COMPLETION FLAG: 0 | STEP: 0 (NOT COMPLETED) |
| | 7 | PROOF CONFIRMATION/ AMENDMENT | POOF PRINT COMPLETION: 0 | STEP: 1 (NOT COMPLETED) /PROOF PRINT CONFIRMATION COMPLETION FLAG: 0 (NOT COMPLETED) |
| | 8 | PRINTING | PRINTER NAME (TYPE): COLOR PRINTER (COLOR) | STEP: 0 (NOT COMPLETED) |
| | 9 | PRINTING | PRINTER NAME (TYPE): MEDIUM-SPEED PRINTER 2 (MONOCHROME) | STEP: 0 (NOT COMPLETED) |
| | 10 | E-MAIL NOTICE | "REGULAR PRINT COMPLETION NOTICE" | STEP: 0 (NOT COMPLETED) |
| | 11 | CASING-IN BOOKBINDING | "OPERATOR OPERATION" | STEP: 0 (NOT COMPLETED) |
| | 12 | CUTTING | "OPERATOR OPERATION" | STEP: 0 (NOT COMPLETED) |
| | 13 | DELIVERY | "OPERATOR OPERATION" | STEP: 0 (NOT COMPLETED) |
| | 14 | E-MAIL NOTICE | "DELIVERY COMPLETION NOTICE" | STEP: 0 (NOT COMPLETED) |
| | 0 | NUMBER OF STEPS | xx | |
| | .. | | | .. |
| No.1004 | 3 | PRINTER RESERVATION | "REGULAR PRINT JOB RESERVATION" | STEP: 1 (COMPLETED) /COOPERATION MODE: DISTRIBUTED PRINTING (TWO JOBS) /TWO: MEDIUM-SPEED PRINTER 1, MEDIUM-SPEED PRINTER 2 |
| | | | | |
| | .. | | "PROOF PRINT COMPLETION NOTICE" | STEP: 1 (COMPLETED) |
| | .. | | | .. |

FIG.15C

| ORDER ID | PRINTER NAME | JOB NAME | STATUS | JOB RECEPTION TIME | JOB SIZE | .. |
|---|---|---|---|---|---|---|
| 3001 | HIGH-SPEED PRINTER | SPECIFICATIONS | OUTPUTTING | 03/03/04 10:11:12 | 4.5MB | .. |
| 3002 | COLOR PRINTER | BROCHURE | WAITING FOR OUTPUTTING | 03/03/04 15:35:52 | 1.1MB | .. |
| 4520 | MEDIUM-SPEED PRINTER 4 | CAMERA MANUAL | WAITING FOR OUTPUTTING | 03/03/04 16:45:22 | 36.9MB | .. |
| 8520 | MEDIUM-SPEED PRINTER 5 | CAMERA MANUAL | UNDER FOR SUSPENSION | 03/03/04 17:45:22 | 15.1MB | .. |
| .. | .. | .. | .. | .. | .. | .. |

FIG.16

| PRINTER NAME | ORDER | JOB NAME | NUMBER OF JOBS | PERSON IN CHARGE | PROOF PRINTING SCHEDULED START TIME | PROOF PRINTING SCHEDULED FINISH TIME | REGULAR PRINTING SCHEDULED START TIME | REGULAR PRINTING SCHEDULED FINISH TIME |
|---|---|---|---|---|---|---|---|---|
| HIGH-SPEED PRINTER | 1001 | SPECIFICATIONS | 1/1 | KIDA○○ | 03/05/30 08:15 | 03/05/30 08:30 | 03/05/30 09:15 | 03/05/30 11:00 |
| COLOR PRINTER | 1002 | BROCHURE | 1/2 | SUZUKI○○ | 03/05/30 09:15 | 03/05/30 09:30 | 03/05/30 10:15 | 03/05/30 13:15 |
| COLOR PRINTER | 1002 | BROCHURE | 2/2 | SUZUKI○○ | 03/05/30 13:20 | 03/05/30 13:30 | 03/05/30 14:00 | 03/05/30 17:00 |
| COLOR PRINTER 2 | 1003 | MANUAL (COVER) | 1/2 | YAMADA○○ | 03/05/30 08:00 | 03/05/30 08:15 | 03/05/30 09:30 | 03/05/30 11:00 |
| MEDIUM-SPEED PRINTER 3 | 1003 | MANUAL (TEXT) | 2/2 | YAMADA○○ | 03/05/30 08:30 | 03/05/30 09:00 | 03/05/30 11:30 | 03/05/30 14:00 |
| MEDIUM-SPEED PRINTER 1 | 1004 | SEMINAR SOURCE MATERIAL | 1/2 | KIDA○○ | 03/05/30 11:15 | 03/05/30 11:30 | 03/05/30 12:15 | 03/05/30 15:15 |
| MEDIUM-SPEED PRINTER 2 | 1004 | SEMINAR SOURCE MATERIAL | 2/2 | KIDA○○ | 03/05/30 11:15 | 03/05/30 11:30 | 03/05/30 12:15 | 03/05/30 15:15 |
| ‥ | ‥ | ‥ | ‥ | ‥ | ‥ | ‥ | ‥ | ‥ |

| PRINTER NAME | HIGH-SPEED PRINTER | COLOR PRINTER | MEDIUM-SPEED PRINTER 1 | MEDIUM-SPEED PRINTER 2 | COLOR PRINTER 2 | MEDIUM-SPEED PRINTER 3 | MEDIUM-SPEED PRINTER 4 |
|---|---|---|---|---|---|---|---|
| IP ADDRESS | 200.200.200.001 | 200.200.200.002 | 200.200.200.003 | 200.200.200.004 | 200.200.200.005 | 200.200.200.006 | 200.200.200.007 |
| COLOR/MONOCHROME | MONOCHROME | COLOR | MONOCHROME | MONOCHROME | COLOR | MONOCHROME | MONOCHROME |
| THROUGHPUT | 200ppm | 80ppm | 100ppm | 100ppm | 80ppm | 100ppm | 80ppm |
| SUPPORTED PAPER SIZE | A2 TO POST CARD | A3 TO POST CARD | A3 – B5 | A3 – B5 | A3 TO POST CARD | A3 – B5 | A3 – B5 |
| DOUBLE SIDED | ○ | ○ | ○ | ○ | ○ | ○ | ○ |
| COLLATING | ○ | ○ | ○ | ○ | ○ | ○ | ○ |
| GROUP | ○ | ○ | ○ | ○ | ○ | ○ | ○ |
| STAPLES | ○ | ○ | ○ | ○ | ○ | × | × |
| SADDLE-STITCHING BOOKBINDING | ○ | ○ | × | × | × | × | × |
| PUNCHING | ○ | ○ | ○ | × | ○ | × | × |
| Z-FOLDING | ○ | × | × | ○ | × | ○ | × |
| INSERT | ○ | × | ○ | × | × | × | × |
| TABLOID | ○ | × | × | × | × | × | × |
| CUTTING | ○ | × | × | × | × | × | × |
| MAXIMUM LOAD QUANTITY | 400 SHEETS | 3000 SHEETS | 1000 SHEETS | 1000 SHEETS | 3000 SHEETS | 1000 SHEETS | 1000 SHEETS |
| PAPER FEED SLOT 1 | A4/NORMAL PAPER | A4/NORMAL PAPER | A4/NORMAL PAPER | A4/NORMAL PAPER | A4/NORMAL PAPER | A4/NORMAL PAPER | A4/NORMAL PAPER |
| PAPER FEED SLOT 2 | B4/NORMAL PAPER | B3/NORMAL PAPER | B4/NORMAL PAPER | A4/COLORED PAPER | A3/NORMAL PAPER | A4/NORMAL PAPER | A4/NORMAL PAPER |
| PAPER FEED SLOT 3 | A3/NORMAL PAPER | A4/COATED PAPER | A3/NORMAL PAPER | A3/NORMAL PAPER | A4/NORMAL PAPER | A3/NORMAL PAPER | A4/NORMAL PAPER |
| PAPER FEED SLOT 4 | A4/NORMAL PAPER | A4/THICK PAPER | A4/NORMAL PAPER | | A4/NORMAL PAPER | | |
| PAPER FEED SLOT 5 | B5/NORMAL PAPER | | | | | | |
| ... | ... | ... | ... | ... | ... | ... | ... |

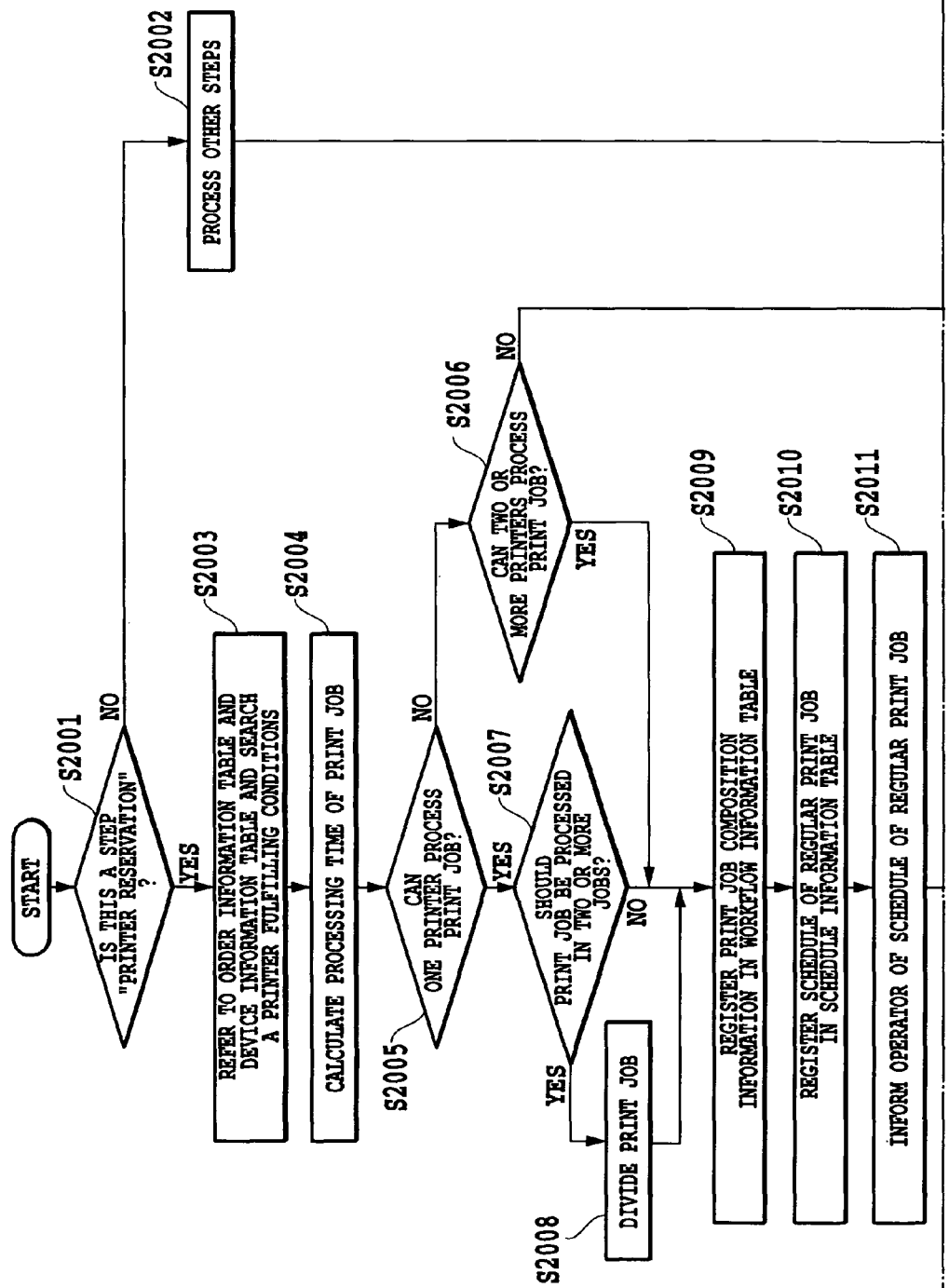

| FIG.25A |
| FIG.25B |

| ORDER ID | No.1001 | | | | |
|---|---|---|---|---|---|
| JOB SECURITY | HIGH | | | | |
| QUALITY | HIGH | | | | |
| : | : | | | | |
| PROOF INFORMATION | PROOF NO. | PROOF PRINT TIME AND DATE | UNIT | PROOF ID | TERM OF VALIDITY OF PROOF ID |
| | 001 | 04.01.02-12:34:11 | ONE COPY | 041116-0123 | 04.01.12 |
| | 002 | 04.01.02-12:34:12 | PAGE 5 TO PAGE 8 | 041116-0124 | 04.01.12 |
| | 003 | 04.01.02-12:34:13 | ONE COPY | 041116-0125 | 04.01.12 |
| | 004 | 04.01.03-12:34:14 | ONE COPY | 041116-0126 | 04.01.13 |
| | 005 | 04.01.03-12:34:15 | PAGE 125 | 041116-0127 | 04.01.13 |
| | 006 | 04.01.05-12:34:16 | THREE COPIES | 041116-0128 | 04.01.15 |
| | 007 | 04.01.05-12:34:17 | ONE COPY | 041116-0129 | 04.01.15 |

FIG.27

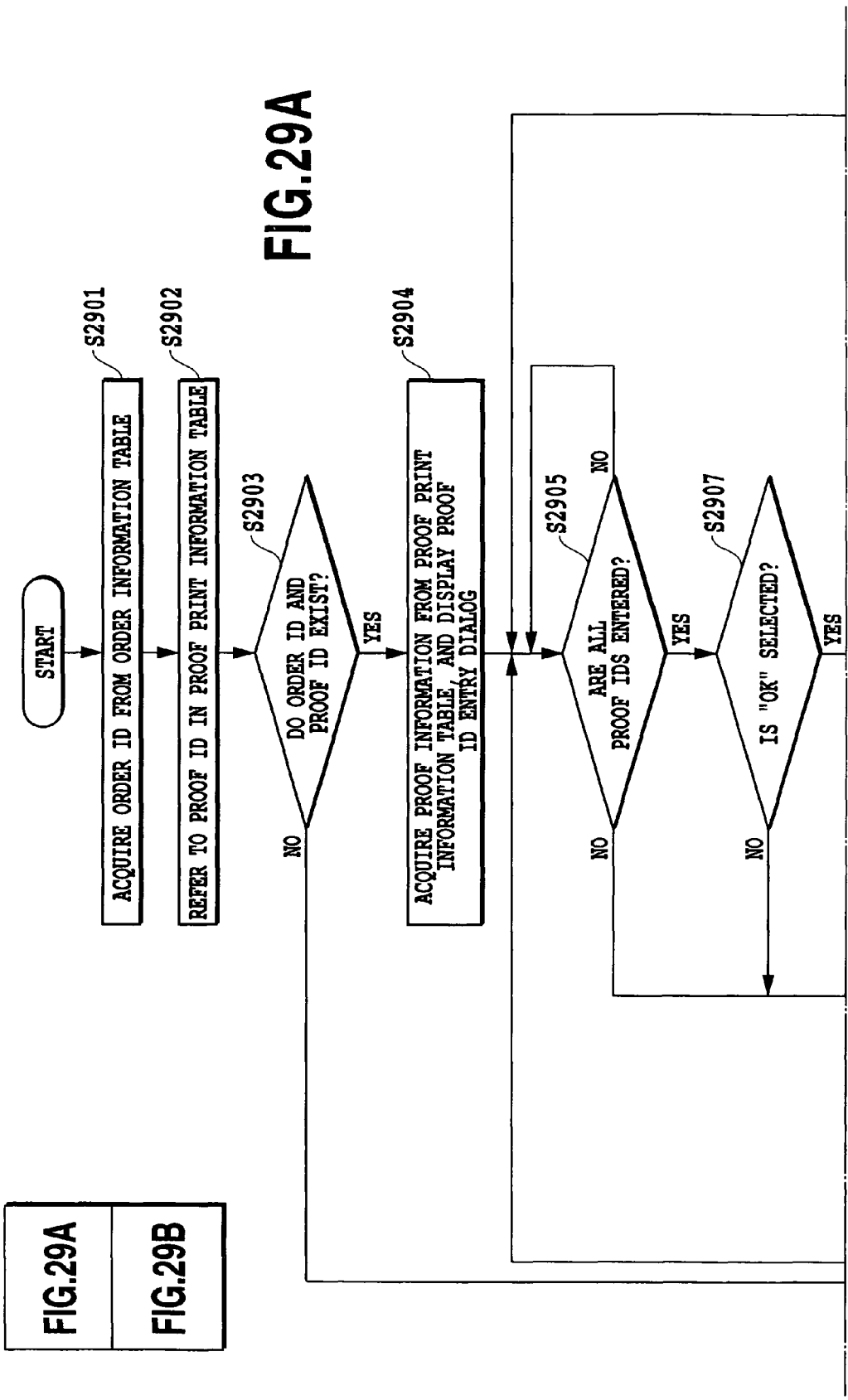

PRINT SCHEDULE CONTROL EQUIPMENT, PRINT SCHEDULE CONTROL METHOD, AND PROGRAM THEREFOR

BACKGROUND OF THE INVENTION

1. Field of the Invention

The present invention relates to print schedule control equipment, a print schedule control method, and a program therefor. More specifically, this invention relates to print schedule control equipment for executing schedule control of a device used for a regular print job and a proof print job based on a request of printing, a print schedule control system therefor, a print schedule control method therefor, and a program therefor.

2. Description of the Related Art

Conventionally, there are commercial printers (hereinafter, printing contractor) who generate printed matters on requests from customers of individual users and business enterprises. Each of such printing contractors run a business of receiving provision of print data (original copy) and instructions of a print format, the number of copies, a date of delivery, etc. from a customer, forming a printed matter, and delivering it to the customer. These printing contractors are carrying out their businesses using large-scale equipment, such as offset reproduction printing machines known from long ago.

In these days, as printing apparatuses (hereinafter referred to as a printer) of electrographic and ink jet printers are becoming more high-speed and more high-quality, there is also a form of business organization called "copy service", "printing service", "print on demand (POD) center," etc. capable of outputting and delivering in a short time.

A request of printing to these printing businesses is done as follows: the user sends a manuscript written on paper or an electronic medium, such as FD (floppy® disk), MO (magneto-optical disc), CD (compact disk)-ROM (read only memory), etc. and a printing instruction (order instruction) on which the number of print copies of the manuscript, a book-binding method, an appointed date of delivery, etc. are written to a printing company by mail or directly.

In addition, a system whereby the user gives an order of printing and sends a manuscript on line through the Internet or an intranet (a printing contractor receiving them similarly) has been put to practical use. The printing contractor receives a user's request and forms in-house printing instructions. Then the printing contractor performs printing with a printer connected to a work computer and bookbinding according to the printing instruction and delivers the formed printed matter to the customer to complete operations.

These printing contractors that perform printing entrusted from users must complete printing with stable quality in time for an appointed date of delivery surely. Further, in a large-scale printing center, two or more operators have to process sequentially a lot of printing requests (orders) in parallel using various and versatile printers and work computers. Therefore, resources of human workers (operators who conducts operations), equipment, etc. must be utilized effectively as much as possible. That is, it becomes important how to build up a time table (schedule) that can utilize the resources at their maximum, how to run the schedule, and how to put it into automatization considering an appointed date of delivery and the cost.

However, conventionally, at the time of reception of a new order or alteration of an existing order, each operator is requested to consider a processing procedure (workflow) based on his/her experience, adjust schedules of resources, inform persons in charge of necessary information, and manage printing by means of a hand-written schedule (reservation table) and the like. That is, since printing was carried out entirely by human work, there were problems that it was extremely tedious and inefficient, giving much load to operators conducting print processing, and the work was not automatized. In addition, there is a problem of increase in cost (time and consumable supplies) due to occurrence of non-conformal printed matters that could not be delivered due to operator's human error in setting.

Nowadays, these fields are actively introducing a system that automatically creates and controls schedules of using resources with a computer, and software. Moreover, as shown in JP-A No. 306655/2001 and JP-A No. 63005/2002, the following systems are also being considered: a system that supports and automatizes scheduling of resources, which is the most time-consuming process step; and a system that automatizes print processing.

This scheduling system keeps a plural pieces of order information (print appearance, number of copies, paper size, print data, appointed date of delivery, etc.) and resource information (load situations of operators, capabilities and working situations of apparatuses, such as printer). When a new order comes out, the system automatically creates and manages an optimal schedule of print jobs based on information currently kept. When alteration occurs in conditions of existing orders, print jobs, situations of resources (fault of a printer etc.), the systems automatically conducts readjustment based on schedules of print jobs associated with it. And the system executes print jobs automatically according to created and controlled schedules.

Conventionally, in the case where print jobs are automatically scheduled and executed in a scheduling system, if printing is started without various confirmation operations and mistakes are found after completion of the printing, a lot of wastes may be generated in printing time (occupied time of a printer), operator's working hours, consumable supplies, adjustment work for reprinting, etc., which leads to inefficiency and increase in the cost. That is, when the scheduling system executes automatic print jobs, it is important to confirm in advance the contents of data (conformity to its order), incompleteness of data (missing and deformation), print results (setting of quality and output).

However, with preview display on a host, it is impossible to obtain completely the confirmation of print setting, print quality, location of printed letters (page layout of front location and back location in the case of double-sided printing). Therefore, one of the most assured methods to obtain confirmation is proof printing (printing one copy or a few copies for trial) performed in an environment in which the printing will be executed finally as confirming means. This is an operation step that is practiced surely as a basic rule in the field where high-volume printing is executed and/or print quality is considered.

Conventionally, printing contractors can perform printing work surely and efficiently introducing a scheduling system as described above after performing proof printing to confirm that there is no problem in the printed matter. Moreover, the scheduling system mitigates operator's working load and improves the quality of the printed matters.

However, the conventional scheduling system does not consider specially schedule management of proof print jobs. In this proof printing, any devices (printers and finishing apparatuses) may be used to obtain printed matters in a sense of simply obtaining printed matters. However, when the operator wishes to confirm particular parts that will be different depending on devices such as color impression, locations of staples, etc., the device that will process the regular print job must be used for the proof printing. However, since conventionally there did not exist means for scheduling the proof printing and regular printing in a cooperative manner, it is necessary for the operator to conduct following works: scheduling the regular print job in the future; designating devises; and subsequently performing proof printing with the designated devises. Moreover, there is a case where a target printer is being used by other jobs in performing proof printing, the proof print job cannot be registered in the schedule. Consequently, it becomes necessary to alter a schedule of automatic regular print job, causing a drop in the working efficiency.

Moreover, the conventional scheduling system determines the automatic schedule (print start and end times) of the regular print job simply considering a print processing time required for a part of the printed matter, and does not consider working hours for the operator to confirm a result of the proof print and, as needed, to alter the print setting and adjust print data. For example, when an automatic regular print job is scheduled and proof printing is completed just before the schedule, the automatic regular print job will be executed without reflecting the confirmed result of the proof print. Moreover, it is necessary to alter a schedule of the automatic regular print job in order that the operator confirms the print result in advance. Therefore, in order to conduct automatic scheduling of proof printing, it is necessary to give time allowance between the schedule of proof printing and that of the regular print job. Consequently there is a problem that without its consideration, the effect of the proof printing itself is low and it might degrade working efficiency.

Moreover, the conventional scheduling system does not consider influence of the proof printing on the quality of other automatic regular print job. For example, a printed matter of order A for printing 400 copies of color brochures each having 10 pages counts 4000 sheets in total. If this job is executed as one print job, the print processing will be stopped when printed papers reach the maximum loading number of papers (3000 sheets) for the outlet of a color printer. Moreover, regarding other print jobs, the color printer becomes unusable, which is inefficient. For this reason, the color printer is scheduled to output an automatic regular print job A1 of 200 copies (2,000 sheets) between 1300 and 1400 and an automatic regular print job A2 of 200 copies (2,000 sheets) between 1500 and 1600. The printing will be done in a mode where the operator is expected to remove the printed matter of the automatic regular print job A1 from the outlet during a time between 1400 and 1500.

Here, it is assumed that a print order B of a color manual is scheduled in the same color printer and the operator schedules a proof print job BP in a time between 1400 and 1500 considering only a print processing time for a part of the printed matter. Here, for this proof print job BP, it is further assumed that an attribute directing proof printing after calibration (process of conducting color compensation of the printer) is set.

Then the color printer executes the automatic regular print job A1 (printing), performs the proof print job BP after conducting calibration, and subsequently executes the automatic regular print job A2 (printing). As a result, due to the calibration of the proof print job BP, the printed matter of the automatic regular print job A1 and the printed matter of the automatic regular print job A2 that must exhibit the similar color impression originally will exhibit different color impressions. That is, there is a problem that the print job of proof printing affects the quality of other print jobs.

Moreover, the conventional scheduling system does not consider relation with other print jobs (procedures, steps, etc.). For example, for the purpose of reduction of the cost and speed-up of printing, there is often used a mode in which only a cover (back cover) is printed with a color printer and the text is printed with a monochrome printer, and a color printed matter and a monochrome printed matter are saddle-stitched for bookbinding in a mixed mode finally. When a printing center receives a manuscript of an order (print order C) of forming 300 copies of a seminar material in this form, first only 300 copies of its front cover (back cover) are printed. After completion of printing with a color printer, the printed matter of the front cover (back cover) is loaded at the inserter of a monochrome printer (the inserter is a feeding slot on which a paper to be inserted into an arbitrary position of a printed matter is loaded. The inserter can be set to an arbitrary feeding stage on which print papers are loaded. Next, in a monochrome printer, when one copy of the text is printed, the front cover (or back cover) printed in color for one copy is fed from the inserter to incorporate with text papers and is subjected to saddle stitching for bookbinding to complete one copy of printed matter. After that, the similar processing is repeated to complete printing of 300 copies.

In the case of a workflow where a printed matter is completed using a plurality of printers in a cooperated manner (consecutively) in printing procedures (steps) like this, it is also necessary to perform proof printing in the similar work procedures (steps). Because of this, in the case where schedules of all printers (in the example described above, two) used in the work procedures (steps) are not associated (i.e., proof printing of a print job assigned to a color printer and proof printing of a print job assigned to a monochrome printer are scheduled independently), there occurs a waiting time when the printing proceeds to the next step of a confirmation step or the like. Moreover, there may occur a situation where steps are reversed, resulting in a situation of uncompleted works, bringing a problem that the working efficiency is impaired.

Moreover, for example, when an order (print order D) of printing a high-volume copies (3000 copies) with a plurality of printers in a distributed manner is submitted, there can be a case where the print job is scheduled so as to be divided for a plurality of printers and printing is performed in parallel in a distributed manner as follows:

2000 copies by a high-speed printer A; and 1000 copies by a medium-speed printer. For this reason, it is necessary to perform proof printing with two printers. However, if their schedules are not associated with each other, there can be a case where confirmation works of proof printing need to be performed in different time slots, bringing a problem that the working efficiency is impaired.

Moreover, in the conventional scheduling system, confirmation result of proof printing that is an important process step in the workflow and a schedule of the automatic regular print job are not cooperated. That is, determination of confirmation result and final scheduling of the automatic regular print job is done in a mode where a human worker (mainly an operator) does these tasks. Therefore, for example, when the operator prioritizes an appointed day of delivery and has determined (registered) a printer used for printing and a schedule (start time and date and a use period) of executing automatic regular print job in advance (i.e., case where a proof printed matter is sent to an order client to receive confirmation, but it is expected that an answer is delayed and other cases), the automatic regular print job will be executed when the date comes to a predetermined time and date even when the confirmation work has not been completed. Moreover, when the operator does not fully understand operating procedures of the scheduling system, a human operational mistake (operator's failure in confirmation after scheduling, erroneous registration without confirmation, etc.) will be likely to occur. Therefore, the conventional system is poor in the stringency of the important confirmation work and could not solve sufficiently problems that existed before the scheduling system is introduced.

Moreover, in the conventional scheduling system, a printer to be used and a schedule (start time and date and a use period) whereby the automatic regular print job is executed are not determined until a confirmation step is completed. For this reason, there is a problem that the working efficiency becomes poor because scheduling (assignment of operators, use reservation of mechanical resources) of working steps (printer or inserter installation to a supply inlet of another printer, processing of a bookbinding machine, processing of a cutting machine, processing of packaging) after the print step in the workflow are delayed. The efficiency degradation is evident especially in environments where operators specialized in respective steps (printing setting step, printing execution step, bookbinding step, cutting step, packaging step, etc.) are arranged for division of printing.

Moreover, if there occurred an excess in the processing time of an arbitrary automatic regular print job or a failure of a printer and rescheduling becomes necessary, another automatic regular print jobs following the automatic regular print job are adjusted in a mode of giving additional delay. Furthermore, when the automatic printing cannot be executed because conditions are not satisfied or because of other reasons in automatic scheduling, the printing state reduces to a printer non-assigned state (a suspended state of no schedule where an outputting printer and a date to perform printing are not determined and the regular print job will not be executed automatically). For this reason, rescheduling is conducted always in a direction of delaying a start time, i.e., in a direction of suspending the automatic regular print job, which brings a problem that the working efficiency becomes degraded.

Moreover, when an order is for high-volume printing or requirement of print quality is high, the printing contractors use proof printing heavily. Such a case creates a situation where a lot of outputted matters are generated since the proof printing is performed repeatedly as needed. However, strict control is not given to the printed matters of proof printing that is excluded from delivered goods for customers. Moreover, there exists no system for supporting management of the outputted matters of proof printing and a processing flow. As a result, the outputted matters of proof printing are often left uncontrolled in a stack. Therefore, in the case where a target order is a security job (a job of an order that the customer requires security protection, consideration against information leakage, and privacy regarding the contents of a printed matter), stacking and uncontrolled leaving of the printed matter of proof printing causes a problem and there is a problem of ensuring its security.

SUMMARY OF THE INVENTION

This invention was devised in view of such problems, and its object is to provide a printing schedule control equipment capable of conducting a scheduling operation of print processing of a regular print job and a proof print job for the regular print job, a print schedule control method therefor, and a program therefor.

In order to attain such objects, the print schedule control equipment of this invention is a print schedule control equipment that, based on print information that instruct printing, controls a schedule of a first print job (regular print job) performing the instructed printing and a schedule of a second print job (proof print job) performing printing for confirmation that precedes the first print job, comprising:

schedule information saving means for registering one or more data sets each of which is composed of a schedule of the first print job and a schedule of the second print job that correspond to the print information and information of available printers;

printer information saving means for managing information of one or more printers; printer searching means for, when reserving the first print job and the second print job based on specific print information that instructs printing, searching information of a printer corresponding to the specific print information from the printer information saving means; and schedule registering means for, when referring to the data set corresponding to information of a printer that is registered in the schedule information saving means and searched by the printer searching means, the first print job based on the specific print information can be assigned in an idle time of the printer that allows fulfillment of a date of delivery included in the specific print information and when the second print job based on the specific print information can be assigned in an idle time of a printer corresponding to the data set that precedes a schedule of the first print job, registering a data set composed of the schedule of the first print job and the schedule of the second print job in the schedule information saving means in such a manner as to establish a correspondence with the specific print information and information of a printer searched by the printer searching means.

Here, the print schedule control equipment may further comprise reservation impossibility informing means for, when the schedule registering means cannot assign the first print job or when it cannot assign the second print job, informing that the reservation is impossible.

Moreover, in order to achieve the above-mentioned object, the print schedule control equipment of this invention is print schedule control equipment that controls the schedule of the regular print job performing the instructed printing and the schedule of the proof print job performing the printing for confirmation that precedes the regular print job based on print information that instructs the printing, comprising: determining means for acquiring information regarding proof of the regular print job and determining whether a setting of executing a proof print job for confirmation in advance of the regular print job is established; saving means for, when a setting of executing the proof print job for confirmation is established for the regular print job, saving the proof identification information in the proof print information saved area in processing the proof print job for the regular print job; and print job controlling means for controlling the regular print job corresponding to the proof print job so as not to be executed until proof identification information that agrees with the proof identification information corresponding to the proof print job saved in the saving means is inputted thereinto.

According to this invention, the print schedule control equipment becomes capable of registering schedules of the regular print job and the proof print job in a cooperation manner, which increases efficiency of scheduling work in the print processing.

Moreover, when a schedule of the proof print job cannot be registered, it is not necessary to change the schedule of the regular print job, regarding the both schedules of the regular print job and the proof print job as impossible tasks; therefore efficiency of the scheduling work of the print processing is increased.

Moreover, it becomes possible to control a printed matter of proof printing for a print job with a security setting; therefor, it is possible to increase the security and keep the print quality. Furthermore, it becomes possible to suppress an unnecessary output of proof printing.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 is a diagram showing the relationship of FIGS. 5A and 5B;

FIGS. 5A and 5B are diagrams illustrating a GUI of a device scheduler of the embodiment to which this invention can be applied;

FIG. 8 is a diagram showing the relationship of FIGS. 8A and 8B;

FIGS. 8A and 8B are diagrams illustrating a GUI of a workflow editor of the embodiment to which this invention can be applied;

FIG. 10 is a diagram showing the relationship of FIGS. 10A and 10B;

FIGS. 10A and 10B are diagrams illustrating a GUI of a device scheduler of the embodiment to which this invention can be applied;

FIG. 12 is a diagram illustrating a GUI of a device manager 605 of the embodiment to which this invention can be applied;

FIG. 14 is a diagram showing the relationship of FIGS. 14A to 14C;

FIGS. 14A to 14C are schematic diagrams showing an example of the configuration of an order information table of the embodiment to which this invention can be applied;

FIG. 15 is a diagram showing the relationship of FIGS. 15A to 15C;

FIGS. 15A to 15C are views showing one example of the contents saved in a workflow information table of the embodiment to which this invention can be applied;

FIG. 16 is a diagram showing one example of the contents saved in a job information table of the embodiment to which this invention can be applied;

FIG. 17 is a diagram showing one example of the contents saved in a schedule information table of the embodiment to which this invention can be applied;

FIG. 18 is a diagram showing one example of the contents saved in a device information table of the embodiment to which this invention can be applied;

FIG. 20 is a diagram showing the relationship of FIGS. 20A and 20B;

FIGS. 20A and 20B are flowcharts showing the contents of processing of a program of the print server software of the embodiment to which this invention can be applied;

FIG. 23 is a diagram showing the relationship of FIGS. 23A and 23B;

FIG. 24 is a diagram showing the relationship of FIGS. 24A and 24B;

FIG. 26 is a diagram showing the relationship of FIGS. 26A and 26B;

FIG. 27 is a schematic diagram showing an example of the configuration of a proof print information table of the embodiment to which this invention can be applied;

FIG. 29 is a diagram showing the relationship of FIGS. 29A and 29B;

FIGS. 29A and 29B are flowcharts showing the contents of processing of a program of the print server software of the embodiment to which this invention can be applied;

DETAILED DESCRIPTION OF PREFERRED EMBODIMENTS

First embodiment

Hereafter, embodiments to which this invention can be applied will be described with reference to Figures will be described in detail. Incidentally, parts having the same functions are designated with the similar numerals and repeated explanation is omitted.

(Equipment Configuration)

Figure 1:
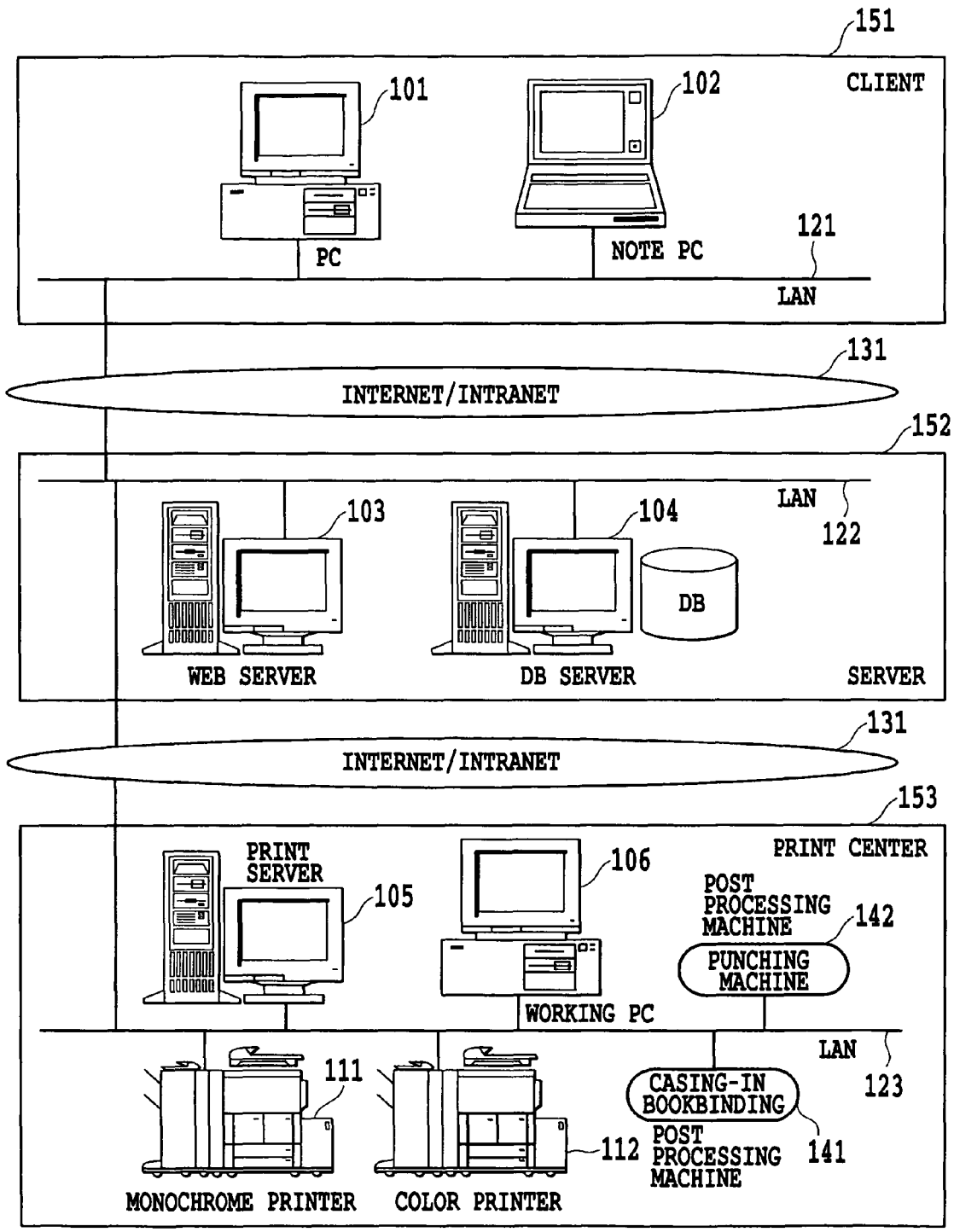
FIG. 1 is a diagram showing an overall configuration of a printing system of an embodiment to which this invention can be applied.

FIG. 1 is a diagram showing an overall configuration of a printing system of this embodiment. Note that environments of the total printing system in the following description is for making description of this embodiment easy to understand, and this invention is not limited to these environments.

In FIG. 1, clients 151 show a client of a note-book PC 102 on a normal user premise connected to the Internet and a client of a business PC 101 connected to in-house intranet installed in house.

Servers 152 shows an WEB server 103 that is a computer system for sending a print request and providing the contents of submitted manuscript and a DB (database) server 104 for saving a print request that is sent therein as an indenture (order card) and saving a manuscript that is submitted thereinto electronically installed in the equipment. Here, although it is possible to arrange the WEB server and the DB server in one case, in this invention the servers are separately arranged in two cases for the sake of convenience.

More than one printing center 153 can exist for the server 152. These print servers 12 are distributed and linked by the server 152 based on information of printers installed in the printing centers 153. The printing center 153 collects order cards and manuscripts saved in the server 152 from the DB server 104 periodically. In the printing center 153 the following computers and machines are disposed: a print server 105 that is a computer system for providing various services of the print system related to this invention; a working PC 106 that allows an operator to operate various services provided by the print server 105 using GUIs (graphical user interfaces); a monochrome printer 111 and a color printer 112 that serve as actual output devices; and finally a post-processing machine 141 (glued-on cover bookbinding machine) and a post-processing machine 142 (punching machine) that are used after printing. Needless to say, a configuration and an environment of the printing center are not limited to the above-mentioned.

In the example of this embodiment, network connection through the Internet/Intranet 131 is established between the client 151 and the server 152 and between the server 152 and the printing center 153. Usually, the Internet connects the client 151 and the server 152 in most cases and the Intranet using a dedicated line connects the server 152 and the printing center 153 in most cases. Not being limited in such environments, this embodiment can be applied even to an environment where the server 152 exists in the printing center 153.

A general browser for browsing submitted contents that the WEB server 103 provides is installed in the note PC 102 and the PC 101 that are the clients 151. Moreover, the PCs 102 and 101 can upload manuscript data using the submitted contents.

The WEB server 103 is a WEB server for providing the above-mentioned submitted contents and is equipped with an edit control for inputting print appearance, such as specifications of bookbinding, print settings, such as the number of copies and paper size, appointed date of delivery, client information, a delivery destination, etc., and a file assign control for uploading manuscript data, as the submitted contents. Here, calculation of charge depending on inputted request contents, fixation processing of input items, etc. are realized by a service module operating on the WEB server 103, but its details are omitted because it is based on common logic. Moreover, the WEB server 103 saves an indenture recording a fixed print request (on which the contents of a print request and a filename of manuscript data are written) and a manuscript data file in the DB server 104.

A general database management system is installed in the DB server 104. The system enables the DB server 104 to send a desired indenture and manuscript data in response to a data acquisition request from the print server 105 that will be described later. A DB schemer not illustrated mainly consists of tables of a printing center master (having information of locations, contact addresses, etc. and having a device master (device configuration information of color/monochrome printers, the number of printed sheets, et.), a post processing machine master (information of a glued-on cover bookbinding machine, a punching machine, etc.), and the like. The DB server 104 refers to tables of this DB schemer, which enables the print server 105 in the printing center 153 to receive an order assigned to its own printing center.

The print server 105 receives a notice of order fixation from the WEB server 103 and collects an indenture and a manuscript data file from the DB server 104. At the same time, later-described print server software for conducting processing according to the collected indenture starts to operate. The print server software will be described later.

The print server software consists of several functions of:
Order manager,
Workflow editor,
Workflow manager,
Job manager,
Device scheduler,
Device manager, etc.

The operator can make the working PC 106 display a menu screen (not illustrated) of a viewer (data displaying software) of a viewer of print server software, select one or more above-mentioned functions from the menu screen with a pointing device etc., and activate them.

The working PC 106 is a working computer that takes out a manuscript data file saved in a console for controlling various services provided by the print server 105 with GUIs and the print server 105, activates a predetermined application, adjusts print appearance, and perform printing according to specified print settings. A viewer that allows the working PC 106 to communicate with print server, perform screen display based on the information, and instruct the print server software of the print server 105 is installed in the working PC 106.

Although an installed configuration of the monochrome printer 111 and the color printer 112 differs for each printing center 153, generally the printing center 153 is often configured to have a combination of a high-speed monochrome printer and a high-quality color printer. They are all scheduled by the device scheduler of the print server 105.

The post-processing machine 141 and the post-processing machine 142 are machines for post-processing papers outputted from the above-mentioned printers. They include a glued-on cover bookbinding machine, a punching machine, a stapling machine, ring bookbinding machine, etc. They can collect situation statuses by connection with a network. Moreover, they have different installation configurations for each printing center 153 like printers. It is needless to say that this embodiment is workable even in an environment where they are not connected with each other through a network, and the embodiment is not limited to the above-mentioned environment.

Figure 2:
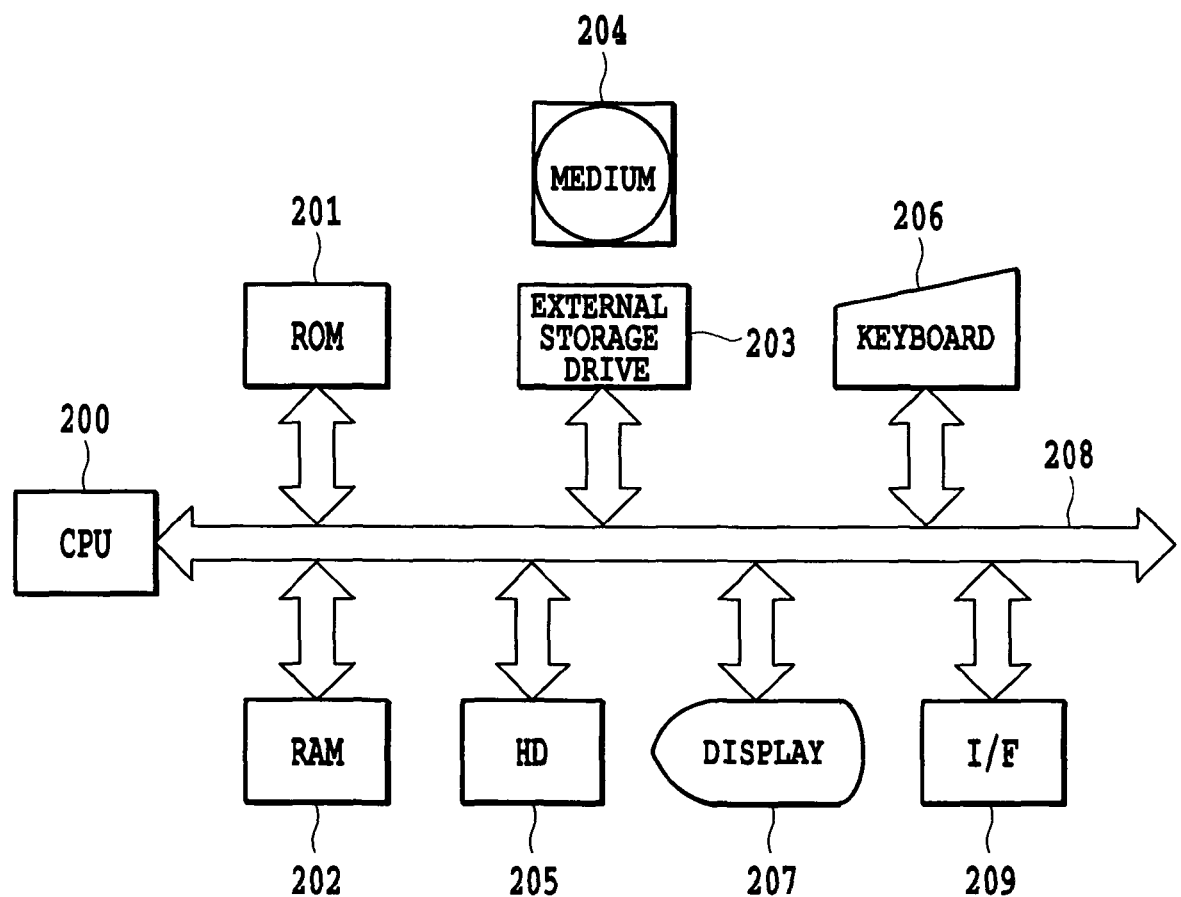
FIG. 2 is a block diagram showing an outline configuration of hardware of a computer of the embodiment to which this invention can be applied.

FIG. 2 is a block diagram showing an outline configuration of hardware of a computer applicable to the print server 105. Hereafter, with reference to FIG. 2, a hardware configuration of the print server 105 for providing various services of the printing system of this embodiment will be described.

A CPU (central processing unit) 200 executes application programs, printer driver programs, an OS (operating system), network printer control programs, etc. that are saved in a HD (hard disk) 205, and controls RAM 202 so as to save temporarily information and files necessary for execution of programs. ROM (read only memory) 201 saves programs, such as a basic I/O (input/output) program, and various data, such as font data used in processing documents and data for templates. The RAM 202 functions as main memory of the CPU 200, a work area, etc.

Figure 4:
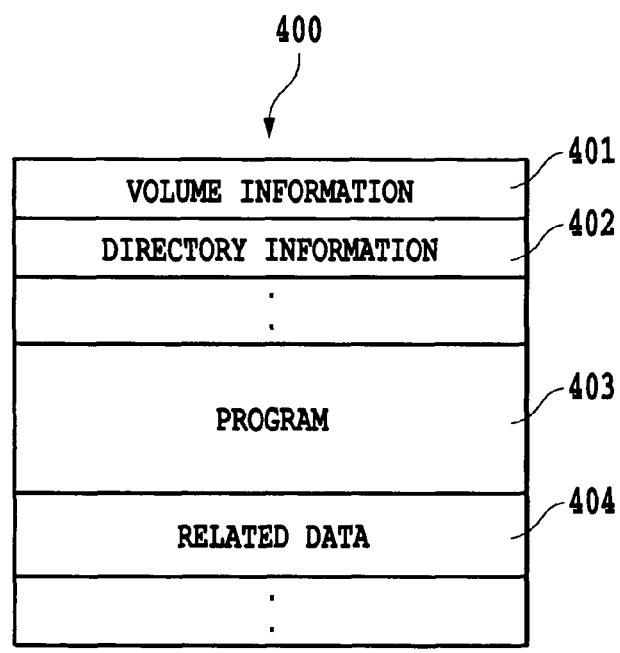
FIG. 4 is a configuration diagram of the contents saved in a medium of the embodiment to which this invention can be applied.

The external memory drive 203 can load a program etc. saved in a medium 204 into the print server 105. The medium 204 saves a print server software program to be described later and related data. FIG. 4 shows a composition of saved contents (to be described later). The HD 205 saves the application programs, the printer driver programs, the OS, a control program, programs related to them, being capable of saving various data.

A keyboard 206 allows the operator to input instructions of control commands for controlling a device to the computer for instruction. The operator can enter a command and information into the computer through a pointing device (not illustrated) or through other input devices (not illustrated), such as a microphone, other than the keyboard 206. These input devices are often connected with the CPU 200 through a serial port interface (not illustrated) combined with a system bus 208. Alternatively, the input devices may be connected through other interfaces, such as a parallel port, a USB (Universal-Serial-Bus), etc.

A display 207 displays a command entered from the keyboard 206, a state of a printer, etc. The system bus 208 controls a data flow in the computer. A network interface (hereinafter referred to as I/F) 209 is a communication interface for establishing connection to a local area network (LAN) or the Internet. Incidentally, the configuration shown in FIG. 2, except description related to print server software, can be applied to other computers, such as the WEB server 103, the DB server 104, and the working PC 106.

Figure 3:
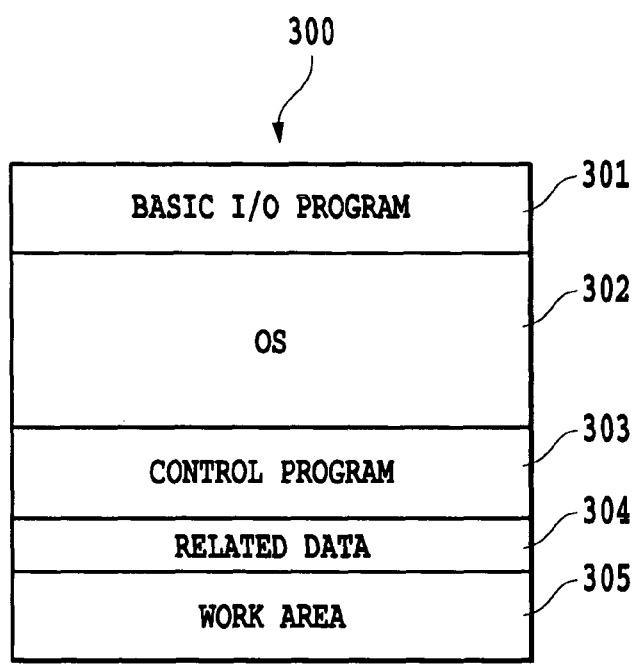
FIG. 3 is a diagram showing a memory map in a state where a program of print server software of the embodiment to which this invention can be applied is loaded into RAM, becoming executable.

FIG. 3 is a diagram showing a memory map in a state where a later described program of the print server software of this embodiment is loaded into the RAM 202 and becomes executable. Although this embodiment shows an example in which a program and related data are directly loaded into the RAM 202 from the medium 204, a necessary related program etc. may be loaded from the HD 205 into the RAM 202 every time the program of this embodiment is made to operate from the medium 204 other than this example. Moreover, the medium 204 that saves a program of the print server software of this embodiment therein may be a FD (floppy® disk), a CD (compact disk)-ROM, a DVD (digital versatile disk), ICs (integrated circuits), and a memory card, etc.

It is also possible that a program of the print server software of this embodiment is saved in the ROM 201, the print server is configured to comprise this as a part of its memory map, and the CPU 200 executes it directly. The reference numeral 301 in the figure designates a basic I/O program. This program has an IPL (initial program loading) function of loading the OS into the RAM 202 from the HD 205 and starting the operation of the OS and the like. Furthermore, an OS 302, a control program 303, and related data 304 are expanded onto the RAM 202, respectively, and a work area 305 where the CPU 200 executes the program of the print server software of this embodiment is reserved.

Next, in FIG. 4, the numeral 400 is the data contents of the medium 204, the numeral 401 is volume information showing information of the data, the numeral 402 is directory information, the numeral 403 is a program of the print server software of this embodiment, and the numeral 404 is related data thereof. Processing related to the print server software in this embodiment 1 is conducted according to procedures shown in a later-described flowchart of FIGS. 19 to 23.

(Description of Operation)

Figure 6:
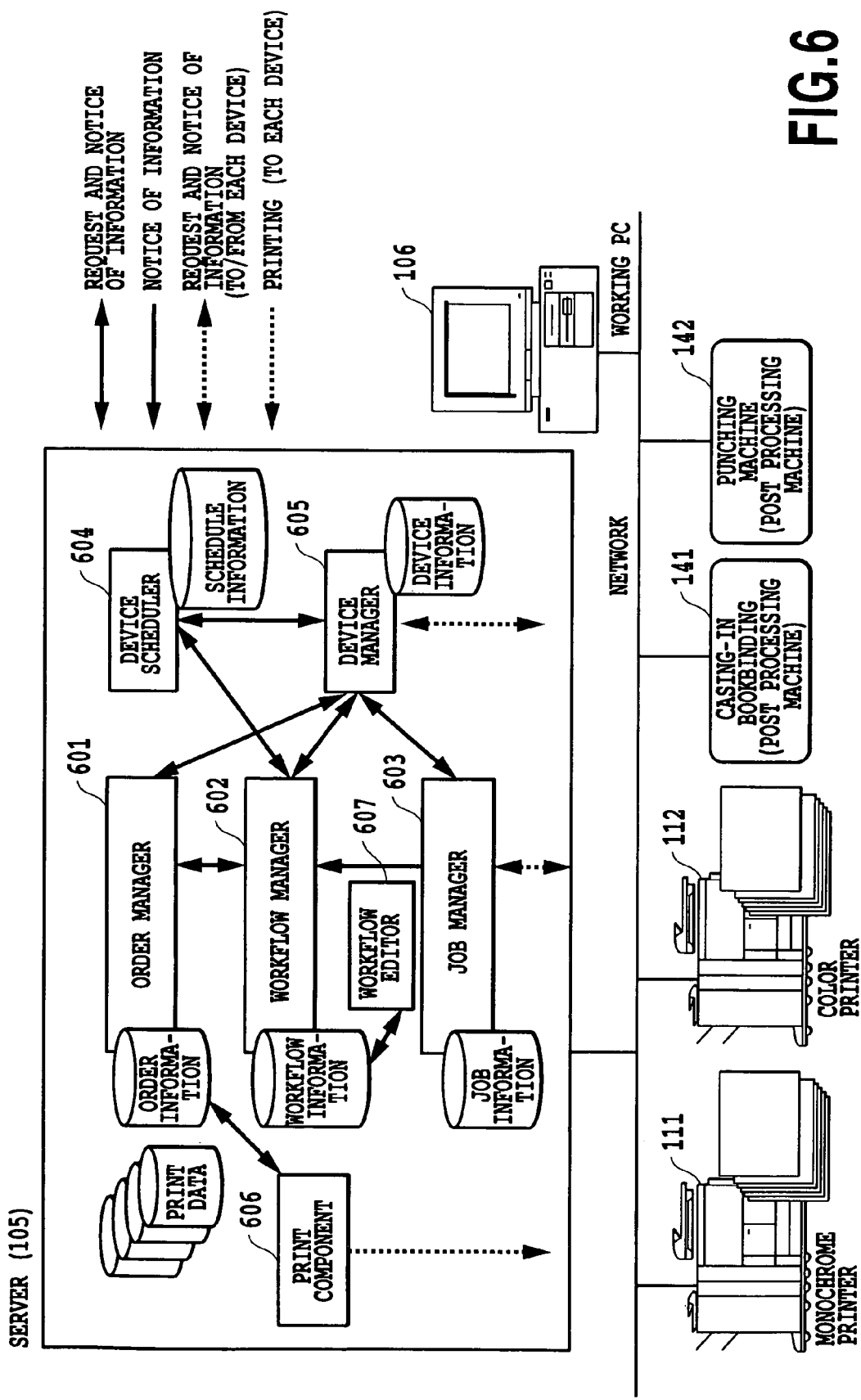
FIG. 6 is a block diagram showing the configuration of the print server software of the embodiment to which this invention can be applied, on a functional module basis.
Figures 7, 7A:
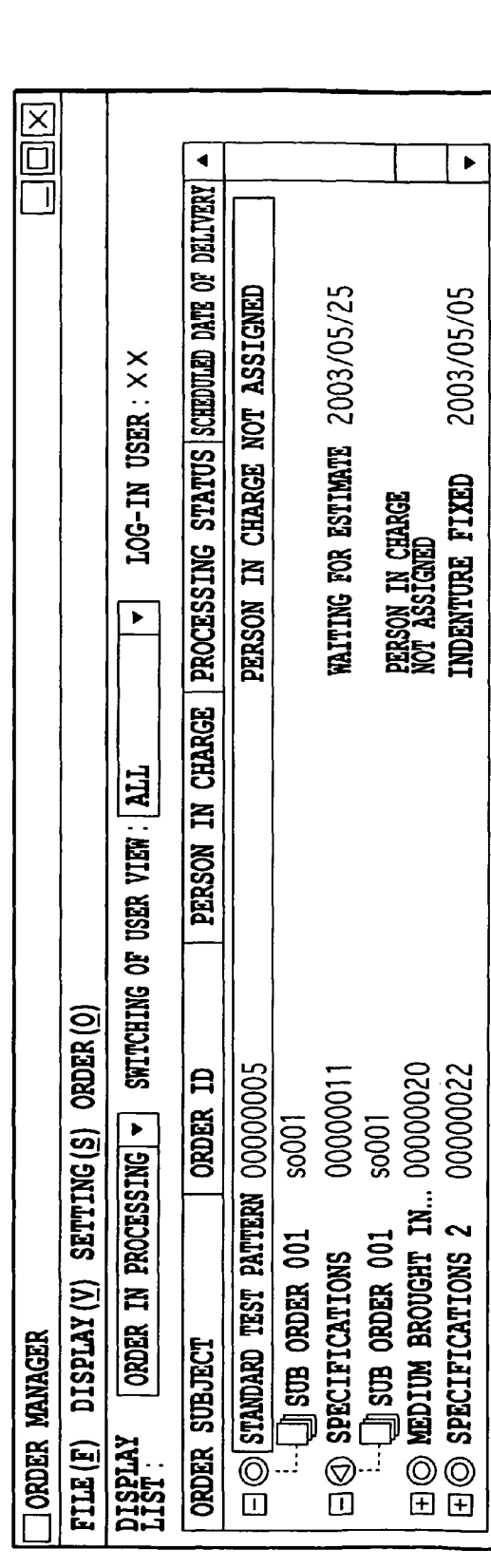
FIG. 7 is a diagram showing the relationship of FIGS. 7A and 7B.
FIGS. 7A and 7B are diagrams illustrating a GUI of an order manager of the embodiment to which this invention can be applied.
Figure 7B:
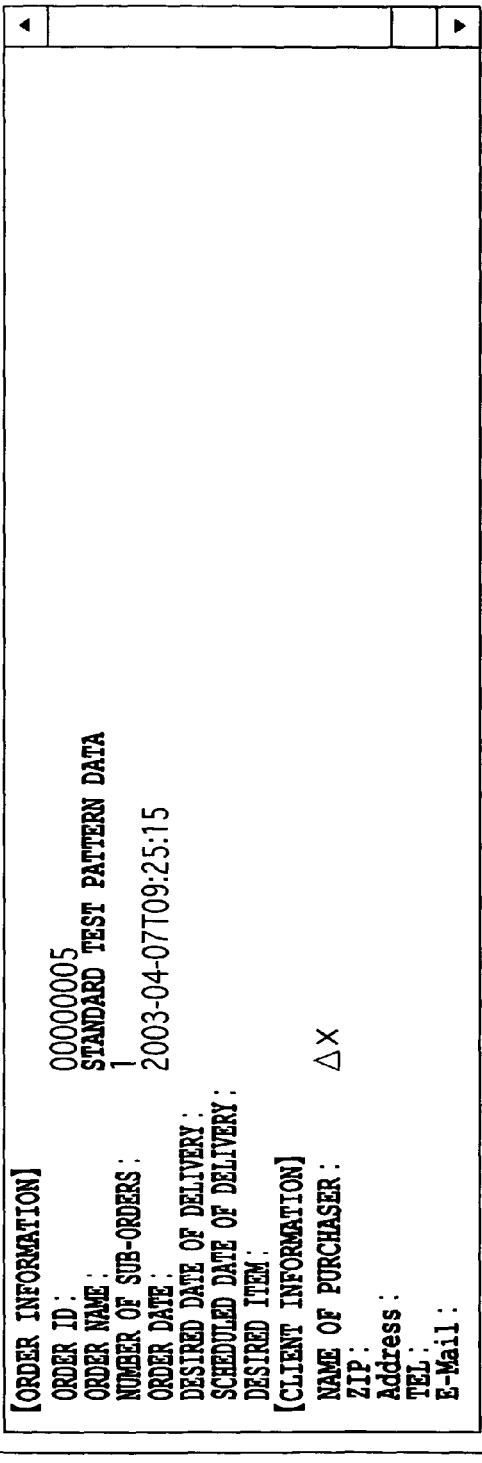

FIG. 6 is a block diagram showing the print server software that is executed by the CPU 200 of the print server 105 in this embodiment using its functional modules. The numeral 601 in the figure is an order manager that is a module for managing a submitted order and that displays a GUI as shown in FIGS. 7A and 7B later described when it is activated from a viewer of the working PC 106. The order manager 601 collects an indenture (order card) and a manuscript data file from the WEB server 103 and the DB server 104 described above, and saves the manuscript data file in the HD 205 of the print server 105 as print data. The order manager 601 extracts print information from the indenture, registers order information composed of these pieces of information and an order ID of the order assigned to it that is necessary for printing in an order information table, and saves the table in the HD 205 of the print server 105. FIGS. 14A to 14C are examples of a composition of the order information table, showing one example of the contents saved. Although not illustrated in FIGS. 14A to 14C, for example, the existence of an instruction of proof printing is also registered in the whole order information of the order information table.

A GUI (to be described later), as shown FIGS. 7A and 7B, of the order manager is equipped with a list display screen showing an outline situation of the order based on these pieces of order information and a tag display screen showing detailed information of the order, which enables the operator to confirm the progress of the order by viewing this GUI. Moreover, the order manager 601 uploads the same order information to the WEB server 103 any time at timing of status alteration. By this procedure, the WEB server 103 can provide a user with the same information using HTML (Hyper-Text-Markup-Language) on an unillustrated processing situation contents screen. For security protection, this order information is maintained until printing is completed and a print is delivered, but is eliminated after delivery.

FIGS. 7A and 7B show a GUI of the order manager 601, and for the sake of convenience it is shown as an example of an application operating on the OS of Windows® series manufactured by Microsoft Corporation. However, the GUI may be HTML-base WEB contents (same is true in other illustrated GUIs). On the list screen of an upper part of the screen, outline of the order ID (identification) whereby an order is identified, a person in charge (operator), etc. and a processing status are displayed. When the operator selects one of orders with a pointing device etc., details of the order information will be displayed on the tab screen that is a lower part of the screen. The displayed contents include items of print setting, such as print appearance, etc. in the order information in FIGS. 14A to 14C.

Figure 8B:
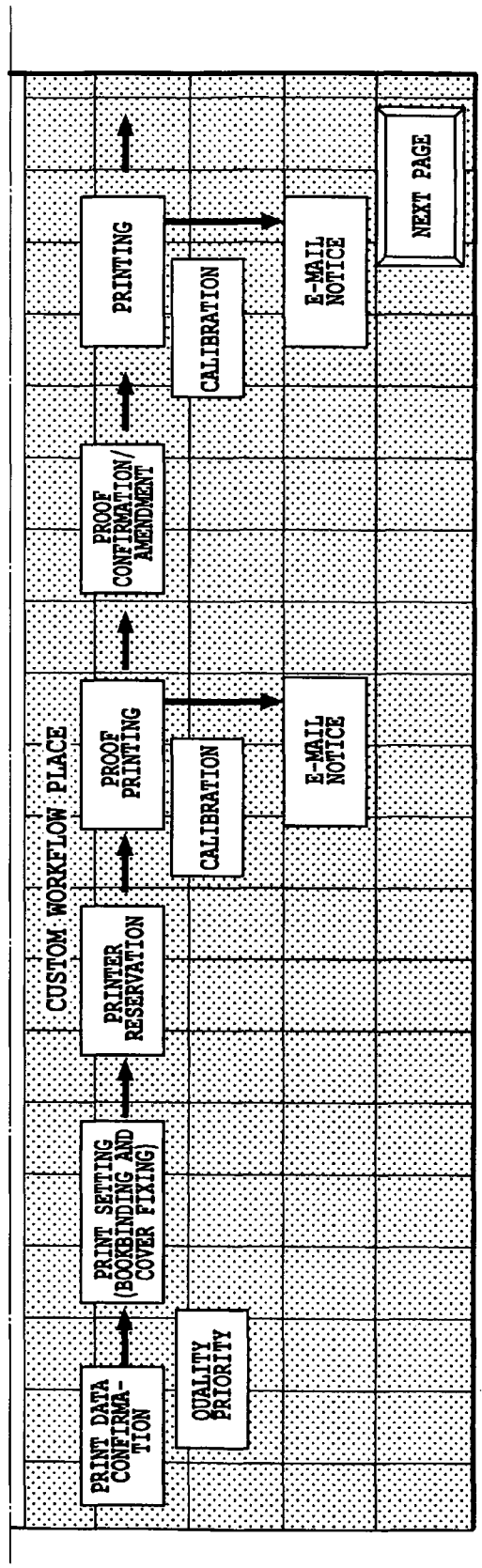

FIGS. 8A and 8B are diagrams illustrating a GUI of a workflow editor 607 in FIG. 6. The operator creates a workflow corresponding to an order using the workflow editor 607 according to order information being unique to the order displayed in the GUI of the order manager 601 shown in FIGS. 7A and 7B. The workflow discussed here implies a flow of print processing for an order. The creation of the workflow means registration of a workflow of the specified order in a workflow information table that will be processed by a workflow manager 602 in FIG. 6 for controlling a workflow of printing.

Icon parts (blocks) arranged on the upper row in FIGS. 8A and 8B show steps each having a specific function in the print processing. These icon parts are customized in advance according to the contents of services, respectively, in each printing center and displayed being adapted to each printing center. The operator constructs a workflow by designating an order ID of an order with the workflow editor 607 (not illustrated), selecting blocks that are arranged on the upper row in FIGS. 8A and 8B and represent respective steps with a pointing device on a UI (user-interface) of the workflow editor 607, and conducting drag and drop on the selected blocks in a lower part area in FIGS. 8A and 8B. For example, if the order information of a GUI of the order manager 601 shown in FIGS. 7A and 7B has an instruction of proof printing, the operator is expected to select blocks representing steps "proof printing" and "proof confirmation/amendment" disposed on the upper part in FIGS. 8A and 8B with a pointing device. When after the workflow has been constructed, the operator clicks an "OK" button in FIGS. 8A and 8B with a pointing device, the workflow editor 607 registers a workflow for realizing the specified order in the workflow information table and saves the table in the HD 205 of the print server 105.

FIGS. 15A to 15C show one example of the contents saved in the workflow information table. Here, whether each step is an automatic processing step is stipulated in advance depending on each step of icon component (block) in FIGS. 8A and 8B (for example, a step "print data confirmation" requires operations by the operator, a step "proof printing" is automatic, and the like). "Operator's operation" in step processing item information implies that it is necessary for the operator to conduct operations determined by that step. Step processing item information other than the "operator's operation" is data of processing items that the workflow manager 602 refers to during automatic processing in the step or when the operator conducts the operations. Step management information in FIGS. 15A to 15C is data that the workflow manager 602 refers to in conducting a process and updating it if necessary.

Figures 9, 9A, 9B:
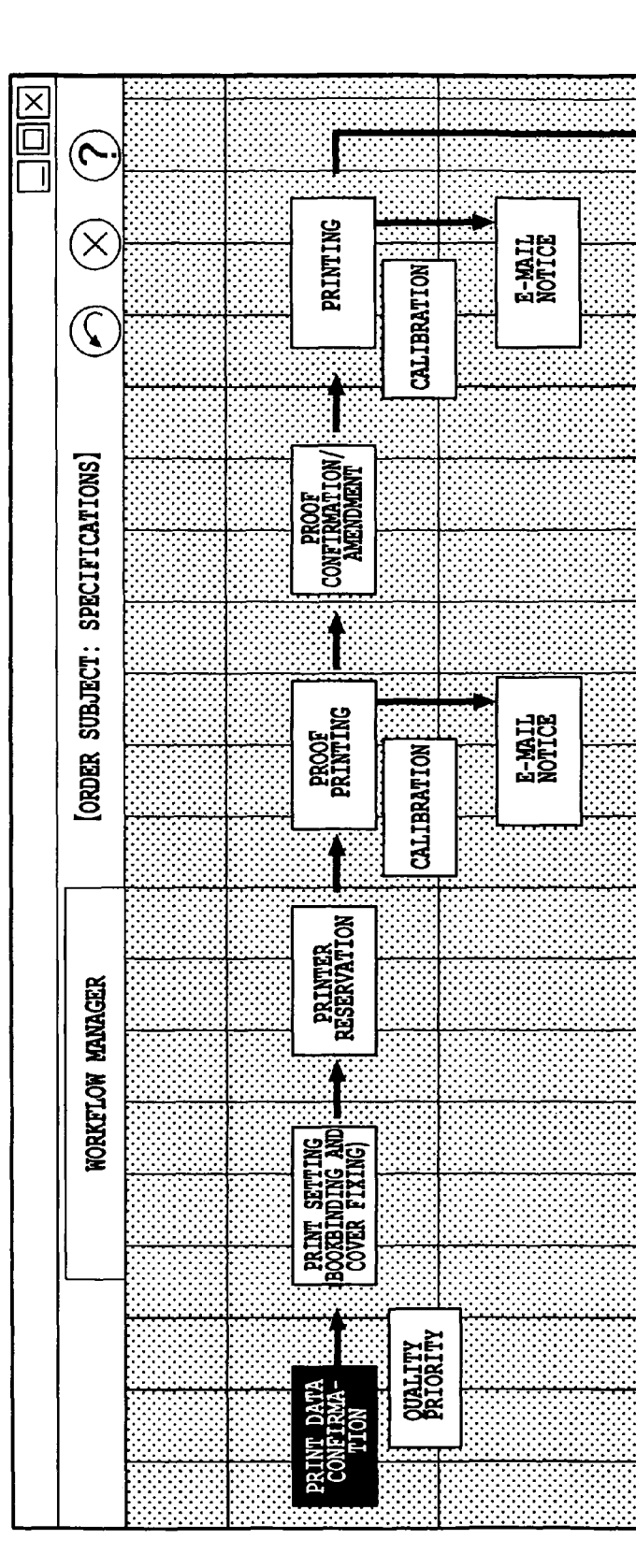
FIG. 9 is a diagram showing the relationship of FIGS. 9A and 9B.
FIGS. 9A and 9B are diagrams illustrating a GUI of a workflow manager of the embodiment to which this invention can be applied.
Figure 9B:
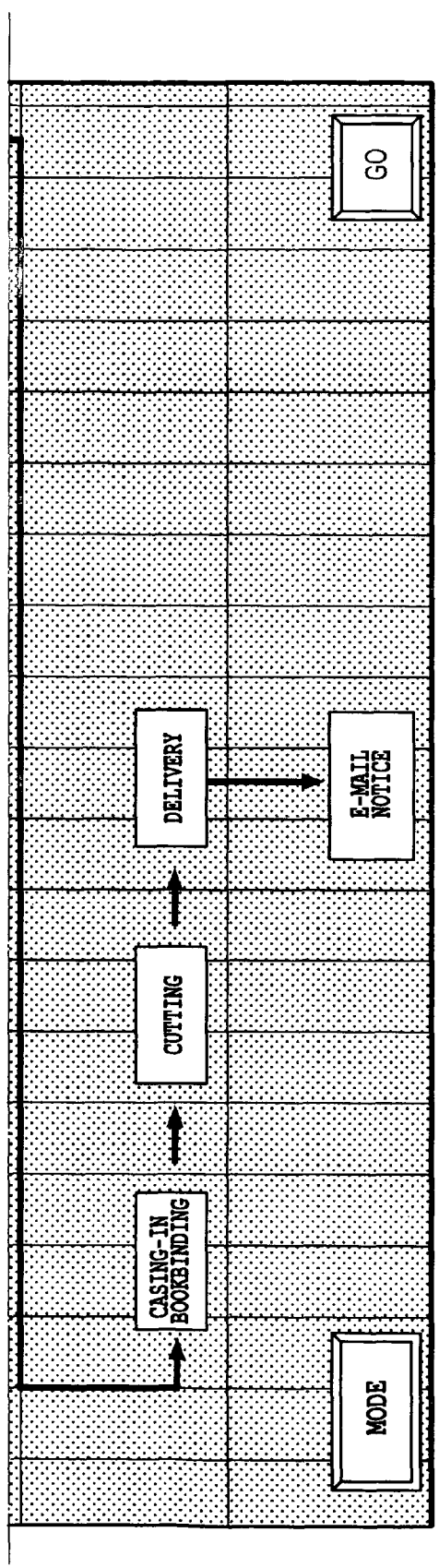

FIGS. 9A and 9B are diagrams illustrating a GUI of the workflow manager 602 in FIG. 6. The workflow manager 602 is software for controlling the workflow of printing. The operator specifies an order ID of an order with the workflow manager 602 (not illustrated), makes the workflow manager 602 read workflow information of the specified order from the workflow information table prepared by the workflow editor 607, and controls operations and a progress of the workflow. The workflow manager 602 displays a situation of progress of the workflow of the specified order so that it becomes visible by highlighting a present step. In some steps, the workflow is automatically processed, whereas in some steps, the operator conducts a predetermined operation for each step based on the status information (for example, display of a popup menu for urging the operator's operation etc.). Moreover, as needed, the workflow manager 602 communicates with a job manager 603, a device scheduler 604, a device manager 605, etc., grasps a status, such as a notice of printing completion, and gives a notice (details will be described later).

Regarding the order with a certain order ID, when a step of the workflow manager 602 becomes "printer reservation," the workflow manager 602 automatically reserves a use schedule of a printer that conforms to its order conditions. The workflow manager 602 sends the order ID to the device scheduler 604 in FIG. 6, and requests it for scheduling. The device scheduler 604 acquires order information (print data, print information, an appointed date of delivery, etc.) that corresponds to the order ID on the order information table saved in the HD 205, acquires device information (in FIG. 18, to be described later) from the device manager 605, and searches device information of the printer that conforms with the specified order conditions from a device information table. Then, the device scheduler 604 refers to a schedule information table that the device scheduler 604 itself prepares and manages and searches an idle time in which the printer conforming to the specified order conditions is not used.

Subsequently, the device scheduler 604 reserves and registers the schedule of the regular print job of the order in the schedule information table according to the idle time of the searched printer, and saves the table in the HD 205 of the print server 105. FIG. 17 shows one example of the contents saved in the schedule information table. On completion of the reservation, the device scheduler 604 informs the workflow manager 602 of a result of reservation completion. The workflow manager 602 controls steps after "printer reservation" depending on the result.

Figure 10B:
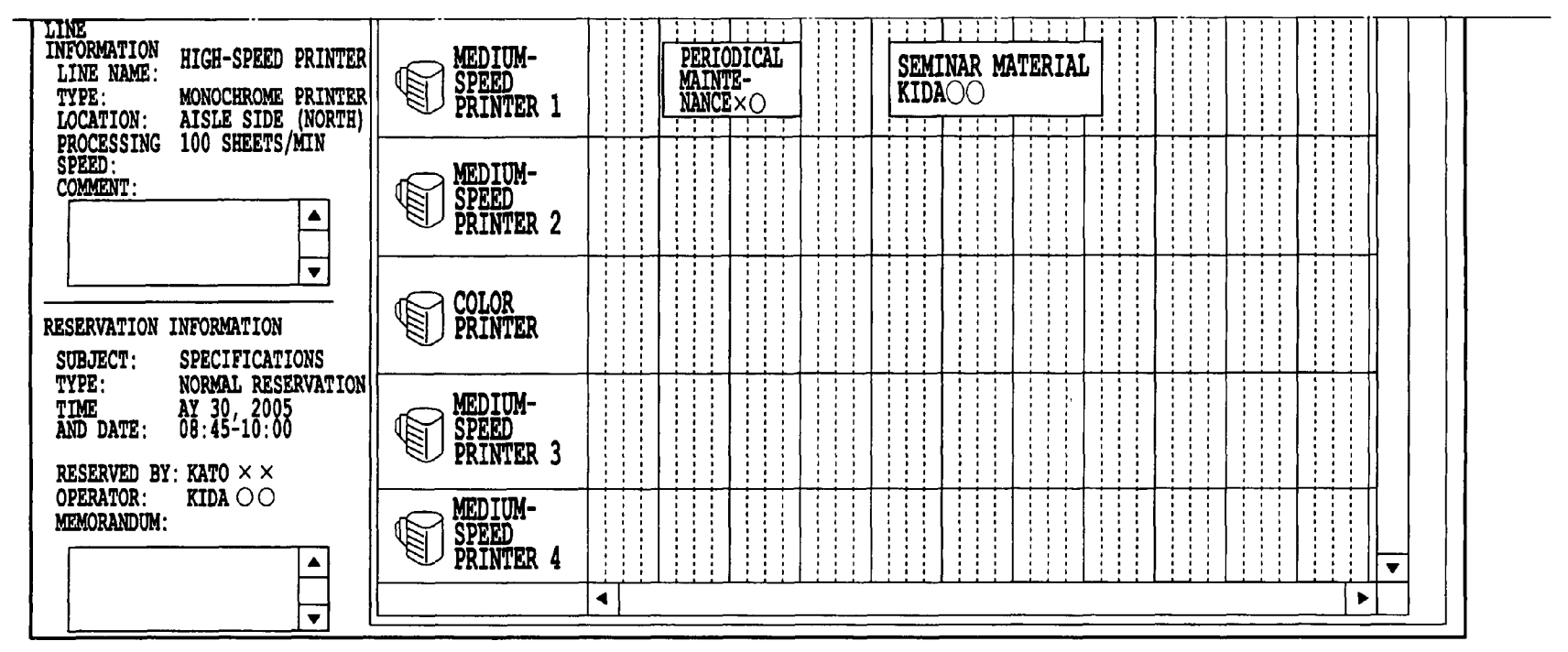

FIGS. 10A and 10B are diagrams illustrating a GUI of the device scheduler 604. The device scheduler 604 is a scheduling system capable of managing schedules of a plurality of printers by means of the GUI shown in FIGS. 10A and 10B and displaying automatic schedule states of respective printers simultaneously. The operator can activate the device scheduler 604 from the working PC 106, and confirm a result automatically scheduled by a GUI as shown in FIGS. 10A and 10B.

In the case where a step of the workflow manager 602 is "printing" that means execution of print processing, the device scheduler 604 refers to the schedule information table, recognizes a print job that has come to time and date that corresponds to the specified order and has been automatically scheduled, activates a print component 606 (printing control module) to execute automatic printing. The print component 606 acquires order information (print data, print information, etc.) that is registered in the order information table and corresponds to the specified order from the order manager 601 and executes printing of the pertinent order automatically. The mode described above is a print processing mode in the case where the format of print data allows the print server 105 to execute printing directly in the printer. In the case where the format of print data does not allow the print server 105 to execute printing directly in the printer, the print server 105 downloads the print component 606, print data, and print information into the working PC 106, activates a client print component loaded in the working PC 106, and makes it execute printing.

The device scheduler 604 recognizes uniquely a print job corresponding to a specified order on the schedule information table by the order ID and the printer name, activates the print component 606 by sending the information, and makes it execute the pertinent print job.

Then, the job manager 603 that is software for managing a print job communicates with the monochrome printer 111, the color printer 112, etc., based on the order ID and the printer name of a print job informed by the print component 606, registers information corresponding to the print job, such as its status, saves the table in the HD 205 of the print server 105, and conducts management and monitoring of the print job.

Figure 11:
FIG. 11 is a diagram illustrating a GUI of a job manager of the embodiment to which this invention can be applied.

FIG. 11 is a diagram illustrating a GUI of the job manager 603 in FIG. 6. As shown in FIG. 11, while the operator displays information of the print job whose state varies sequentially by the job manager 603, the operator can control an arbitrary print job. That is, the operator displays the GUI of the job manager 603 as shows in FIG. 11 on the working PC 106, and confirms a document name given to the print data, the status of the print job (being outputting, waiting for outputting, stopping, etc.), a time when the print job was received, etc., as needed. Moreover, the operator conducts selection of an arbitrary job, alteration of the status (printing aborted, printing stopped, printing is continuing, etc.) and the like with a pointing device etc. FIG. 16 shows one example of the contents saved in a job information table.

Figure 13:
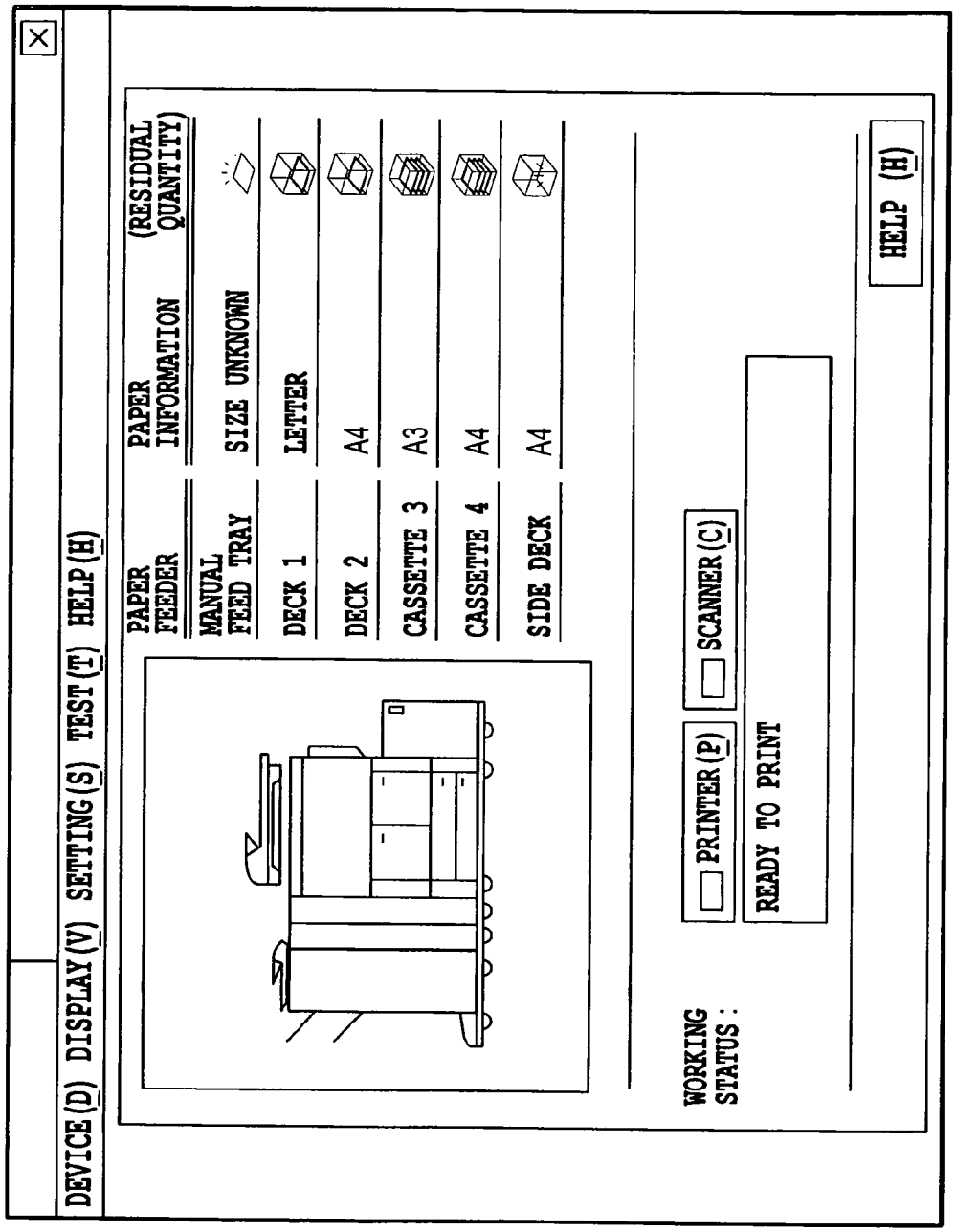
FIG. 13 is a diagram illustrating a GUI of the device manager 605 of the embodiment to which this invention can be applied.

FIG. 12 and FIG. 13 are diagrams illustrating a GUI of the device manager 605 in FIG. 6. FIG. 12 is one example of the GUI of the device manager 605 that displays a list of installation information of each printer. FIG. 13 is one example of the GUI of the device manager 605 that displays setting of an arbitrary printer. The operator makes the working PC 106 display the GUI of the device manager 605 as shown in the FIGS. 12 and 13 and confirms the information of a printer, as needed.

The device manager 605 is software that refers to the device information table in which the installation information of each printer (a network address and an administrator) is saved and manages the devices. And the device manager 605 communicates with printers periodically, acquires their statuses (operation situations, error/warning occurrence situations), updates the device information table, and saves the table in the HD 205 of the print server 105. FIG. 18 shows one example of the contents saved in the device information table. The device manager 605 displays the GUIs of FIGS. 12 and 13 based on information in this device information table.

Moreover, the device manager 605 communicates with the printers periodically, acquires information of the printer's capability (processing speed per unit time, and finishing functions of bookbinding, stapling, punching, etc.) and information of supply goods (papers, toners, staple, etc.), and saves them in the device information table. FIG. 13 is one example displaying supply goods information (paper). Furthermore, the device manager 605 has a function of informing the order manager 601, the workflow manager 602, and the job manager 603 of the device information sequentially according to requests therefrom.

In addition, the workflow manager 602 returns a status as to in which step the specified order currently exists etc. according to a status acquisition request for a specified order from the order manager 601. By this step, the order manager 601 becomes possible to display the status for that order on the GUI of the order manager 601.

(Description of Processing of Program)

Processing regarding the above-mentioned description of operations is conducted according to procedures shown in the flowchart of FIGS. 19 to 23. The procedures in FIGS. 19 to 23 show the contents of processing of a program 403 of the print server software that the CPU 200 of the print server 105 executes.

Figure 19:
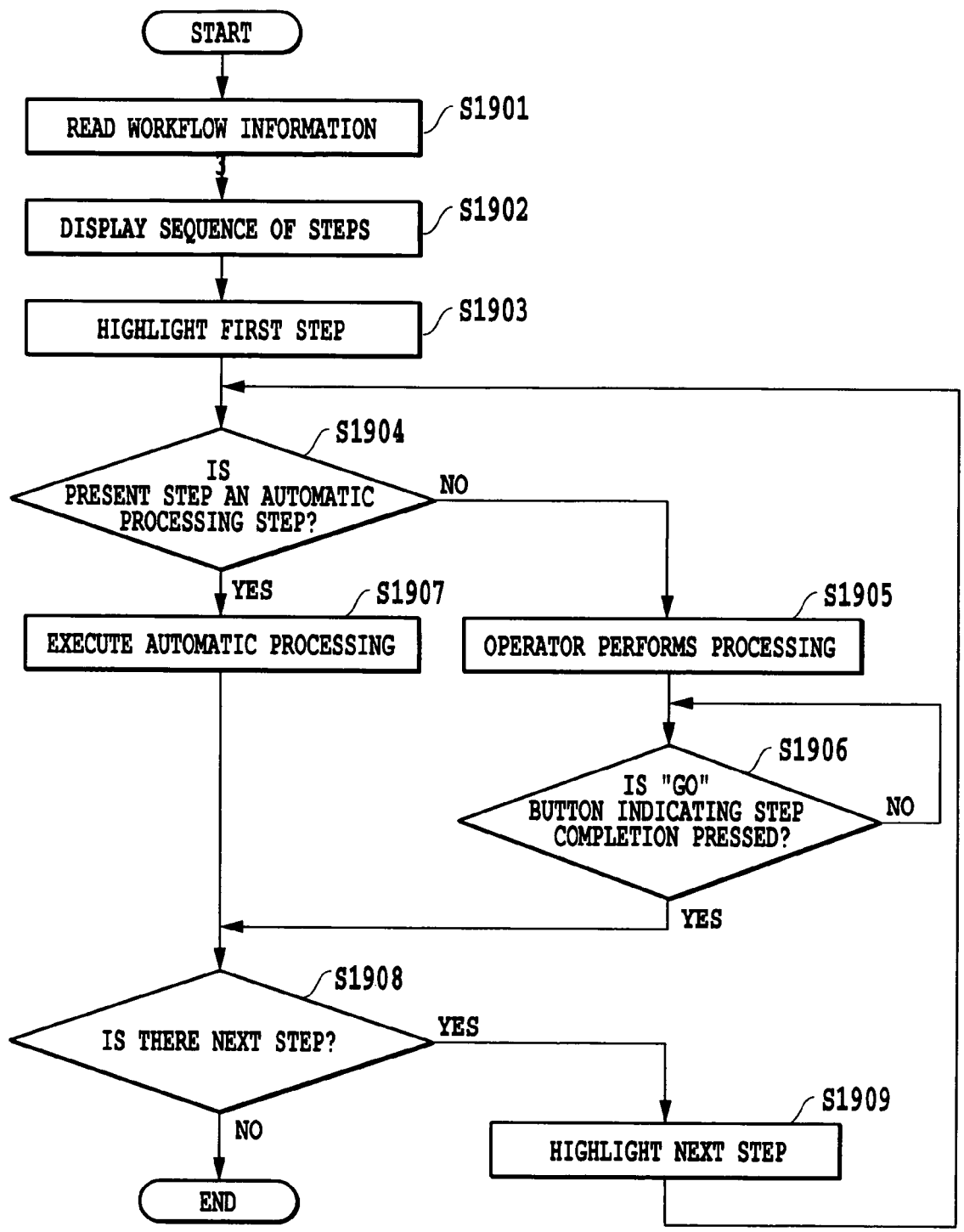
FIG. 19 is a flowchart showing the contents of processing of a program of print server software of the embodiment to which this invention can be applied.

First, with reference to FIG. 19, the overall processing flow of the workflow manage 602 will be described. In this explanation, it is assumed that the operator registers a workflow for an arbitrary order in the workflow information table in advance using the workflow editor 607, and the table is saved in the HD 205 in a mode as shown in FIGS. 15A to 15C.

By specifying the order ID of an order, the operator specifies the workflow information of the order that the operator takes charge of, and activates the workflow manager 602. The workflow manager 602 reads the workflow information of the specified order from the workflow information table in the HD 205 (Step 1901), and subsequently operates according to the workflow information of the specified order that was read. The workflow manager 602 displays the sequence of steps in a mode as shown in FIGS. 9A and 9B on the display of the working PC 106 (Step 1902). Here, the workflow manager 602 highlights the first step (Step 1903). In FIGS. 9A and 9B, the step "print data confirmation" is highlighted.

Next, the workflow manager 602 determines whether the present step is an automatic processing step referring to the workflow information of the specified order in the workflow information table in FIGS. 15A to 15C (Step 1904). Incidentally, whether each step is an automatic processing step is stipulated in advance for each step. When it is determined that the present step is not an automatic processing step, the workflow manager 602 informs the operator of status information so stating (for example, displaying a pop-up menu for urging the operator to do an operation), and the operator conducts an arbitrary step work corresponding to the present step (Step 1905).

In Step 1905, the operator refers to the GUI of the order manager in FIGS. 7A and 7B described above, acquires a path name of a storage destination of print data of the specified order therefrom, and previews the print data of the specified order saved in the path using an arbitrary application. The operator confirms whether the contents of the preview correspond to the contents of the specified order in the GUI of the order manager 601. The operator presses a "GO" button by input means, such as the keyboard 206, at the time when the step "print data confirmation" is completed (Step 1906 to Step 1908). The workflow manager 602 detects the completion of the step, highlights the next step (Step 1908 to Step 1909), and returns the processing to Step 1904. In FIGS. 9A and 9B, a step "printing setting (bookbinding imposition)" is highlighted.

At this time, the workflow manager 602 registers "process: 1 (completed)" in the step management information of the process "print data confirmation" of the specified order in the workflow information table. After that, each time the step is completed the workflow manager 602 registers "process: 1 (completed)" in the step management information of the step of the specified order in the workflow information table.

Next, the workflow manager 602 refers to the workflow information of the specified order in the workflow information table in FIGS. 15A to 15C and determines whether the present step is an automatic processing step (Step 1904). When it is determined that this process is not an automatic processing step, the workflow manager 602 informs the operator of status information indicating that it is so (for example, displaying a pop-up menu for urging the operator to do an operation), and the operator conducts an arbitrary step work corresponding to the present step (Step 1905). Then the workflow manager 602 determines whether the operator completed the process work and pressed a "GO" button by input means, such as the keyboard 206 (Step 1906). When it is determined that the "GO" button was not pressed, the workflow manager 602 determines whether the "GO" button is pressed periodically. When it is determined that the "GO" button was pressed, the workflow manager 602 proceeds the processing to Step 1908.

In Step 1904, when it is determined that the present step is an automatic processing step, the workflow manager 602 conducts predetermined automatic processing for the present step (Step 1907). Next in Step 1908, the workflow manager 602 refers to the workflow information of the specified order in the workflow information table and determines whether there is a next step. When it is determined that there is the next step, the workflow manager 602 highlights the next step (Step 1909) and returns the processing to Step 1904. When it is determined that there is not the next step, the workflow manager 602 terminates the processing.

Figure 21:
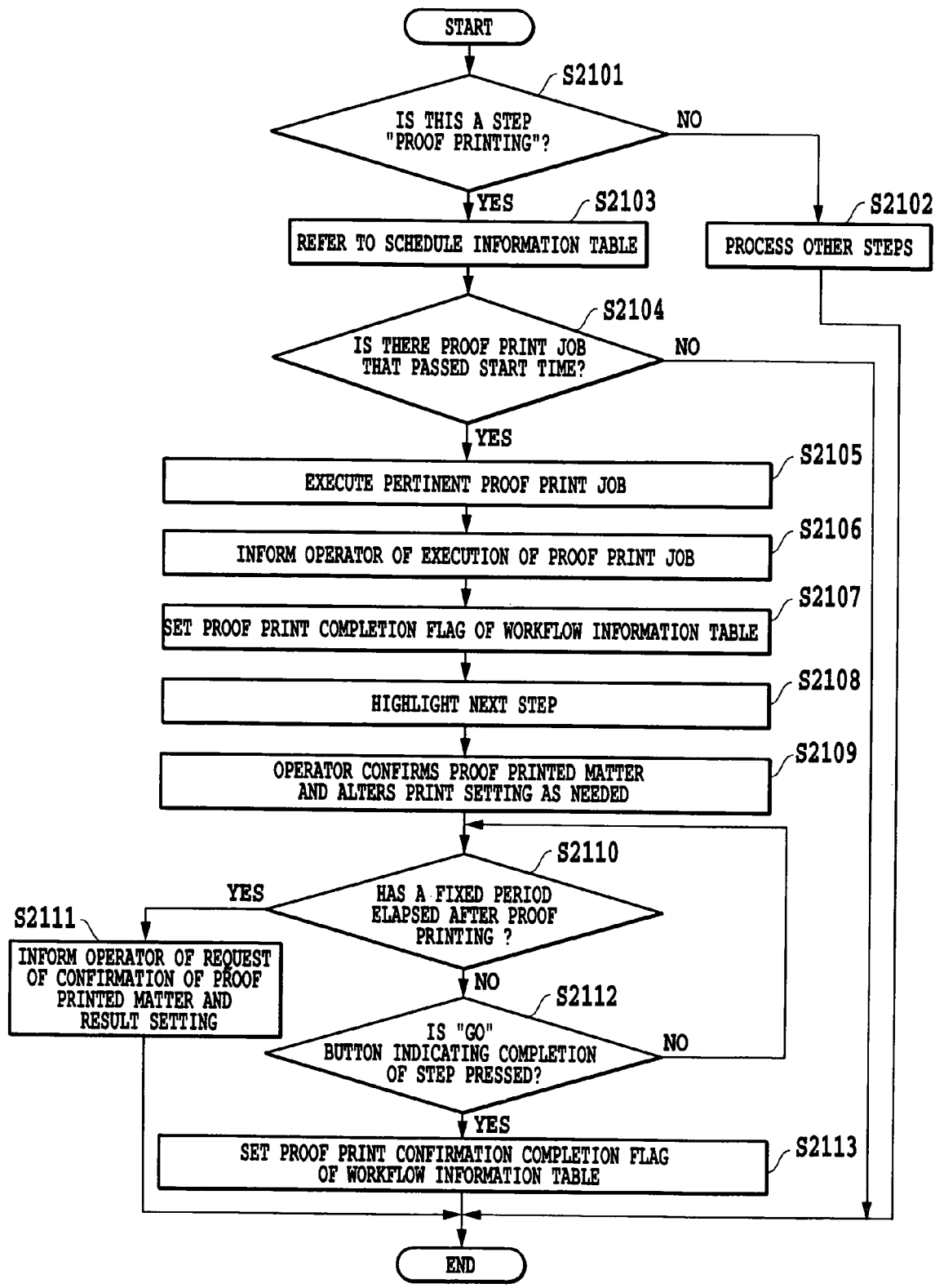
FIG. 21 is a flowchart showing the contents of processing of a program of the print server software of the embodiment to which this invention can be applied.
Figure 22:
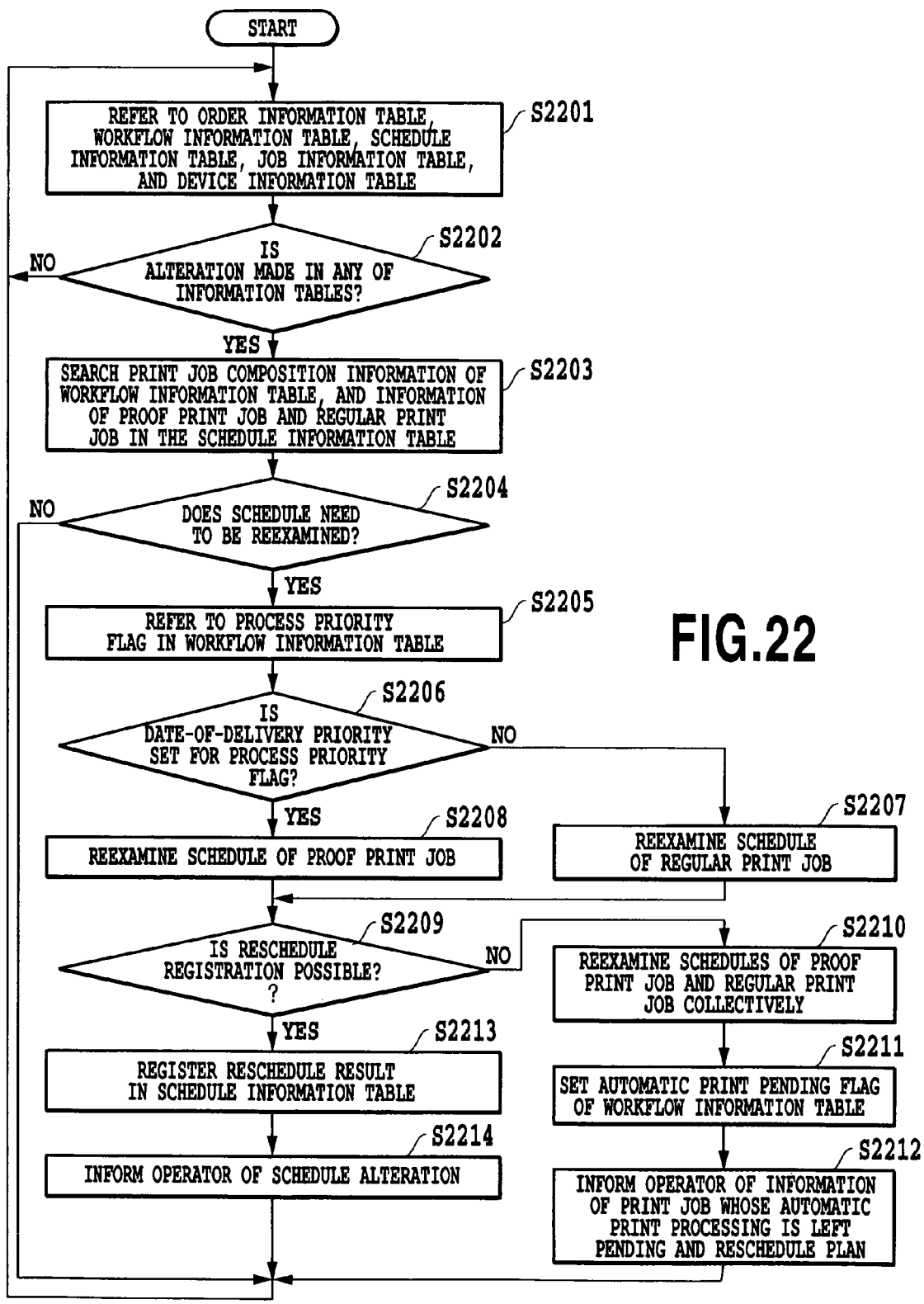
FIG. 22 is a flowchart showing the contents of processing of a program of the print server software of the embodiment to which this invention can be applied.

A processing flow related to characteristics of this embodiment will be described below. FIGS. 20, 21, and 23 show a flowchart showing details of a processing flow related to characteristics of this embodiment in the processing after Step 1904 that were described above with reference to FIG. 19. FIG. 22 is a flowchart showing a processing flow of automatic rescheduling by the device scheduler 604.

Figure 24A:
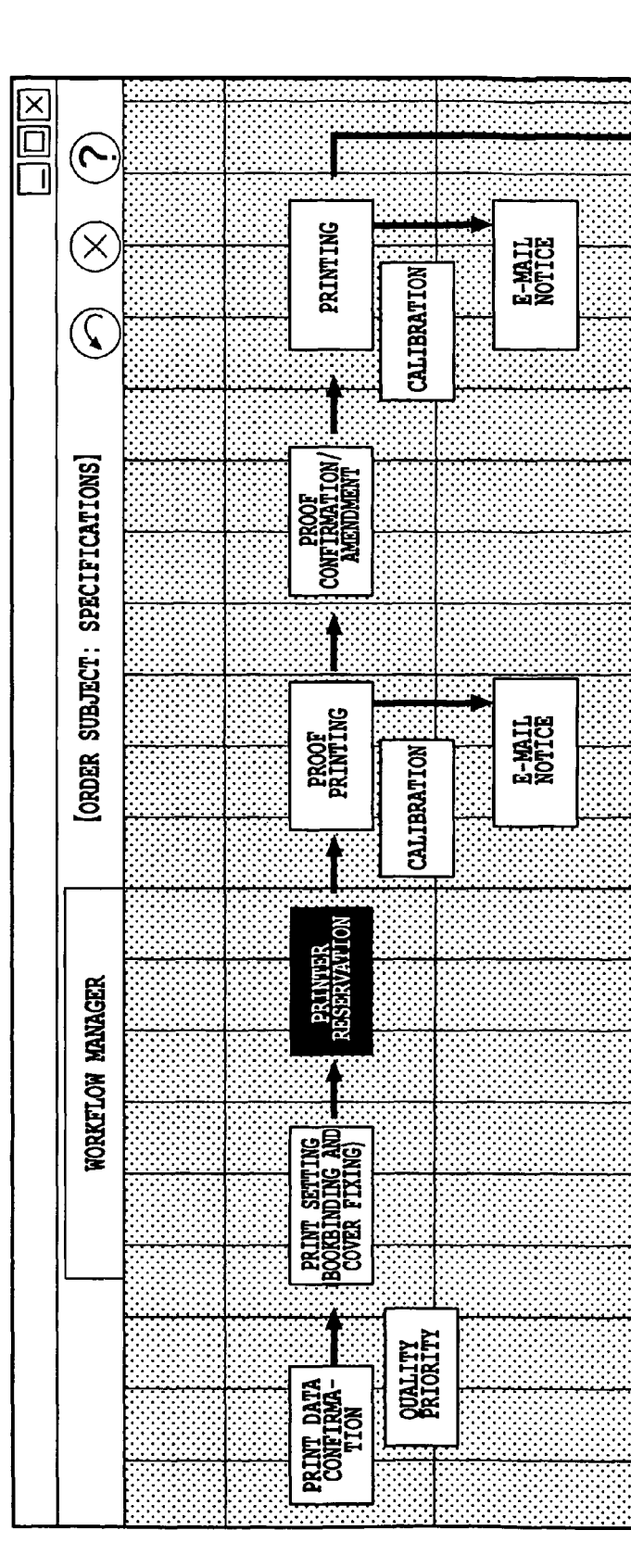
FIGS. 24A and 24B are diagrams showing a step "printer reservation" in a workflow manager of the embodiment to which this invention can be applied.
Figure 24B:
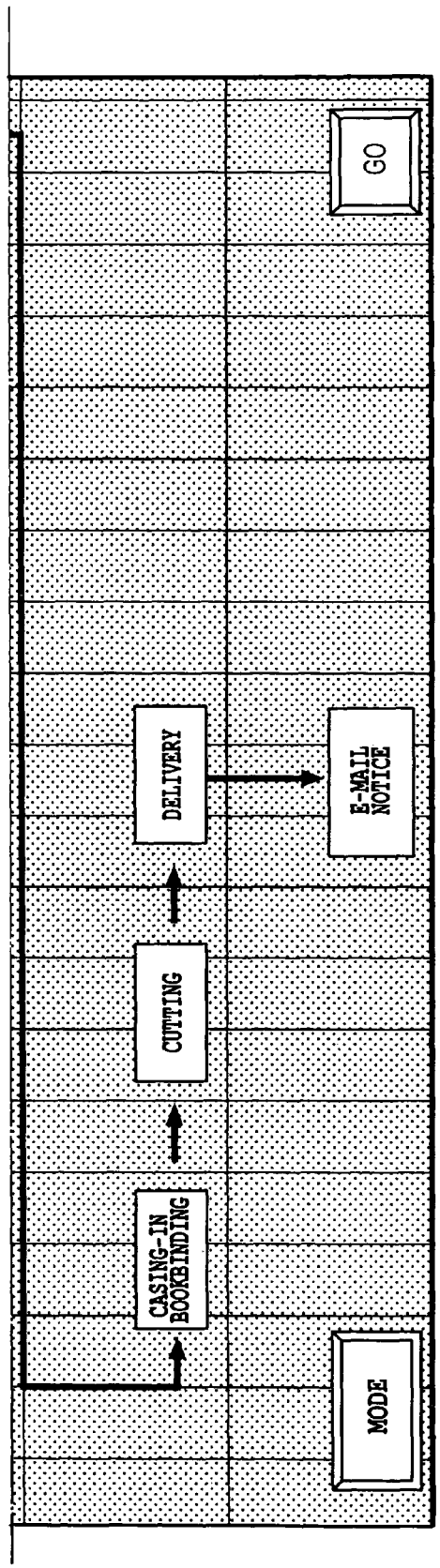

First, with reference to FIGS. 20A and 20B, a processing flow of a step "printer reservation" by the workflow manager 602 that is highlighted in FIGS. 24A and 24B will be described. The workflow manager 602 refers to workflow information of the specified order in the workflow information table and determines whether the present step is the "printer reservation" (Step 2001). When it is determined that the present step is not "printer reservation," the workflow manager 602 processes other steps (Step 2002).

When it is determined that the present step is "printer reservation," the workflow manager 602 sends order information (order ID) to the device scheduler 604, and requests it for scheduling. The device scheduler 604 refers to the order information table in FIGS. 14A to 14C saved in the HD 205 and the device information table shown in FIG. 18 from the device manager 605 and searches information of a printer that fulfills conditions of the requested order (Step 2003). For example, when referring to the order information table in FIGS. 14A to 14C, the order ID No. 1001 requires execution of "monochrome" printing and "30-hole punching."

Searching printers fulfilling these conditions by referring to the device information table shown in FIG. 18, there are a "high-speed printer" and a "medium-speed printer 1."

The device scheduler 604 calculates a processing time of the print job (regular print job) from the number of pages of the print data and information of a print setting in the order information table of the specified order and information of throughputs of printers (for example, the "high-speed printer" and the "medium-speed printer 1") acquired from the device information table (Step 2004). For example, a processing time of the print job with one "high-speed printer" is calculated.

The device scheduler 604 acquires an appointed date of delivery in the order information table of the specified order and schedule information of the "high-speed printer" in the schedule information table shown in FIG. 17, and determines whether one "high-speed printer" can process the print job in terms of time by considering a processing time of the print job with one "high-speed printer" (Step 2005). That is, the device scheduler 604 determines whether one "high-speed printer" having a short processing time can process it until the appointed date of delivery. When it is determined that the "high-speed printer" has already a schedule of other print jobs and it is determined that one "high-speed printer" cannot process it from a relation between a finish time of the print job with one "high-speed printer" and a date of delivery, the device scheduler 604 determines whether a plurality of printers can process the print job after dividing the print job (Step 2006). For example, the device scheduler 604 acquires an appointed date of delivery in the order information table of the specified order and schedule information of the "high-speed printer" and the "medium-speed printer 1" in the schedule information table, determines whether distributed processing with two devices of the "high-speed printer" and the "medium-speed printer 1" no later than an appointed date of delivery is possible in terms of time by considering a processing time of the print job divided for two devices of the "high-speed printer" and the "medium-speed printer 1" (distributed processing case).

When it is determined that the print job cannot be processed with a plurality of printers (in this case, two) while shortening a use time of the "high-speed printer," the device scheduler 604 calculates a processing time of respective print jobs into which the print job is divided for two devices of the "high-speed printer" and the "medium-speed printer 1" (not illustrated) and shifts the processing to Step 2009. When it is determined that the print job cannot be processed with a plurality of printers, the device scheduler 604 refers to operator information in the order information table of the specified order, informs the operator of a result that automatic scheduling is impossible (Step 2020), and terminates the processing. Then the device scheduler 604 informs the workflow manager 602 of impossibility of automatic scheduling. When receiving the notice, the workflow manager 602 refers to FIG. 19 and returns to a top process in the automatic processing described above with reference to FIG. 19 (Step 1907) (more specifically, start again Step 2001).

When it is determined that the print job can be processed with one printer in terms of time in Step 2005, the device scheduler 604 determines whether the print job for the specified single order should be divided into a plurality of print jobs and processed by the one printer (Step 2007). Concretely, the device scheduler 604 calculates total number of print sheets from information of the specified order in the order information table, acquires information of the maximum number of loaded sheets of an outlet in the device information table, and determines whether the print job will stop on the way due to the outlet loaded to capacity.

When it is determined that the print job should be processed as a plurality of print jobs in terms of a full-load outlet, the device scheduler 604 conducts processing of dividing the print job into a plurality of print hobs (for example, two jobs) to reduce the number of copies of each job and executing them consecutively (Step 2008) (consecutive processing case). Moreover, the device scheduler 604 calculates a processing time of each print job from a plurality of divided print jobs (for example, two jobs).

When it is determined that it is unnecessary to perform printing in the plurality of print jobs or after the processing in Step 2008, the device scheduler 604 shifts the processing into Step 2009.

Next, the device scheduler 604 registers print job composition information in step management information of the step "printer reservation" of the specified order in the workflow information table (Step 2009). For example, in the case of the distributed processing case described above, the device scheduler 604 registers information of "cooperation mode: distributed printing (two jobs)" as a processing mode, "two devices: medium-speed printer 1, medium-speed printer 2" as printer used, etc. Moreover, in the case of the consecutive processing case described above, the device scheduler 604 registers information of "cooperation mode: consecutive printing (two jobs)" as a processing mode, "one device: color printer" as printers used, etc. In addition, regarding the cooperation mode, it is possible for the operator to display and confirm the present setting on the display in the workflow manager 602 and also to set and alter it from input means, such as a keyboard. For example, the equipment may be configured such that when the operator selects a mode button in FIGS. 9A and 9B, a pop-up menu of display, setting, alteration, etc. of cooperation mode is displayed.

When it is determined that the print job was able to be processed with one printer, the device scheduler 604 refers to a processing time of the print job in the schedule information table so that the above-mentioned date of delivery can be fulfilled, and assigns processing of the print job to an idle time of the searched printer correspondingly. Moreover, in the case where it is determined that the print job was divided into a plurality of print jobs (for example, two jobs) and processed with one printer (consecutive processing case), the device scheduler 604 searches processing times of the print jobs referring to the schedule information table and assigns the print jobs thus divided to the printers with the processing times of the print jobs brought into correspondence with idle times of the printers. Or, when it is determined that the print job can be processed with a plurality of printers (for example, two) after the print job is divided into a plurality of print jobs (distributed processing case), the device scheduler 604 searches processing times of the respective print jobs by referring to the schedule information table and assigns processing of the respective print jobs thus divided to idle times of the plurality of printers correspondingly in order that the an appointed date of delivery can be kept. Then the device scheduler 604 registers a schedule of the regular print job obtained from such assignment of the print jobs to the printers in the schedule information table shown in FIG. 17 (Step 2010). Each print job (regular print job) is identified with its order ID and assigned printer name and registered in the schedule information table.

Then the device scheduler 604 refers to operator information in the order information table of the specified order and informs the operator of a schedule of the regular print job by E-mail etc. (Step 2011).

Next, the device scheduler 604 calculates a processing time of a proof print job (print job performed by a trial for only one copy in this embodiment) from information of the number of pages and print settings in the order information table of the specified order and information of capabilities of printers (Step 2012). For example, when it is determined that the print job can be processed by one "high-speed printer," the device scheduler 604 calculates a processing time of the proof print job with one "high-speed printer."

Alternatively, when it is determined that the print job is divided into two print jobs and processed with one "high-speed printer" (consecutive processing case), the device scheduler 604 calculates processing times of the proof print jobs corresponding to the divided print jobs with one "high-speed printer." Further alternatively, when it is determined that the print job is divided into two print jobs and can be processed with one "high-speed printer" and one "medium-speed printer" (distributed processing case), the device scheduler 604 calculates processing times of respective proof print jobs corresponding to the divided print jobs with two "medium-speed printers." Each proof print job is identified in the schedule information table by its order ID and an assigned printer name and corresponds to a print job (regular print job) identified by the same order ID and printer name.

Subsequently, the device scheduler 604 acquires information of confirmation time from the operator information in the order information table of the specified order, and adds it to a processing time of the proof print job calculated in Step 2012 (Step 2013).

The device scheduler 604 acquires information of a cooperation mode from the step management information of the specified order in the workflow information table, and determines whether the cooperation mode of the print job composition information is "consecutive printing" (Step 2014). When the cooperation mode of the print job composition information is not "consecutive printing" as an order ID No. 1001, the device scheduler 604 shifts its processing to Step 2016. When the cooperation mode of the print job composition information is "consecutive printing" as order IDs No. 1002, 1003 (in this example, two job cooperation), the device scheduler 604 acquires information of consecutive print processing times (proof printing) from the operator information in the order information table of the specified order. Then the device scheduler 604 adds the consecutive print processing times to the processing time of the proof print job (in the example of two job cooperation, the second proof print job) related to the consecutive printing (Step 2015), and puts the proof print job whose processing time has been stipulated in a state to be registered in schedule.

Next, the device scheduler 604 refers to print job composition information registered in step management information of the step "printer reservation" of other print job (other order) in the workflow information table, and the schedule information table (Step 2016). Then the device scheduler 604 searches other print jobs (proof print job and regular print job) that the proof print job to be registered having a processing time of the proof job-described above affects and other print jobs (proof print job and regular print job) that affect a to-be-registered proof print job (Step 2017).

In Step 2017, concretely, the device scheduler 604 tries to schedule the to-be-registered proof print job earlier than a scheduled start time of the regular print job that is identified by the same order ID and printer name in the schedule information table and corresponds to the to-be-registered proof print job. In this occasion, the device scheduler 604 considers relations of print attributes and cooperation capability between schedule information of other registered print job and the to-be-registered proof print job. Based on it, the device scheduler 604 detects: a time slot that would affect print quality of other print job by scheduling the to-be-registered proof print job (because calibration of a color printer is set for printing attributes (registered in the order information table of the job), the print quality of other print job after the calibration will be affected, etc.), a time slot in which consecutive processing and distributed processing in the proof print processing become inefficient (a time interval between the proof printing and the regular printing that follows it is too large; it becomes necessary for the operator of the to-be-registered proof print job to confirm other proof print job; etc.), etc. Moreover, the device scheduler 604 considers relations of paper size and paper type between paper used in other print job and paper used in the to-be-registered proof print job, and the like. For example, in a situation where paper of other size and other type to be used in other print job is loaded in a printer, the proof print job using paper of size and type different from them cannot be automatically executed. Furthermore, the device scheduler 604 determines whether the print quality changes by execution of other print job to output a high volume of copies in the same printer after the to-be-registered proof print job and this change affects the print quality of the subsequent regular print job corresponding to the to-be-registered proof print job.

In this way, regarding the to-be-registered proof print job, the device scheduler 604 searches other print jobs that the to-be-registered proof print job affects and other print jobs that affect the to-be-registered proof print job in terms of time, in terms of effects on other print jobs, and in terms of efficiency of processing of the proof printing.

The device scheduler 604 determines whether the to-be-registered proof print job can be registered in the schedule (that is, there is no result of search in Step 2017 described above) (S2018). When it is determined that the to-be-registered proof print job cannot be registered in the schedule, the device scheduler 604 refers to the operator information in the order information table of the specified order, informs the operator of a result that automatic scheduling is impossible with E-mail etc. (Step 2020), and terminates the processing. Then the device scheduler 604 informs the workflow manager 602 of impossibility of automatic scheduling. When receiving the notice, the workflow manager 602 returns to a tope process in the automatic processing (Step 1907) described above with reference to FIG. 19 (more specifically, it starts Step 2001 again).

When it is determined that a schedule of the to-be-registered proof print job can be registered, the device scheduler 604 registers the schedule of the to-be-registered proof print job in the schedule information table (Step 2019).

For example, when the device scheduler 604 determines that the print job can be processed with one printer and the processing of the print job is assigned to the printer in Step 2010, the to-be-registered proof print job corresponding to the print job is assigned in such a manner as to establish a correspondence between the processing time of the to-be-registered proof print job corresponding to the print job and an idle time ahead of the schedule of the print job. Or when the device scheduler 604 determines that the print job can be processed with one printer after the print job is divided into a plurality of print jobs (for example, two jobs) and assigns the print jobs thus divided to the printer (consecutive processing case) in Step 2010, the to-be-registered proof print jobs corresponding to the divided print jobs are assigned in such a manner as to establish a correspondence between processing times of the to- be-registered proof print jobs corresponding to the respective print jobs and idle times ahead of schedules of the divided print jobs. Or when the device scheduler 604 determined that the print job can be processed with a plurality of printers (for example, two) after dividing the print job into a plurality of print jobs (distributed processing case) and assigned processing of the print jobs thus divided to the printers, the to-be-registered proof print jobs corresponding to the divided print jobs are assigned in such a manner as to establish a correspondence between processing times of the to-be-registered proof print jobs corresponding to the respective print jobs and idle times ahead of the schedules of the print jobs thus divided. Then the device scheduler 604 registers a schedule of the proof print jobs obtained from such assignment in the schedule information table shown in FIG. 17. Lines registered in the schedule information table shown in FIG. 17 constitute information of an automatic print job to be described later.

Figure 5B:
Figure 20B:
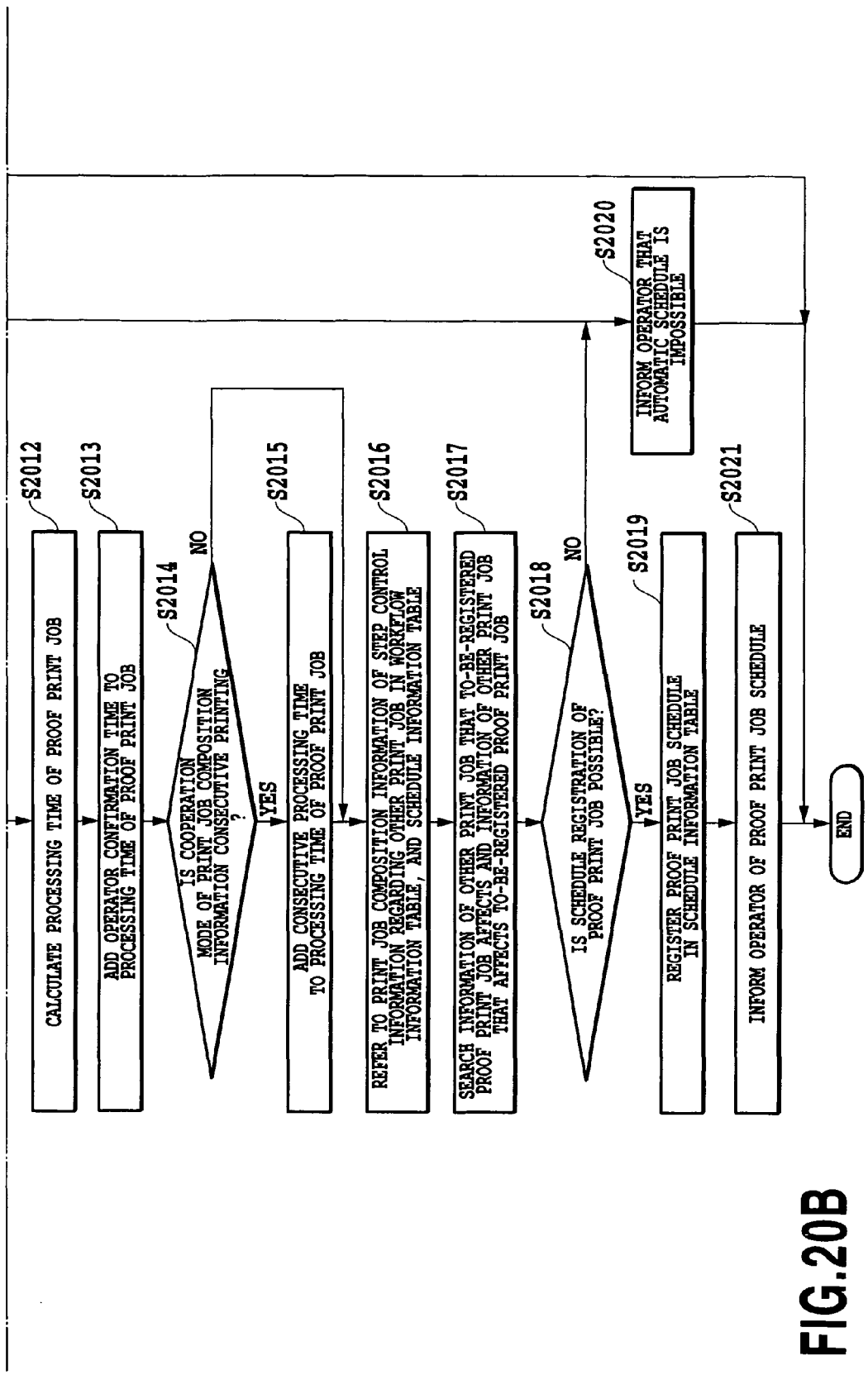

FIGS. 5A and 5B are diagrams illustrating a GUI of the device scheduler 604 that shows a regular print job corresponding to an arbitrary order and a schedule of a proof print job based on the schedule information table registered by a processing flow in FIGS. 20A and 20B described above. The operator can activate the device scheduler 604 from the working PC 106 and confirm a result scheduled automatically by a GUI as shown in FIG. 5. In an example in FIG. 5, a schedule of a regular print job is represented by a rectangle on which information of a job name (order name) and an operator in charge is shown, a schedule of a proof print job is represented by a star mark, and a mutual relation between them is represented by an arrow connecting them. Moreover, a cooperation mode in a plurality of print jobs is represented by bold lines connecting the consecutive printing and the distributed printing to show their relation.

Next, the device scheduler 604 refers to operator information in the order information table of the specified order and informs the operator of a schedule of a proof print job with E-mail etc. Then the device scheduler 604 informs the workflow manager 602 of completion of the step "printer reservation" (Step 2021). Receiving the result, the workflow manager 602 controls subsequent steps.

Figure 25A:
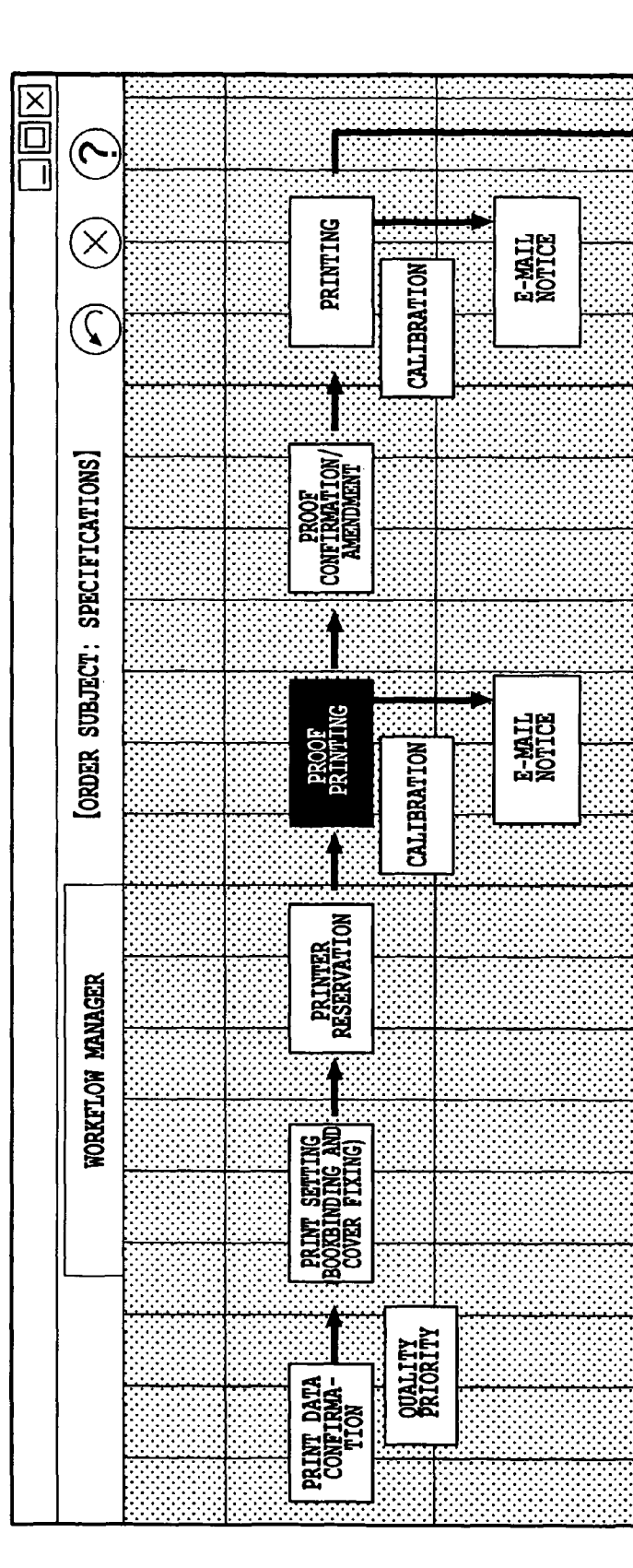
FIGS. 25A and 25B are diagrams showing a step "proof printing" in the workflow manager of the embodiment to which this invention can be applied.
Figure 25:
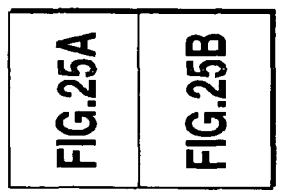
FIG. 25 is a diagram showing the relationship of FIGS. 25A and 25B.
Figure 25B:
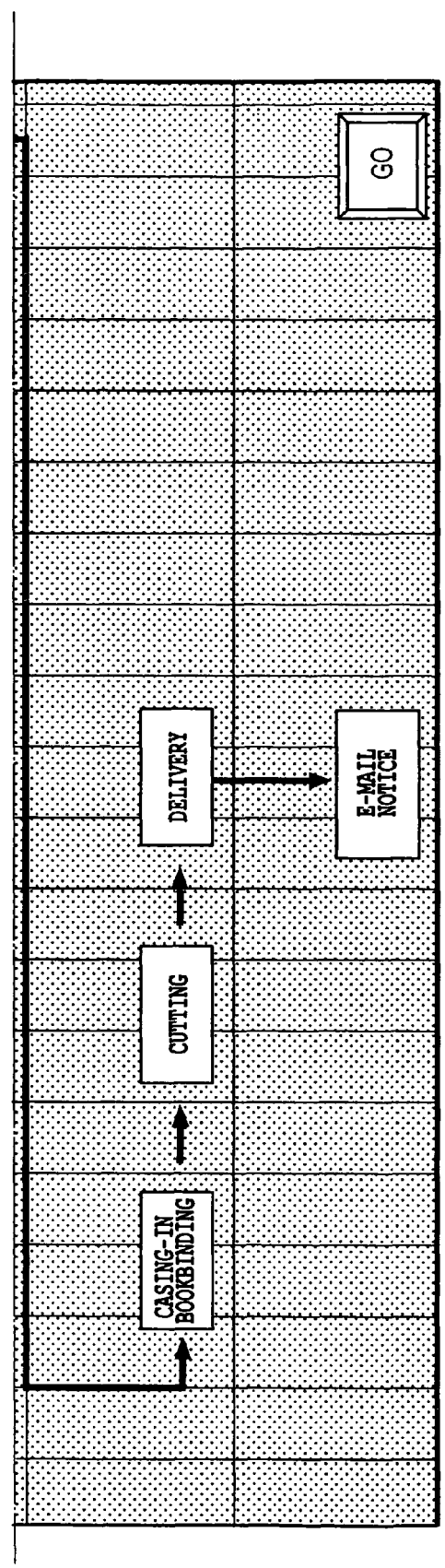

Next, a processing flow when "proof printing" in the workflow manager 602 is highlighted, as shown in FIGS. 25A and 25B, will be described with reference to FIG. 21. The workflow manager 602 determines whether the present step is "proof printing" by referring to the workflow information of the specified order in the workflow information table (Step 2101). When it is determined that the present step is not "proof printing," the workflow manager 602 conducts processing in other steps (Step 2102).

When it is determined that the present step is "proof printing," the workflow manager 602 requests execution of automatic proof printing of the device scheduler 604. The device scheduler 604 refers to the schedule information table shown in FIG. 17 (Step 2103) and determines whether there is a proof print job that passed its start time for the specified order (Step 2104). When it is determined that there is no proof print job that passed its start time, the device scheduler 604 terminates the processing. Then the device scheduler 604 informs the workflow manager 602 that there is no proof print job to perform automatically. When receiving the notice, the workflow manager 602 refers to FIG. 19 and returns to the top process in the automatic process described above (Step 1907) (more specifically, restarting Step 2101).

When it is determined that there is a proof print job that passed its start time, the device scheduler 604 recognizes uniquely a proof print job that passed the start time corresponding to the specified order in the schedule information table by the order ID and the printer name, activates the print component 606 by sending the information, and makes it execute the pertinent proof print job (Step 2105). The print component 606 acquires order information (print data, print information) corresponding to the specified order registered in the order information table from the order manager 601, and performs the pertinent proof print job automatically.

The device scheduler 604 refers to operator information in the order information table of the specified order, informs the operator of automatic execution of the pertinent proof printing, and urges the operator to confirm the proof printing (Step 2106). The device scheduler 604 sets "1 (completed)" implying completion of proof printing in the proof print completion flag regarding step management information of the step "proof printing" of the specified order in the workflow information table (Step 2107). Incidentally, regarding the proof print completion flag, it is possible for the operator to display and confirm the present setting on the display and also to set and alter it from input means, such as the keyboard 206. For example, the equipment may be configured such that when the operator selects a mode button in FIGS. 9A and 9B, a pop-up menu of display, setting, alteration, etc. of the proof print completion flag is displayed.

Then the device scheduler 604 informs the workflow manager 602 of automatic execution of the proof print job. The workflow manager 602 controls steps from the result. Concretely, the workflow manager 602 changes a step that is highlighted in FIGS. 25A and 25B from "proof printing" to "proof confirmation/amendment" that is the next step (Step 2108). The operator who received a notice confirms the proof printed matter, and alters print setting etc. as needed (Step 2109). For this purpose, the equipment may be configured such that when the operator selects a "setting (s)" tab in the GUI of the device manager 605 that displays settings of a printer shown in FIG. 13, a dialog box for setting the printing appears in the GUI.

Next, the workflow manager 7602 refers to information of the specified order in the schedule information table and the proof print completion flag of the step "proof printing" of the specified order in the workflow information table, and after completion of proof printing (proof print completion flag="1 (completed)"), for the specified order in the scheduled information table determines whether regarding the pertinent proof print job that passed its scheduled finish time, a certain period has elapsed after the scheduled finish time of the proof print job (Step 2110). When it is determined that a certain period has elapsed after the proof print job scheduled finish time, regarding the pertinent proof print job that passed proof print job scheduled finish time, the workflow manager 602 refers to the operator information in the order information table of the specified order and informs the operator of a request of confirmation of the proof printing and setting of the confirmation result with E-mail etc. (Step 2111). Here, setting of confirmation result means, as will be described later, that a "GO" button indicating completion of a step "proof confirmation/amendment" is pressed in the GUI of the workflow manager 602 in FIGS. 9A and 9B.

When it is determined the a certain period has not elapsed after the proof print job scheduled finish time, the workflow manager 602 determines whether the "GO" button indicating completion of the step "proof confirmation/amendment" was pressed (Step 2112). When it is determined that the "GO" button indicating completion of the step "proof confirmation/amendment" was not pressed, the workflow manager 602 returns the processing to Step 2110.

When it is determined that the "GO" button indicating completion of the step "proof confirmation/amendment" was pressed, the workflow manager 602 sets "1 (completed)" implying proof print confirmation completion in the proof print confirmation completion flag regarding step management information of the step "proof confirmation/amendment" of the specified order of the workflow information table (Step 2213). Incidentally, regarding the proof print confirmation completion flag, it is possible for the operator to display and confirm the present setting on the display in the workflow manager 602 and also to set and alter it from input means, such as the keyboard 206. For example, the equipment may be configured such that when the operator selects a mode button in FIGS. 9A and 9B, a pop-up menu of display, setting, alteration, etc. of the proof print confirmation completion flag is displayed. After processing in Step 2113, the workflow manager 602 receives its result and controls subsequent steps. On the other hand, after processing in Step 2111, the workflow manager 602 does not conducts processing in Step 2113 and controls subsequent steps.

Next, a processing flow of automatic rescheduling of the automatic regular print job and the automatic proof print job by the device scheduler 604 will be described with reference to FIG. 22. The device scheduler 604 searches information of order conditions, workflow contents, schedules of print jobs, situations of resources (fault of printer etc.) and the like periodically and detects alteration in each pieces of information. If there is a problem, the device scheduler 604 can readjust schedules of the print jobs automatically.

The device scheduler 604 refers to the order information table, the workflow information table, the schedule information table, the job information table, and the device information table, and searches whether an alteration has occurred in each pieces of information (Step 2201). Then the device scheduler 604 determines whether an alteration has occurred in information of any of the tables (Step 2202). When it is determined that an alteration has not occurred in any of the information tables, the device scheduler 604 returns the processing to Step 2201.

When it is determined that an alteration has occurred in any of the information tables, the device scheduler 604 refers to print job composition information of each order ID in the workflow information table in addition to the tables and the like described above, refers to the schedules of the proof print job and the regular print job regarding the automatic print jobs in the schedule information table that use printers of the print job composition information, and searches an automatic print job that has a proof print job and a regular print job whose schedules of automatic printing need to be reexamined (Step 2203). Incidentally, the automatic print job whose schedule needs to be reexamined is recognized uniquely by the order ID and the printer name in the schedule information table.

For example, for an order whose print setting, such as print appearance, in the order information table has been altered, it will become necessary to newly select a printer and reexamine the schedule of the automatic printing. A print job whose proof printing or regular printing in the schedule information table has altered in their scheduled times may overlap the schedule of other print job that uses the same printer. Moreover, since the sprinter whose status in the device information table indicates an error is out of use, regarding the automatic print job that uses the printer, it will become necessary to newly select a printer and reexamine the schedule of the automatic printing.

The necessity of schedule reexamination discussed here is determined from the following events: an event in which use times of a printer overlap in terms of time; an event in which the operator's working efficiency declines (a time interval between proof printing and subsequent regular printing is large; the same operator is requested to confirm a plurality of proof print jobs; etc.); and the like. Moreover, based on information of print attributes and cooperation capability of the proof print job of the regular print job that is different from schedule information of other registered regular print jobs, the necessity of schedule reexamination is determined from the following events: an event in which execution of the proof print job affects the print quality of the other regular print job; an event in which consecutive processing and distributed processing in the proof print processing become inefficient (a time interval between proof printing and subsequent regular printing is large; the same operator is requested to confirm a plurality of proof print jobs; etc.); and the like. Furthermore, regarding the necessity of schedule reexamination, relations of paper size and paper type used between the regular print job and other regular print jobs etc. are considered. For example, under a situation where paper of a size and a type to be used for a certain regular print job is installed in the printer, the proof print job of the regular print job that uses paper of different size and different type cannot be executed automatically.

Then the device scheduler 604 determines whether an automatic print job that has a proof print job and a regular print job whose automatic print schedules need to be reexamined was searched (Step 2204). When it is determined that reexamination of the schedules of the automatic print job is unnecessary, the device scheduler 604 returns the processing to Step 2201.

When the automatic print job needing to be reexamined was searched, the device scheduler 604 refers to the order ID of the automatic print job whose schedule information table needs to be reexamined and refers to a process priority flag of the step management information in the workflow information table corresponding to the order ID (Step 2205). Incidentally, when a step "quality priority" (or "date-of-delivery priority") is set for the process priority flag in the workflow information table as shown in FIGS. 8A and 8B described above, the work editor 607 registers the information in the workflow information table. Further, regarding the process priority flag, it is possible for the operator to display and confirm the present setting on the display in the workflow manager 602 and also to set and alter it from input means, such as a keyboard. For example, the workflow manager 602 may be configured such that when the operator selects a mode button in FIGS. 9A and 9B, a pop-up menu of display, setting, alteration, etc. of the process priority flag is displayed.

The device scheduler 604 determines whether "date-of-delivery priority" is set in the above-mentioned process priority flag related to the automatic print job needing to be reexamined (Step 2206). When it is determined that "date-of-delivery priority" is not set in the process priority flag, the device scheduler 604 does not alter the schedule of the proof print job but reconstructs the schedule of the regular print job regarding to the automatic print job needing to be reexamined (Step 2207). For example, reconstruction of the schedule of the regular print job includes: newly selecting a printer with the scheduled start/finish times kept the same; newly setting a scheduled start/finish times with the printer kept the same; and the like.

When it is determined that "date-of-delivery priority" is set in the above-mentioned process priority flag related to the automatic print job needing to be reexamined, the device scheduler 604 does not alter the schedule of the regular print job but reconstructs the schedule of the proof print job regarding the automatic print job needing to be reexamined. For example, reconstruction of the schedule of the proof print job includes: newly selecting a printer with the scheduled start/finish times kept the same; newly setting a schedule of the proof printing with the printer kept the same; and the like.

The device scheduler 604 refers to the schedule information table and determines whether a schedule of an automatic print job whose schedule needs to be reexamined and reconstructed can be registered in the schedule information table (reschedule registration) (Step 2209). Here, go/no-go of reschedule registration is determined from the same viewpoint as the necessity of schedule reexamination in Step 2203 described above.

When it is determined that reschedule registration is not allowed by the schedule information table, the device scheduler 604 creates a reschedule plan in which the schedule is rebuilt collectively for both the proof print job and the regular print job of an automatic print job needing to be reexamined (Step 2210). The reschedule plans include, for example: a printer is newly selected while schedules of the proof print job and the regular print job have the same scheduled start/finish times; the scheduled start/finish times are newly set while the proof print job and the regular print job are performed by the same printer; and the like.

Then in order not to automatically execute print processing of the automatic print job whose schedule needs to be reexamined at a scheduled time, the device scheduler 604 sets (turns ON) a automatic print job pending flag regarding step management information of a step "printing" in the workflow information table corresponding to the order ID of the automatic print job and leaves the automatic print processing of the automatic print job pending (Step 2211). Incidentally, regarding the automatic printing pending flag, it is possible for the operator to display and confirm the present setting on the display in the workflow manager 602 and also to set and alter it from input means, such as a keyboard. For example, the equipment may be configured such that when the operator selects the mode button in FIGS. 9A and 9B, a pop-up menu of display, setting, alteration, etc. of the automatic printing pending flag is displayed.

The device scheduler 604 informs the operator of information (order ID etc.) of the print job whose automatic print processing is left pending and a reschedule plan created in Step 2210 with E-mail etc. (Step 2212). The operator who received a notice conducts necessary processing on the information of the print job whose automatic print processing is left pending and the reschedule plan. For example, the operator processes some of the print jobs whose automatic print processing is left pending in a schedule that is separate and independent from the schedule of this embodiment. For the other print jobs whose automatic print processing is left pending, the operator conducts setting, alteration, etc. on the automatic printing pending flag from input means, such as a keyboard, in the GUI in FIGS. 9A and 9B in the workflow manager 602.

On the other hand, when in Step 2209 it is determined that the schedule of the automatic print job whose schedule needs to be reexamined and reconstructed can be registered (reschedule registration) in the schedule information table, the device scheduler 604 registers the schedule that was rescheduled in the schedule information table again (Step 2213). Then the device scheduler 604 refers to the order ID of the automatic print job whose schedule is reconstructed, refers to the operator information in the order information table of the order, and informs the operator of information of the automatic print job whose schedule is reconstructed (schedule alteration of the proof print or regular print job) with E-mail etc. (Step 2214). After this, the device scheduler 604 conducts Step 2201 to Step 2214 periodically.

Figure 26A:
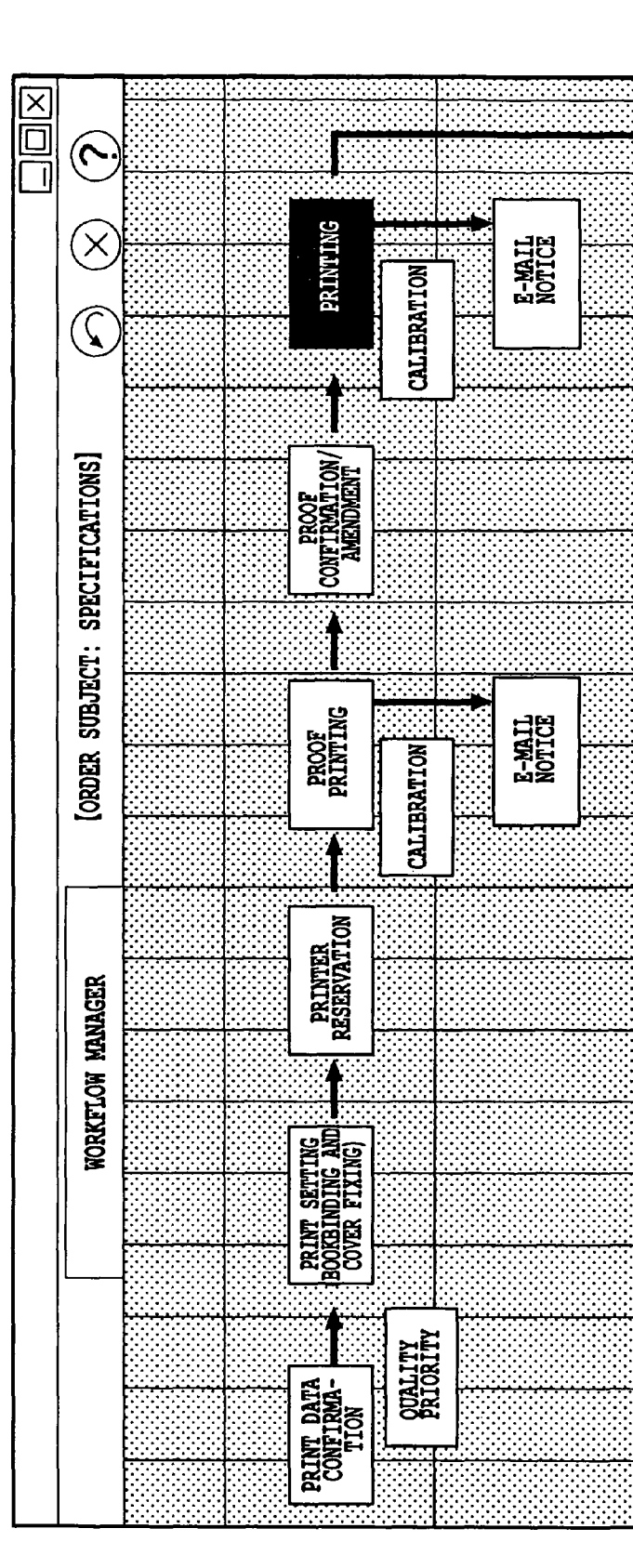
FIGS. 26A and 26B are diagrams showing a step "printing" in a workflow manager 602 of the embodiment to which this invention can be applied.
Figure 26B:
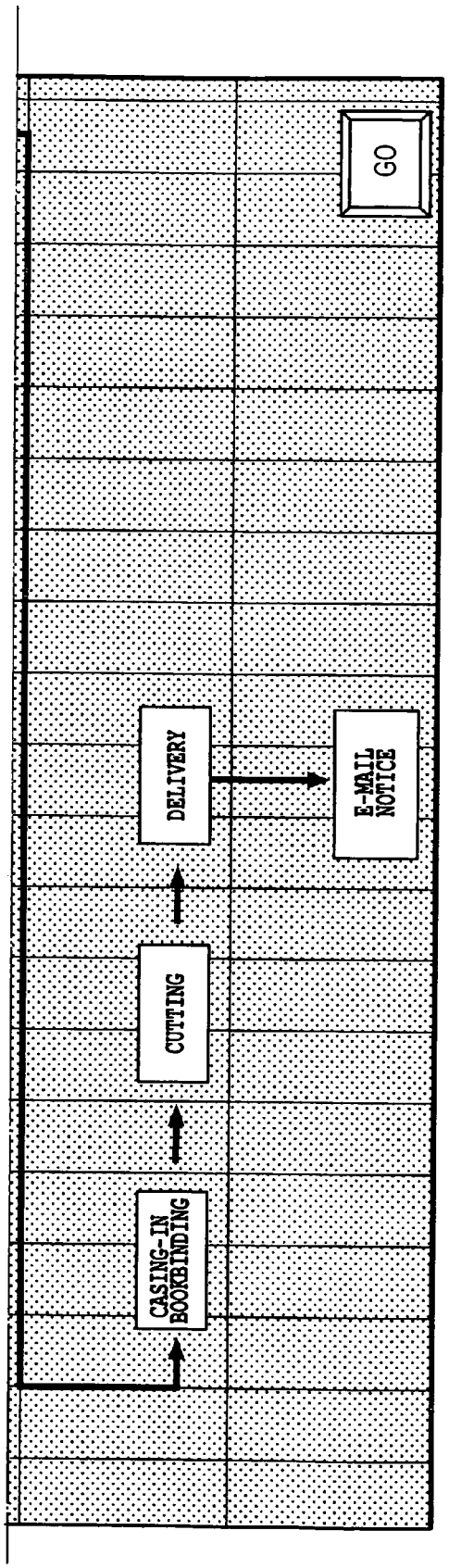

Next, a processing flow in the case where the step "printing" in the workflow manger 602 is highlighted will be described with reference to FIGS. 26A and 26B. The workflow manager 602 refers to workflow information of the specified order in the workflow information table and determines whether the present step is "printing" (Step 2301). When it is determined that the present step is not "printing," the workflow manager 602 conducts processing in other steps (Step 2302).

When it is determined that the present step is "printing," the workflow manager 602 requests execution of automatic printing of the device scheduler 604. The device scheduler 604 refers to the schedule information table as shown in FIG. 17 (Step 2303). The device scheduler 604 refers to the schedule information table shown in FIG. 17 (Step 2303) and determines whether there is a regular print job that passed its start time (Step 2304). When it is determined that there is not the pertinent regular print job that passed its start time, the device scheduler 604 terminates the processing. Then the device scheduler 604 informs the workflow manager 602 that there is no regular print job to be performed automatically. When receiving its notice, he workflow manager 602 refers to FIG. 19 and returns to the top process in the automatic processing (Step 1907) described above (more specifically, restarting Step 2301).

When it is determined that there is a regular print job that passed its start time, the device scheduler 604 determines whether the automatic print pending flag is set regarding the step management information of the step "printing" of the specified order in the workflow information table (Step 2305). When it is determined that the automatic printing pending flag is set, the device scheduler 604 terminates the processing.

When it is determined that the automatic printing pending flag is not set, the device scheduler 604 refers to the proof print confirmation completion flag regarding the step management information of the step "proof confirmation/amendment" of the specified order in the workflow information table (Step 2306). Then the device scheduler 604 determines whether the proof print confirmation completion flag is set ON for the pertinent regular print job that passed the start time of the regular print job of the specified order (Step 2307).

When it is determined that the proof print confirmation completion flag of the regular print job that passed its start time is set ON, the device scheduler 604 recognizes the regular print job that passed the start time corresponding to the specified order in the schedule information table uniquely by the order ID and the printer name, activates the print component 606 by sending the information, and makes it execute the pertinent regular print job (Step 2308). The device scheduler 604 refers to the operator information in the order information table of the specified order and informs the operator of the automatic execution of the pertinent regular print job with E-mail etc. (Step 2309). The print component 606 acquires order information (print data, print information) corresponding to the specified order registered in the order information table from the order manager 601, and executes the pertinent regular print job automatically.

Then the job manager 603 communicates with a printer based on the order ID of the print job and the printer name informed from the print component 606, monitors the print job, and at the time when completion of the print processing is recognized from the status of the printer of the pertinent regular print job, informs the device scheduler 604 and the workflow manager 602 of that information.

When the device scheduler 604 receives a notice that print processing of the pertinent regular print job is completed from the job manager 603, the device scheduler 604 refers to the operator information in the order information table of the specified order and informs the operator of print completion of the pertinent regular print job with E-mail etc. (Step 2310). Then the device scheduler 604 informs the workflow manager 602 of completion of the step "printing." The workflow manager 602 receives the result, and controls subsequent steps.

In step 2307, when it is determined that a proof print confirmation completion flag in the step management information of the step "proof confirmation/amendment" of the specified order in the workflow information table, that is, "the proof print confirmation completion flag of the pertinent regular print job (hereafter Job A) that passed the start time of the regular print job of the specified order is not set ON, the device scheduler 604 searches an order ID (other regular print job) whose proof print confirmation completion flag is set ON regarding step management information of the step "proof confirmation/amendment" in the workflow information table (Step 2311). From the search result, the device scheduler 604 determines whether there is other print job whose proof print confirmation completion flag is turned ON and that uses the same printer (hereafter, Job B) as that of the pertinent regular print job (Job A) (Step 2312). When it exists, the device scheduler 604 recognizes Job B by the order ID and the printer name of Job B.

When it is determined that there is not other regular print job (Job B), the device scheduler 604 refers to the operator information in the order information table of the specified order, and informs the operator of postponement of the automatic execution of the pertinent regular print job (Job A) of the specified order (Step 2313). The operator who received the notice conducts necessary processing on the pertinent regular print job whose automatic execution was postponed. For example, the processing includes: the operator processes the pertinent regular print job whose automatic execution was postponed in an independent schedule other than the scheduling of this embodiment; and the like.

When it is determined that there exists another regular print job (Job B) whose proof print confirmation completion flag is turned ON, the device scheduler 604 refers to scheduled start time of the other regular print job (Job B) in the schedule information table corresponding to the order ID and the printer name of Job B. Then, when the other regular print job (Job B) that was referred to has not come to its scheduled start time, the device scheduler 604 determines whether the print job (Job B) can be executed ahead of the pertinent regular print job (Job A) (Step 2314).

Here, go/no-go about execution earlier than the initial schedule is determined from the same viewpoint as the necessity of reexamination of the schedule in Step 2203 described above. Concretely, the device scheduler 604 refers to the schedule information table and detects: an event that the pertinent regular print job (Job A) is not completed until the appointed date of delivery in terms of time because the other regular print job (Job B) is executed ahead of the pertinent regular print job (Job A); an event that the proof print job of the regular print job (Job-A) affects the print quality of other regular print job (Job B); an event that cooperation capability becomes inefficient (a time interval between proof printing of the pertinent regular print job (Job A) and the pertinent regular print job (Job A) that follows it is too large, etc.); and the like, all of that result from execution of other regular print job (Job B) ahead of the pertinent regular print job (Job A). Moreover, relations of paper size and paper type used between the pertinent regular print job (Job A) and other regular print job (Job B) etc. are considered.

When it is determined that other regular print job (Job B) whose start time has not come cannot be executed ahead of other jobs, the device scheduler 604 conducts the processing of Step 2313 described above.

When it is determined that other regular print job (Job B) whose start time has not come can be executed ahead of other jobs, the device scheduler 604 reschedules the scheduled start time for the present time for a schedule of other regular print job (Job B) (Step 2315). Then the device scheduler 604 registers a schedule result of other regular print job (Job B) that was rescheduled in the schedule information table (Step 2316). Next, the device scheduler 604 reschedules the schedule of the pertinent regular print job (Job A) for a time immediately after other regular print job (job B) (Step 2317). Then the device scheduler 604 registers the schedule result of the pertinent regular print job (Job A) that was rescheduled in the schedule information table (Step 2318).

Subsequently, the device scheduler 604 activates the print component 606 and makes it automatically execute other regular print job. The device scheduler 604 sends information of the order ID and the printer name of other regular print jobs (Job B), activates the print component 606, makes it execute other regular print job (Job B) (Step 2319).

The device scheduler 604 refers to the operator information in the order information table specified by the order ID of other regular print job (job B), informs the operator of Job B that other regular print job (Job B) was automatically executed ahead of other jobs with E-mail etc., refers to the operator information in the order information table of the specified order, and informs the operator of Job B that automatic execution of the pertinent regular print job (Job A) was postponed and processing was rescheduled with E-mail etc. (Step 2320). The operator of Job A who received a notice conducts necessary processing on the pertinent regular print job (Job A) whose automatic execution was postponed, which is the same as that of Step 2313 described above.

Effect of the First Embodiment

As described above, according to this first embodiment, the print schedule control equipment (print server 105) that controls a schedule of the first print job (regular print job) performing the instructed printing and a schedule of the second print job (proof print job) performing printing for confirmation that precedes the first print job is characterized by comprising: schedule information saving means of registering one or more data sets each of which is composed of the schedule of the first print job and the schedule of the second print job; printer information saving means for managing information of one or more printers; printer searching means for, when making reservation of the first print job and the second print job based on specific print information that instructs printing, searching information of a printer corresponding to the specific print information from the printer information saving means; and first registering means for, when referring to the data set corresponding to information of a printer that is registered in the schedule information saving means and searched by the printer searching means, first assignment of assigning the first print job based on the specific print information in an idle time of the printer that allows fulfillment of a date of delivery included in the specific print information is possible, registering a data set composed of the schedule of the first print job for which the first assignment was effected in the schedule information saving means in such a manner as to establish a correspondence with the specific print information and information of a printer searched by the printer searching means; and second registering means for, when referring to the data set composed of the schedule of the first print job for which the first assignment registered in the schedule information saving means was effected, the second print job based on the specific print information can be assigned in an idle timer of a printer corresponding to the data set that precedes the schedule of the first print job is possible, registering a data set composed of the schedule of the second print job for which the assignment was effected and the schedule of the first print job for which assignment was effected by the first registering means in the schedule information saving means in such a manner as to establish a correspondence with the specific print information and information of a printer searched by the printer searching means; and reservation impossibility informing means for, when the first assignment by the first registering means is not possible or when the second assignment by the second registering means is not possible, informing that the above-mentioned reservation is impossible.

With this configuration, the print schedule control equipment registers schedules of the regular print job and the proof print job when schedules of the both jobs can be determined according to print information that instructs printing in conformity to a date of delivery, and processes registration of the schedules of the regular print job and the proof print job as impossible when schedules of the both jobs cannot be registered, removing the need to alter the schedule of the regular print job again.

Here, the first registering means can be characterized by comprising:

first time calculating means for calculating a processing time of the first print job with the printer according to the specific print information, based on the specific print information and information of a printer searched by the printer searching means (Step 2004 to Step 2008);

first determining means for determining whether first assignment of assigning processing time calculated by the first time calculating means to an idle time of the printer that fulfills a date of delivery included in the specific print information is possible by referring to the data set corresponding to information of a printer that is registered in the schedule information saving means and searched by the printer searching means (Step 2005 to Step 2009); and first print job registering means for, when the first determining means determined that the first assignment was possible, effecting the first assignment and registering a data set composed of a schedule of the first print job for which the first assignment was effected in the schedule information saving means in such a manner as to establish a correspondence with the specific print information and information of a printer searched by the printer searching means (Step 2010). The second registering means can be characterized by comprising: second time calculating means for calculating a processing time of the second print job with the printer according to the specific print information, based on the specific print information and information of a printer searched by the printer searching means (Step 2012 to Step 2015);

second determining means for determining whether a second assignment of assigning a processing time calculated by the second calculating means to an idle time ahead of a schedule of the first print job is possible based on the data set corresponding to other print information that instructs printing and is registered in the schedule information saving means by referring to a data set composed of a schedule of the first print job for which the first assignment registered in the schedule information saving means was effected (Step 2016 to Step 2018); and second print job registering means for, when the second determining means determined that the second assignment was possible, effecting the second assignment and registering a data set composed of a schedule of the second print job for which the second assignment was effected and a schedule of the first print job for which the first assignment was effected in the schedule information saving means in such a manner as to establish a correspondence with the specific print information and information of a printer searched by the printer searching means (Step 2019); wherein the registration impossibility informing means (Step 2020) informs that the reservation is impossible when the first determining means determined that the first assignment was not possible.

With this configuration, schedules of the regular print job and the proof print job according to print information that instructs printing are determined based on schedules of the regular print job and the proof print job according to other print information and the situation of a destination printer.

Moreover, the second time calculating means can be characterized by comprising: processing time calculating means (Step 2012) for calculating a processing time of the second print job with the printer according to the specific print information, based on the specific print information and information of a printer searched by the printer searching means; and adding means (Step 2013) for adding a time of confirming a result of the second print job based on the specific print information to the processing time calculated by the processing time calculating means.

With this configuration, the print schedule control equipment also schedules its time limit of confirmation after the proof printing.

Moreover, the print schedule control equipment can be characterized by further comprising:

lapse determining means for, when the second print job is completed according to a schedule of the second print job based on the specific print information registered in the schedule information saving means, determining whether a certain period has elapsed after completion of the second print job (Step 2110);

confirmation receiving means for receiving the confirmation of a result of the second print job based on the specific print information (Step 2112); and confirmation request informing means for, when the confirmation receiving means determined that the confirmation has not been received and the lapse determining means determined that the certain period has elapsed, sending a notice for urging the confirmation (Step 2111).

By this configuration, when the print schedule control equipment fails to obtain confirmation after the proof printing, the print schedule control equipment informs the operator in charge corresponding to print information that instructs its printing of that information.

Moreover, the print schedule control equipment can be characterized by further comprising:

confirmation determining means for, when performing the first print job according to a schedule of the first print job based on the specific print information registered in the schedule information saving means, determining whether a result of the second print job based on the specific print information has been confirmed (Step 2307); and advance executing means for, when the confirmation determining means determined that the result has not been confirmed, searching other print information that instructs the printing whose result of the second print job has been confirmed and executing the first print job based on the searched other print information ahead of the first print job based on the specific print information (Step 2312-S2319).

With this configuration, the print schedule control equipment automatically schedules the regular print job for print information that instructs its proof printing and a regular print job for other print information depending on the proof print result.

With the above configurations, according to this embodiment, since automatic scheduling of the proof printing (start and end times of printing) is determined considering the operator's confirmation step, confirmation and alteration works can be conducted surely, giving an effect of improved print quality. Further, since it is not necessary to alter a schedule of the automatic regular print job, this embodiment also gives an effect of improved working efficiency. Moreover, this embodiment has an effect of making it possible to execute the proof printing without affecting the print quality of other automatic regular print job. Furthermore, since this embodiment considers relation with other print job (continuity and simultaneity in procedures, steps, etc.), it has an effect of making it possible to perform proof printing efficiently.

Moreover, according to this embodiment, a confirmation result of the proof printing and determination of execution of automatic regular printing can be associated with each other surely; therefore, this embodiment has an effect of improved quality of the automatic regular printing. Moreover, since the schedule of the automatic print job is determined early, this embodiment has effects that a schedule after the printing step in the workflow is easy to make and working efficiency is improved. Moreover, when there is an alteration in order conditions, a situation of a scheduled print job and a print job being executed, and a situation in resources, the proof print job and the regular print job are automatically rescheduled, and consequently this embodiment has an effect of improved working efficiency. Furthermore, it becomes possible to advance execution of an automatic regular print job, in addition to delaying the start time, at the time of rescheduling, and consequently this embodiment has an effect of improved working efficiency. Then a schedule is delayed with a setting of a printer unchanged. For this reason, it is not necessary to conduct setting processing that depends on the printer again, and the automatic print processing can be executed as soon as the proof printing is confirmed, and consequently it is efficient.

Second embodiment

Next, a second embodiment to which this invention can be applied will be described in detail. The system configuration of the second embodiment is the same as that of the first embodiment.

Figure 30:
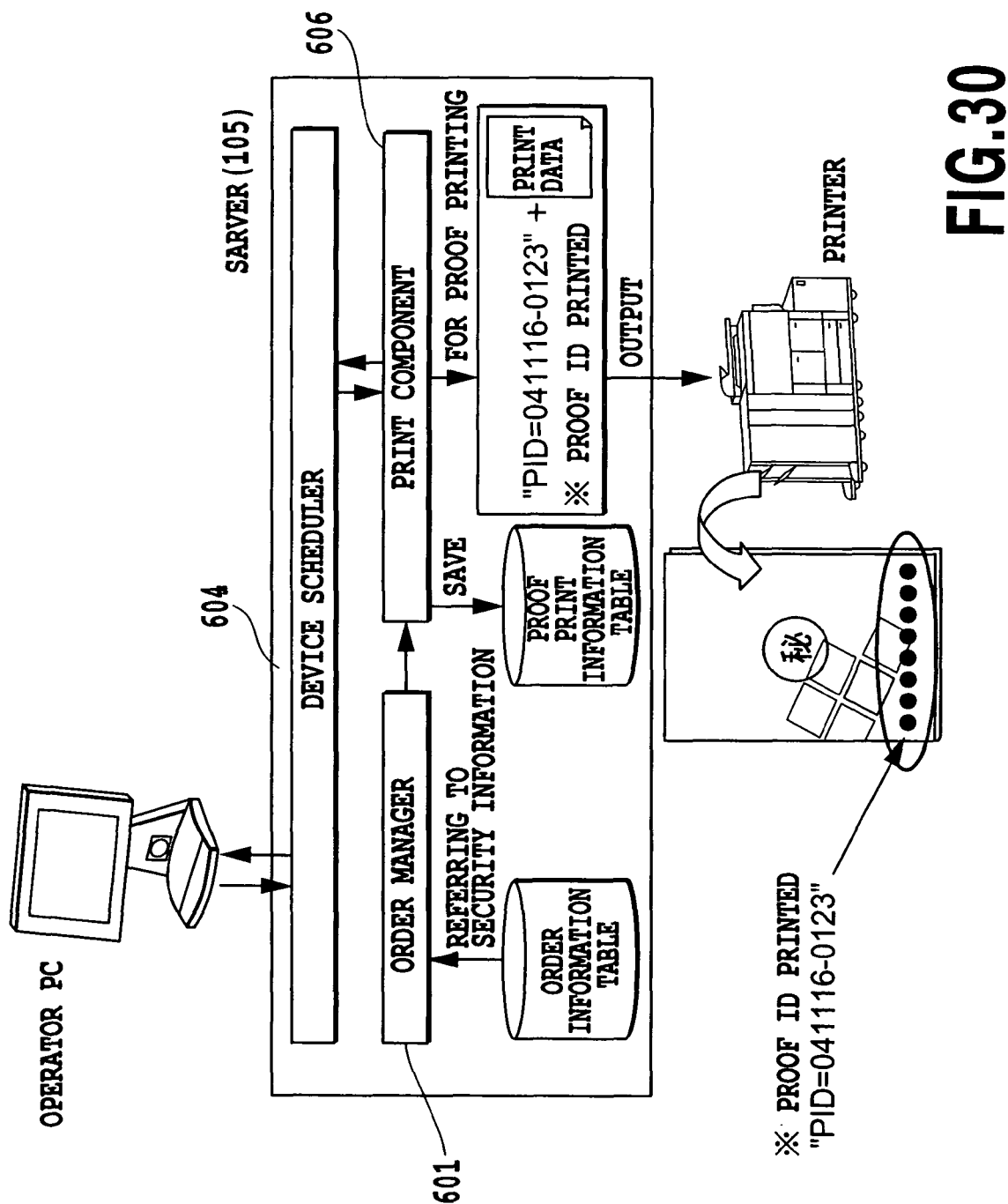
FIG. 30 is an illustration showing processing of a printing system of a second embodiment to which this invention can be applied.
Figure 31:
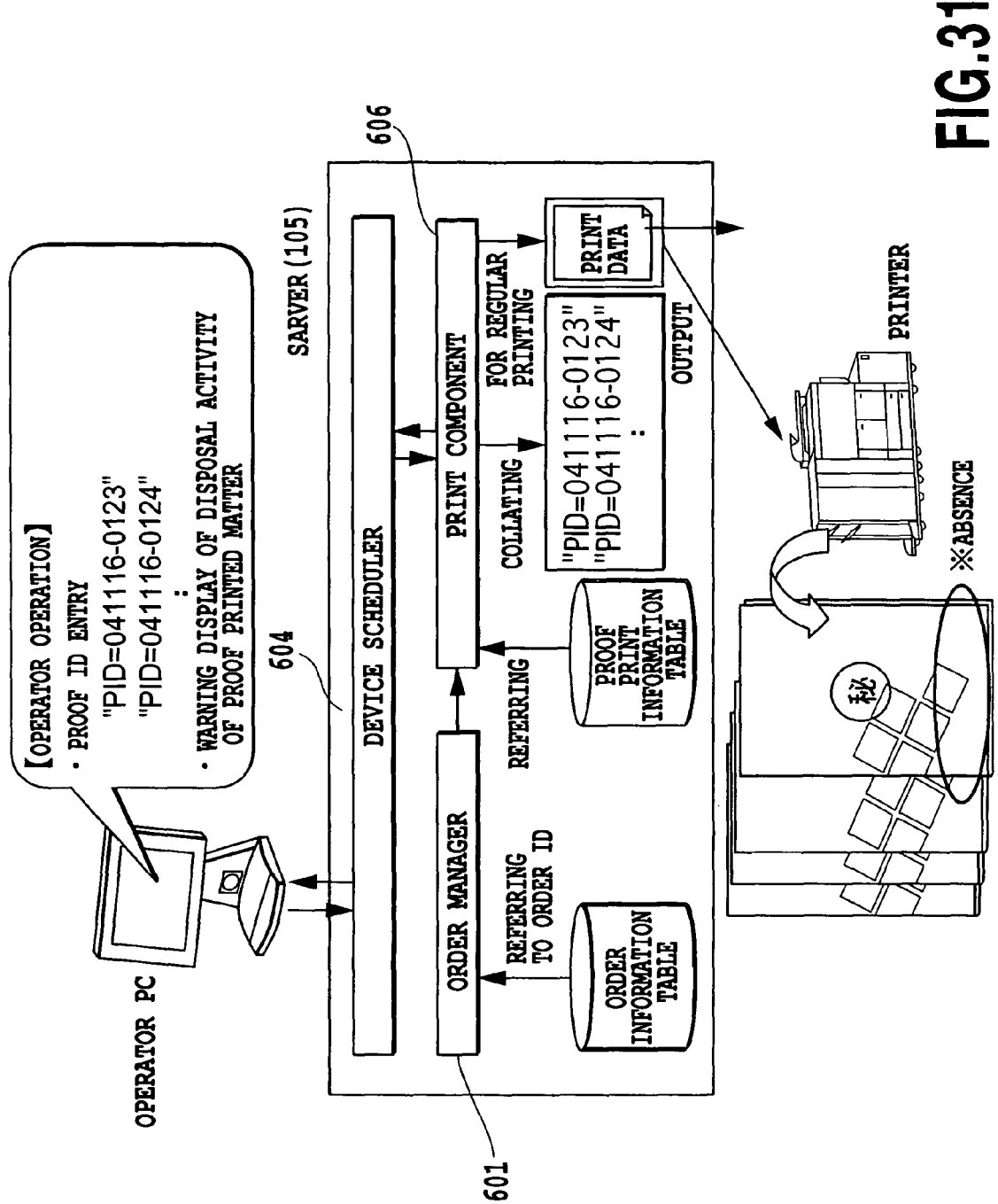
FIG. 31 is an illustration showing processing of the printing system of the second embodiment to which this invention can be applied.

FIG. 30 and FIG. 31 are illustrations showing processing of a printing system of the second embodiment that improves security by means of historical management of proof printing in a secure job. Note that the environments of the whole printing systems in the description below are for making description of this embodiment easy to understand and that this invention is not limited to these environments. FIG. 30 and FIG. 31 are views for explaining the print server 105 described above in FIG. 6 with simplification, and it must be understood that the print server 105 is equipped with several constituents whose description is omitted.

First, processing for forming historical information of proof printing will be described.

Figure 28:
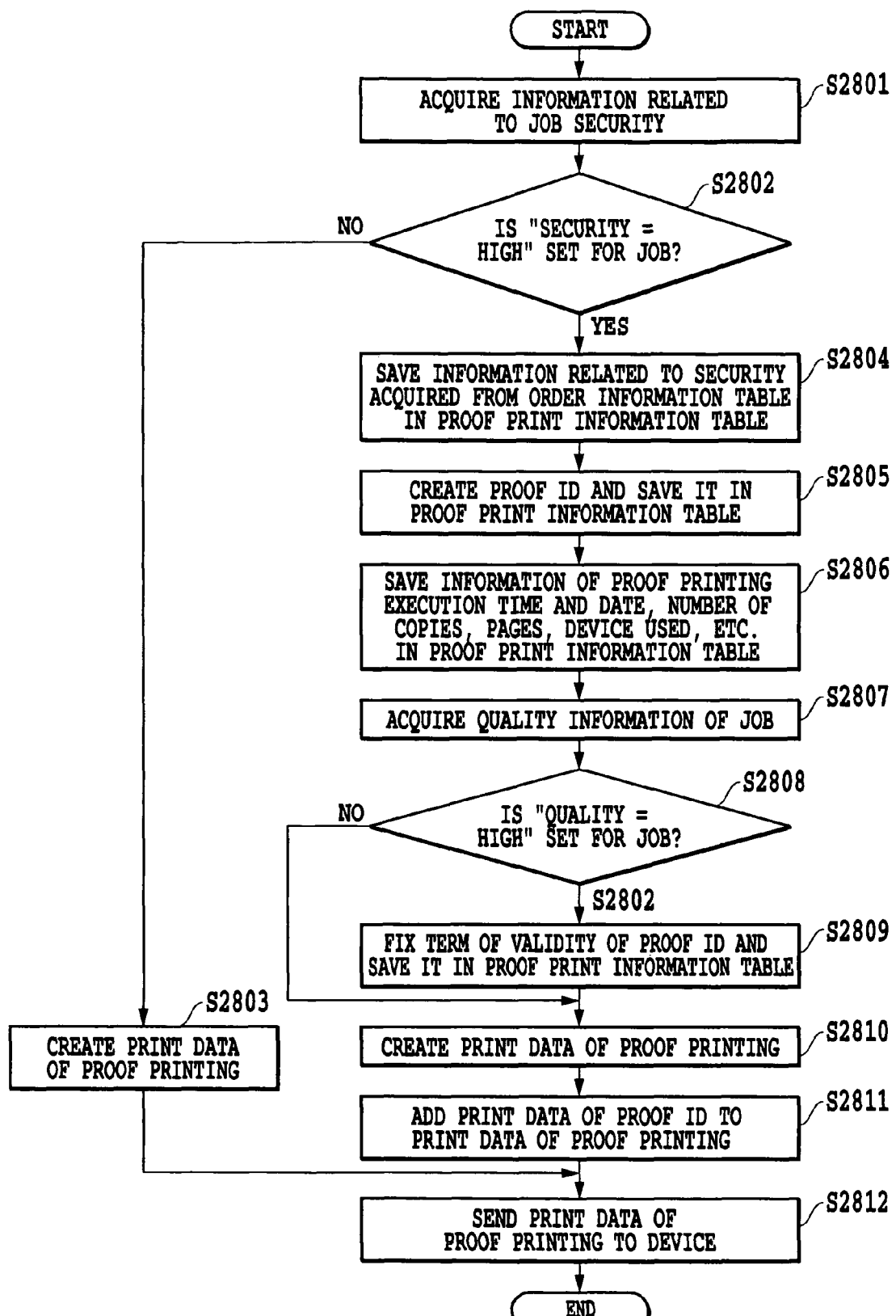
FIG. 28 is a flowchart showing the contents of processing of a program of the print server software of the embodiment to which this invention can be applied.

In Step 2105 in FIG. 21, the pertinent proof print job is executed in conjunction with processing as shown in FIG. 30. A concrete control flow in the print server in FIG. 30 will be described using FIG. 28.

The print component 606 that is a print control module acquires information related to the security registered in an order information table from an order manager 601 (Step 2801). In this case, items of order ID, job security, quality, etc. are acquired. The print component 606 determines whether "security=high" or "security=already set" is set for the job from the acquired information related to the security (Step 2802). When it is determined that "security=high" is not set for the job, the print component 606 creates print data of proof printing as with the processing described in FIG. 21 (Step 2803), sends the print data of proof printing to a device, and makes the device execute printing (Step 2812).

When it is determined that "security=high" is set for the job, the print component 606 saves information related to the security acquired from the order information table in a proof print information table in such a manner as shown in FIG. 27 (Step 2804). FIG. 27 shows one example of the proof print information table, which saves order ID, job security attributes, print quality, proof print time and date, print unit, proof ID (proof identification information), term of validity of proof ID.

The print component 606 creates a proof ID that becomes intrinsic information, as shown in FIG. 27, and saves it in the proof print information table (Step 2805). In this case, since this is the first proof printing, a proof ID=041116-0123 of proof No. 001 of the proof information in FIG. 27 is saved.

The print component 606 saves other pieces of information related to proof printing shown in FIG. 27, such as proof printing time and date, print unit (the number of copies, specified page, etc.) in the proof print information table (reserved in the HD 205) (Step 2806).

Next, the print component 606 acquires quality information of the job from the acquired information related to security (Step 2807). The print component 606 determines whether "Quantity=high" is set for the job (Step 2808). When it is determined that "Quantity=high" is not set for the job, the print component 606 proceeds to Step 2810. When it is determined that "Quantity=high" is set for the job, the print component 606 fixes a term of validity of the proof ID and saves it in the proof print information table (Step 2809). The fixation of the term of validity of the proof ID is done by referring to information that is stipulated for each device and saved in the server.

Next, the print component 606 creates print data of proof printing (Step 2810). The print component 606 adds print data of proof ID to the print data of proof printing (Step 2811).

Then the print component 606 sends the print data of proof printing to the device, and makes the device execute printing (Step 2812).

In this case, as shown in FIG. 30, the print component 606 automatically adds the print data of "PID=041116-0123," which is printed on the cover part as information that the operator can recognize and refer to. Incidentally, a print mode of the proof ID (size, color, location in the page, etc. and selection between all pages and an arbitrary page, etc.) can be set in the printing system in advance.

After this step, every time the operator performs proof printing, historical information of proof printing is saved automatically in the server by processing of Step 2801 to Step 2812 and the proof ID is printed automatically on a proof printed matter.

Next, processing in the regular printing that uses the historical information of proof printing will be described.

Figure 23A:
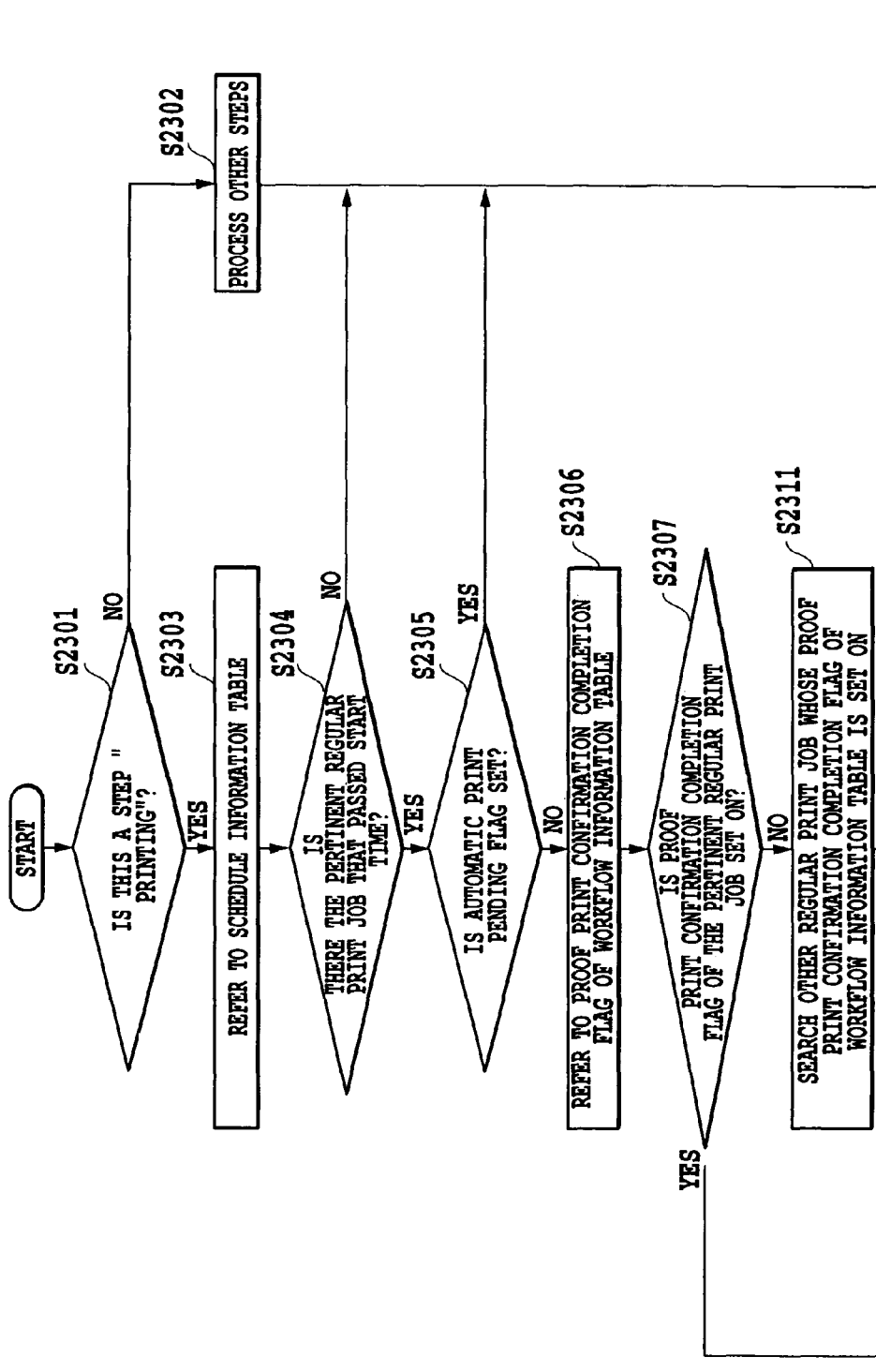
FIGS. 23A and 23B are flowcharts showing the contents of processing of a program of the print server software of the embodiment to which this invention can be applied.
Figure 23B:
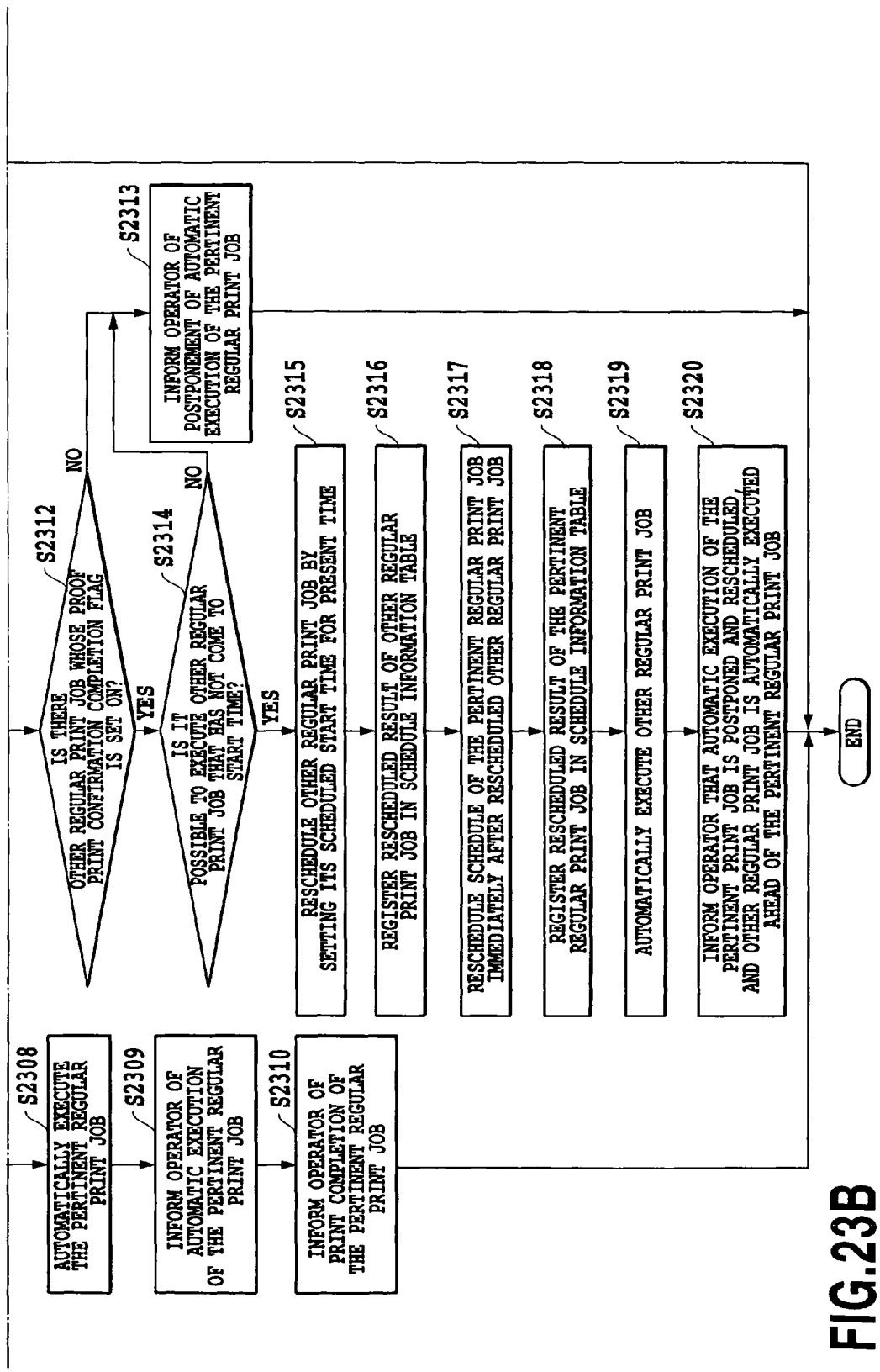
Figure 29B:
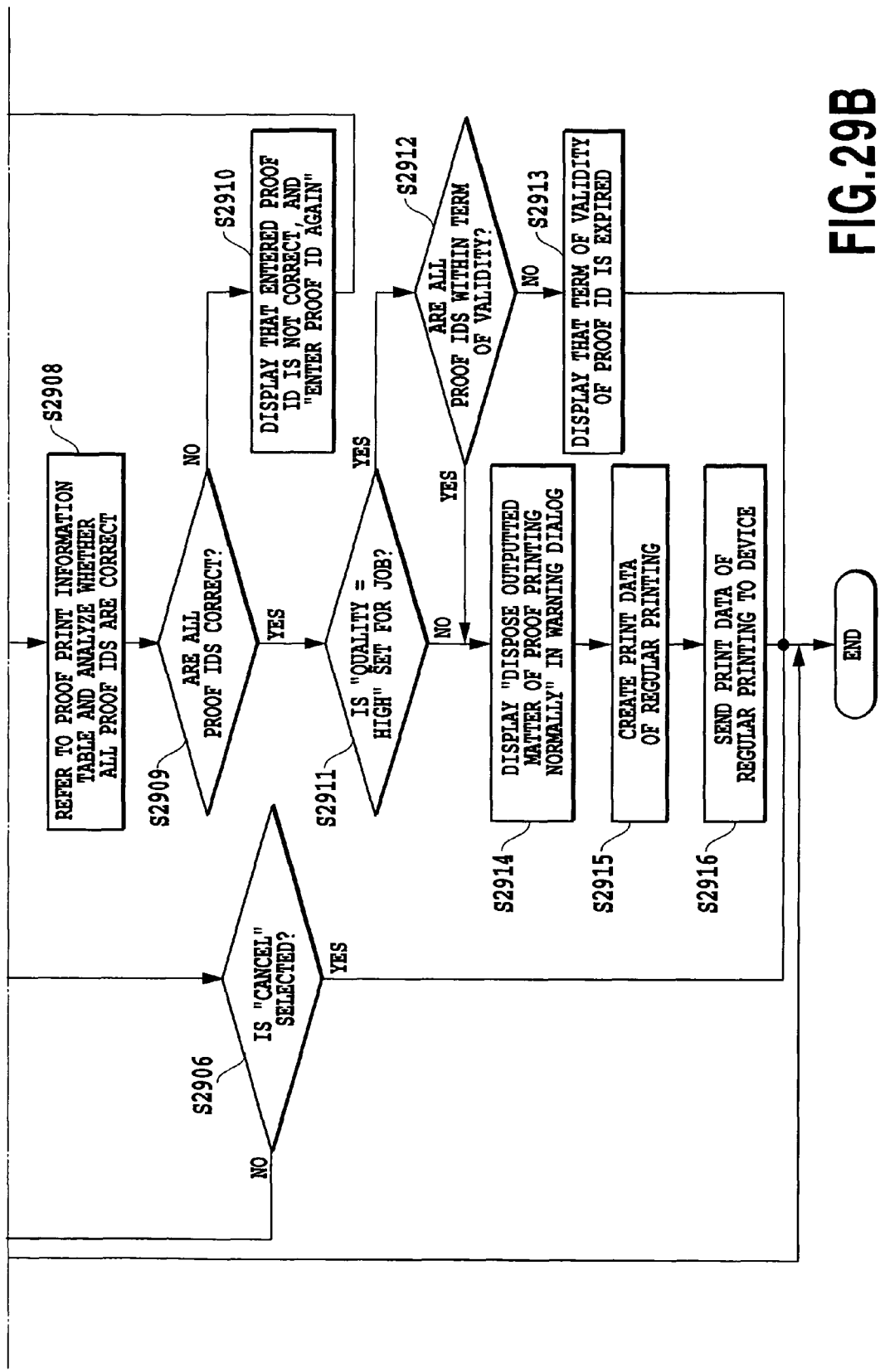

In Step 2308 and Step 2319 in FIGS. 23A and 23B, processing as shown in FIG. 31 is performed before execution of a regular print job. Concretely this processing becomes a flow as shown in FIGS. 29A and 29B.

The print component 606 acquires an order ID registered in the order information table from the order manager 601 (Step 2901). The print component 606 refers to a proof ID from the proof print information table (Step 2902).

Figure 32:
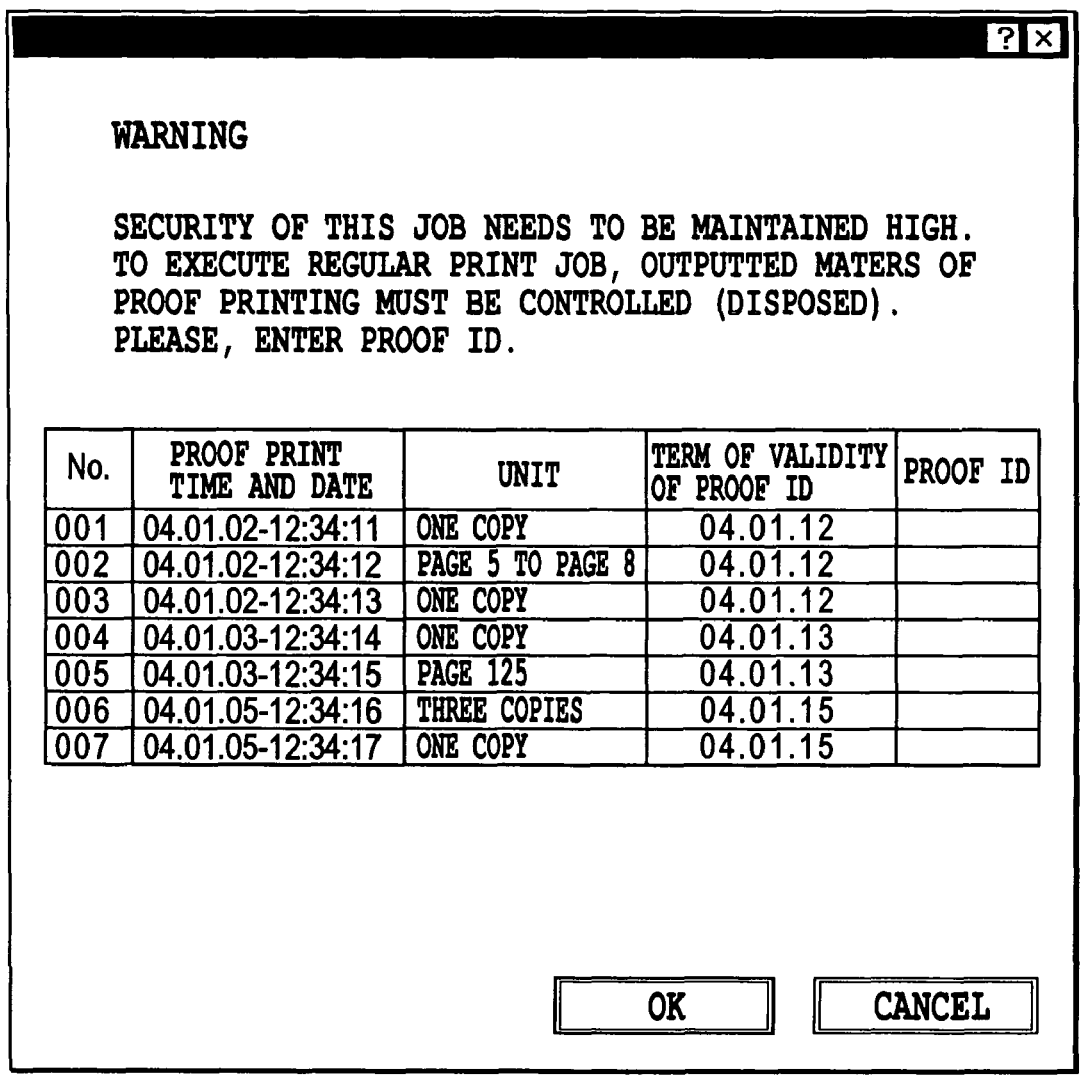
FIG. 32 is a diagram illustrating a GUI of a print component 606 of the embodiment to which this invention can be applied.

The print component 606 determines whether the order ID and the proof ID exist (Step 2903). When it is determined that the order ID and the proof ID exist, the print component 606 acquires proof information from the proof print information table and displays a proof ID entry dialog as shown in FIG. 32 (Step 2904). In this case, the proof ID entry dialog displays the whole historical information of proof printing that was executed for the pertinent job (proof number (this is a number only for history management), proof print time and date, print unit, term of validity of proof ID, etc.).

Next, the print component 606 determines whether the operator entered all the proof IDs (Step 2905). The input method may be either of the following: the operator enters it using the keyboard 206 at the print server 105; and the operator enters this order through an operation panel of the printer (111 or 112) that should perform print processing, and the printer sends the entered proof ID to the print server 105, whereby it is entered into the print server 105. When it is determined that all the proof IDs are not entered, the print component 606 determines whether a cancel button was (Step 2906). When the print component 606 determines that the cancel button was selected, it terminates the processing. When the print component 606 determines that the cancel button is not selected, it returns to Step 2905.

In Step 2905, when it is determined that the operator inputted all the proof IDs, the print component 606 determines whether an OK button is selected (Step 2907). When it is determined that the OK button was not selected, the print component 606 proceeds to Step 2906. When it is determined that the OK button was selected, the print component 606 analyses whether all the proof IDs are correct referring to the proof print information table (Step 2908).

The print component 606 determines whether all the proof IDs are correct (Step 2909). When it is determined that all the proof IDs are not correct, the print component 606 displays that the entered proof IDs are not right and reentering is displayed to the operator (Step 2910), and proceeds to Step 2905.

In Step 2909, when it is determined that all the proof IDs are correct, the print component 606 determines whether "Quantity=high" is set for the job (Step 2911). When it is determined that "Quantity=high" is set for the job, the print component 606 determines whether all the proof IDs are within terms of validity (Step 2912). When it is determined that all the proof IDs are not within the terms of validity, the print component 606 displays that the term of validity of proof printing has run out to the operator, and terminates the processing.

Figure 33:
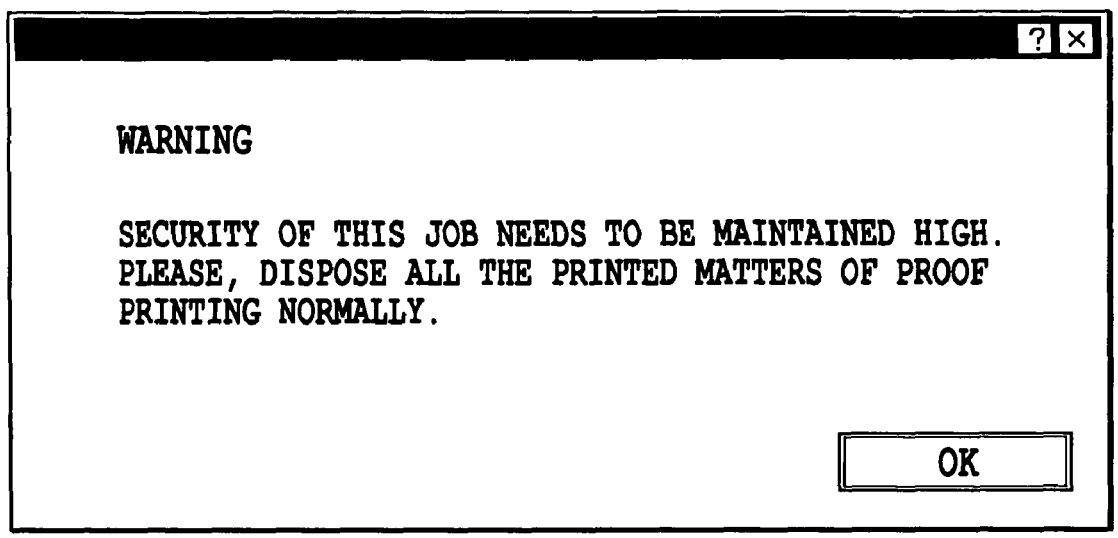
FIG. 33 is a diagram illustrating a GUI of the print component 606 of the embodiment to which this invention can be applied.

In Step 2911, when it is determined that "Quality=high" is not set for the job, and in Step 2912 when it is determined that all the proof IDs are within the terms of validity, the print component 606 displays "Dispose outputted matters of proof printing normally." to the operator in an warning dialog as shown in FIG. 33 (Step 2914).

The print component 606 forms print data of regular printing (Step 2915), and sends the print data of regular printing to a device (Step 2916).

As described above, according to the second embodiment, when proof printing of the secure job is executed, proof printing historical information is automatically saved and the proof ID is printed on the printed matter of proof printing automatically. In addition, this equipment is characterized by composing means for confirming (controlling) an ID of a printed matter of proof printing and enabling the regular print job to be executed after disposal warning.

With provision of means of Step 2904 to Step 2910, it becomes impossible for the operator to enter a proof ID if the operator does not grasp proof IDs of all the proof printed matters, making it impossible to put forward execution processing of regular printing. That is, the method has an effect of prohibiting the execution of regular printing under circumstances of poor control of proof printed matters. Moreover, this has an effect of making the operator bear consciousness of strict control of proof printed matters.

Moreover, provision of means of Step 2911 to Step 2912 has an effect of prohibiting the execution processing of regular printing under circumstances of expired term of validity of proof printing for jobs that require no-alteration in color impression in color printing and for jobs requiring high quality. That is, after the proof printing is executed again and its quality is confirmed surely, the regular printing will be executed. This procedure also provides an effect of avoiding an event that after a printed matter requiring high security was printed in large quantity, and as a result all the copies are disposed because of a problem in quality.

Moreover, this procedure provides also an effect that an unnecessary output is lessened (suppressed) by warning at the time of proof printing with the same setting as that of previous outputting (print page, printing appearance, etc.).

Moreover, this procedure provides an effect that an unnecessary output is lessened (suppressed) by prohibiting proof printing after the execution of regular printing.

Other Embodiments

It is needless to say that the embodiments of this invention described above may achieved as a variation that a storage medium (or recording medium) saving a program code of software realizing functions of the above-mentioned embodiments is supplied to a system or equipment, and a computer of the system or equipment (or CPU or MPU (micro processing unit)) reads the program code saved in the storage medium and executes it.

In this case, since the program code itself read from the storage medium will realize the functions of the above-mentioned embodiment, the storage medium saving the program code will comprise this invention. In the above, the functions of the above-mentioned embodiment are realized by the computer executing a read-out program code. In addition to this, it is needless to say that configuration of this embodiment includes a case where an operating system (OS) or the like working on a computer conducts a part of or the whole actual processing based on instructions of the program code and the processing realizes the functions of the above-mentioned embodiment.

Furthermore, it is natural that the configuration of this invention also includes a case where a program code read from a storage medium is written into a storage medium provided in a function expansion board inserted to the computer or a function expansion unit connected to the computer, and subsequently based on instructions of the program code, a CPU or the like provided in the function expansion card or the function expansion unit conducts a part of or the whole actual processing and the processing realizes the functions of the embodiment described above.

It goes without saying that a program code of software realizing the functions of the above-mentioned embodiment is distributed through a network, and saved in saving means of a hard disk drive, memory, etc. of a system or equipment, or a storage medium of CD-RW (CD Rewritable), CD-R (CD Recordable), etc., and a computer (or CPU or MPU) of the system or equipment reads a saved program code and executes it, and thereby this invention is embodied in the equipment.

As many apparently widely different embodiments of the present invention can be made without departing from the spirit and scope thereof, it is to be understood that the invention is not limited to the specific embodiments thereof except as defined in the appended claims.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application Nos. 2004-134560 filed Apr. 28, 2004, and 2005-082677 filed Mar. 22, 2005, which are hereby incorporated by reference herein.

What is claimed is:

1. Print schedule control equipment that controls a schedule for printing of a plurality of print jobs, the plurality of print jobs including a first print job for performing printing processing and a second print job for performing printing for confirmation of a print quality of the first job, where the second print job precedes the first print job, comprising:
a scheduling unit constructed to detect time slots in the schedule for scheduling of the second print job where execution of the second print job will affect a print quality of other print jobs of the plurality of print jobs and detect time slots in the schedule for scheduling of the first print job where execution of the other print jobs of the plurality of print jobs after the second print job and before the first print job will affect the print quality of the first print job, the other print jobs being different from the first and second print jobs;
a deciding unit constructed to decide whether the second print job is registerable in the schedule on the basis of any detected time slots and
a registering unit constructed to register the second print job in the schedule when the deciding unit decides that the second print job is registerable in the schedule, whereby the second print job is not registered in the schedule when the deciding unit decides that the second print job is not registerable in the schedule.

2. The print schedule control equipment according to claim 1, wherein a setting of performing calibration processing is established for the second print job.

3. The print schedule control equipment according to claim 1, wherein when the first print job is performed using a plurality of printers, the second print job is performed for each divided first print job.

4. A print schedule control method of print schedule control equipment that controls a schedule for printing of a plurality of print jobs, the plurality of print jobs including a first print job for performing printing processing and a second print job for performing printing for confirmation of a print quality of the first job, where the second print job that precedes the first print job, comprising,
a scheduling step of detecting time slots in the schedule for scheduling of the second print job where execution of the second print job will affect the print quality of other print jobs of the plurality of print jobs and detecting time slots in the schedule for scheduling of the first print job where execution of the other print jobs of the plurality of print jobs after the second print job and before the first print job will affect the print quality of the first print job, the other print jobs being different from the first and second print jobs;
a deciding step of deciding whether the second print job is registerable in the schedule on the basis of any detected time slots; and
a registering step of registering the second print job in the schedule when the deciding step decides that the second print job is registerable in the schedule, whereby the second print job is not registered in the schedule when the deciding step decides that the second print job is not registerable in the schedule.

5. A non-transitory computer readable storage medium storing a program product characterized by making a computer execute each step of the print schedule control method according to claim 4.

6. The print schedule control method according to claim 4, wherein a setting of performing calibration processing is established for the second print job.

7. The print schedule control method according to claim 4, wherein when the first print job is performed with a plurality of printers, the second print job is performed for each divided first print job.

* * * * *